(12) United States Patent
Bukhryakov et al.

(10) Patent No.: US 11,952,395 B1
(45) Date of Patent: *Apr. 9, 2024

(54) VANADIUM ALKYLIDENE COMPLEX, SYNTHESIS AND USE THEREOF

(71) Applicants: Konstantin Bukhryakov, Miami, FL (US); Dmitry Belov, Miami, FL (US)

(72) Inventors: Konstantin Bukhryakov, Miami, FL (US); Dmitry Belov, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/132,135

(22) Filed: Apr. 7, 2023

Related U.S. Application Data

(63) Continuation of application No. 17/884,282, filed on Aug. 9, 2022, now Pat. No. 11,643,423.

(51) Int. Cl.
C07F 9/00 (2006.01)

(52) U.S. Cl.
CPC ..................... *C07F 9/00* (2013.01)

(58) Field of Classification Search
CPC ....................................................... C07F 9/00
See application file for complete search history.

(56) References Cited

U.S. PATENT DOCUMENTS 11,643,423 B1 * 5/2023 Bukhryakov ......... C07F 9/5045 556/43

OTHER PUBLICATIONS

Belov, D. S., et al. "First Vanadium Oxo Alkylidene Catalyst for Olefin Metathesis." American Chemical Society Meeting & Exposition, Aug. 22-26, 2021: abstract.

Belov, D. S., et al. "Ring-Closing Olefin Metathesis Catalyzed by Well-Defined Vanadium Alkylidene Complexes." Chemistry—A European Journal 27(14):4578-4582, 2021.

Belov et al. "Synthesis of Vanadium Oxo Alkylidene Complex and Its Reactivity in Ring-Closing Olefin Metathesis Reactions," Organometallics 40:2939-2944, 2021.

Hou, X., et al. "(Arylimido) vanadium (V)-Alkylidene Complexes Containing Fluorinated Aryloxo and Alkoxo Ligands for Fast Living Ring-Opening Metathesis Polymerization (ROMP) and Highly Cis-Specific ROMP." Journal of the American Chemical Society 137(14):4662-4665, 2015.

Kilgore, U. J., et al. "A Transient VIII-Alkylidene Complex: Oxidation Chemistry Including the Activation of N2 to Afford a Highly Porous Honeycomb-Like Framework." Angewandte Chemie International Edition 47(20): 3769-3772, 2008.

Nomura, K., et al. "(Arylimido) vanadium (V)-Alkylidene Complexes as Catalysts for Ring-opening Metathesis Polymerization (ROMP) of Cyclic Olefins: Ligand Design for Exhibiting the High Activity." Chinese Journal of Polymer Science 37(10): 943-950, 2019.

Nomura, K., et al. "Synthesis of vanadium-alkylidene complexes and their use as catalysts for ring opening metathesis polymerization." Dalton Transactions 46(1):12-24, 2017.

Tejeda, G., et al. "Vanadium Imido NHC Complexes for Ring-Closing Olefin Metathesis Reactions." Organometallics 41(4):361-365, 2022.

* cited by examiner

*Primary Examiner* — Kristin A Vajda
(74) *Attorney, Agent, or Firm* — SALIWANCHIK, LLOYD & EISENSCHENK

(57) ABSTRACT

The subject invention provides catalytical compounds/complexes, compositions comprising such compound/complex, synthesis of the compounds/complexes, and methods of using such compounds/complexes as catalysts in, for example, RCM reactions. Specifically, the subject invention provides the synthesis of the first catalytically active V oxo alkylidene, $VO(CHSiMe_3)(PEt_3)_2Cl$, which exhibits superior performance compared to other analogs.

16 Claims, 23 Drawing Sheets

VANADIUM ALKYLIDENE COMPLEX, SYNTHESIS AND USE THEREOF

CROSS-REFERENCE TO A RELATED APPLICATION

This application is a Continuation Application of co-pending U.S. application Ser. No. 17/884,282, filed Aug. 9, 2022, which is incorporated herein by reference in its entirety.

BACKGROUND OF THE INVENTION

Olefin metathesis (OM) is a vital reaction that utilizes heterogeneous and homogeneous transition metal catalysts. Since its discovery, the OM reaction has found numerous applications in total synthesis, industrial processes, pharmaceutical, and material chemistry.

Olefins Conversion Technology (OCT) is one of the most important industrial applications of OM that produces over nine million tons of propylene from ethylene and 2-butenes each year by utilizing silica-supported tungsten oxide ($WO_3/SiO_2$). $WO_3/SiO_2$ has also been employed for the industrial production of 1-hexene and neohexene. Another important process, the Shell Higher Olefin Process (SHOP), produces over a million tons of plasticizers and detergents annually by utilizing $MoO_3/Al_2O_3$ or $Re_2O_7/Al_2O_3$.

Essential well-defined homogeneous catalysts for OM are based on Ru, Mo, and W alkylidene complexes and have been applied in the synthesis of polymers, petrochemicals, agrochemicals, and conversion of low-molecular-weight alkanes to diesel fuel via "alkane metathesis." In addition, some of those catalysts are applied in the eco-friendly conversion of renewable seed oil feedstock into biofuel and linear $\alpha\alpha$-olefins, that are utilized to produce cosmetics, soaps, detergents, polymer additives, and coatings.

Ru, Mo, and W-based homogeneous catalysts are the most prominent due to their high activity and functional group stability. Mo and W oxo species are at the heart of many large-scale processes involving OM, although the precise structure of the active species often remains elusive. In contrast, well-defined W oxo alkylidenes, known for four decades, had limited application in homogenous catalysis due to the higher susceptibility toward bimolecular decomposition than imido complexes.

The transition to more abundant first-row metals, such as Vanadium (V), is desirable due to the low cost, decreased environmental footprint, and reduced toxicity. Additionally, first-row metal alkylidenes can offer a unique reactivity, such as C—H bond activation, which has the potential to be coupled with OM. Although first-row metal alkylidenes can perform the critical steps of OM (cycloaddition and cycloreversion), catalytic systems based on those metals remain underdeveloped.

V is the 20th most abundant element in the Earth's crust. The abundance of V is $\sim 10^2$ times higher compared to Mo and W and $\sim 10^5$ times higher than for Ru. As a result, it is substantially less expensive than the rare metals that are currently used. Additionally, purification, isolation, and recycling of precious metals consume energy and generate a significant amount of waste. Thus, the use of V-based catalysts will make valuable olefins more accessible to consumers.

V alkylidenes are a promising class of compounds that have shown reactivity in OM, especially in ring-opening metathesis polymerization (ROMP) of cyclic olefins. Phosphonium hydrochloride has been used to promote $\alpha$-hydrogen abstraction from V trialkyl complexes $V(NAr)(CHSiMe_3)_3$ to obtain complexes $V(NAr)(CHSiMe_3)L_2Cl$, where Ar is $C_6F_5$, 2,6-$(Me)_2C_6H_3$, or 2,6-$(i$-$Pr)_2C_6H_3$; and L is $PMe_3$, $PEt_3$, or $PPhMe_2$. These complexes are active catalysts in OM and can tolerate various functional groups. These complexes are also capable of performing ring-closing metathesis (RCM) reactions. However, the described complexes have limited stability toward ethylene that precluded a high turnover number (TON) in reactions with terminal olefins, where ethylene is a byproduct.

Two major pathways are known for catalyst deactivation: $\beta$-hydride ($\beta$-H) elimination of metallacyclobutane (MCB) and bimolecular decomposition of metal methylidene. It has been shown that the main decomposition pathway of V-based catalysts is $\beta$-H elimination. Noteworthy, the structure of V catalysts resembles the structure of Mo and W Schrock complexes. Thus, they are $d^0$, high oxidation state complexes with the second multiply bound ligand (imido) in addition to the alkylidene.

V imido alkylidenes have been applied for the olefin metathesis involving internal olefins. However, those complexes found limited application in reactions with terminal olefins due to instability toward ethylene. Thus, there is a need to promote V alkylidene chemistry and develop new highly efficient and selective homogenous well-defined catalysts and reliable V-based OM.

BRIEF SUMMARY OF THE INVENTION

The subject invention provides catalytical compounds/complexes and/or salts thereof, compositions comprising such compound/complex and/or salts thereof, synthesis of the compounds/complexes, and methods of using such compounds/complexes and/or salts thereof as catalysts in, for example, RCM reactions.

In one embodiment, the compound/complex of the subject invention has a general structure of formula (I):

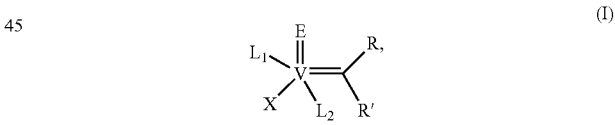

wherein E is NR″, O or S; $L_1$ and $L_2$ are each independently selected from, for example, phosphines, N-heterocyclic carbenes (NHC), pyridines, ethers, thioethers, and nitriles; X is absent or selected from, for example, halogens, alkoxides, thioalkoxides, NCO, NCS, CN, $NO_3$, and pyrrolides; R and R' are each independently selected from, for example, hydrogen, alkyl, substituted alkyl, aryl, substituted aryl, heterocycles, substituted heterocycles, —$OR^a$, —$Si(R^b)_3$ and —$NR^cR^d$, wherein $R^a$, $R^b$, $R^c$ and $R^d$ are independently selected from, for example, hydrogen, alkyl, substituted alkyl, aryl, and substituted aryl; and R″ is selected from, for example, hydrogen, alkyl, substituted alkyl, aryl, substituted aryl, heterocycles, and substituted heterocycles.

In one embodiment, the compound/complex of the subject invention has a structure of (IV):

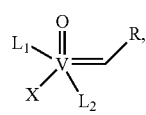
(IV)

wherein L₁ and L₂ are each independently selected from, for example, phosphines, NHC, pyridines, ethers, thioethers, and nitriles; X is absent or selected from, for example, halogens, alkoxides, thioalkoxides, NCO, NCS, CN, NO₃, and pyrrolides; and R is selected from, for example, alkyl, substituted alkyl, aryl, substituted aryl, heterocycles, substituted heterocycles, —OR$^a$, —Si(R$^b$)₃ and —NR$^c$R$^d$, wherein R$^a$, R$^b$, R$^c$ and R$^d$ are independently selected from, for example, hydrogen, alkyl, substituted alkyl, aryl, and substituted aryl.

In one embodiment, the compound/complex of the subject invention has a structure of (V):

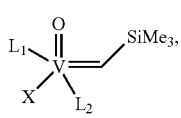
(V)

wherein L₁ and L₂ are each independently selected from phosphines, NHC, pyridines, ethers, thioethers, and nitriles; and X is absent or selected from halogens, alkoxides, thioalkoxides, NCO, NCS, CN, NO₃, and pyrrolides.

In one embodiment, L1 and/or L2 are phosphines having a general structure of P(R₁)(R₂)(R₃), where R₁, R₂, and R₃ are each independently selected from, for example, hydrogen, alkyl, substituted alkyl, aryl and substituted aryl. Preferrably, L1 and/or L2 are PMe₃ or PEt₃.

In one embodiment, L1 and/or L2 are NHCs selected from

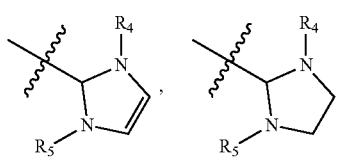

and

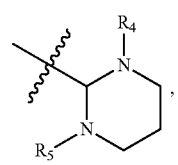

wherein R₄ and R₅ are independently selected from, for example, hydrogen, alkyl, substituted alkyl, cycloalkyl, substituted cycloalkyl, aryl, and substituted aryl.

In one embodiment, L1 and/or L2 are pyridines having a structure of

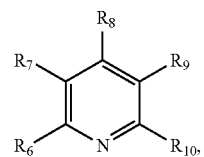

wherein R₆, R₇, R₈, R₉, R₁₀ are each independently selected from, for example, hydrogen, halogens, alkyl, substituted alkyl, hydroxyl, acyl, and —NH₂.

In one embodiment, L1 and/or L2 are nitriles selected from

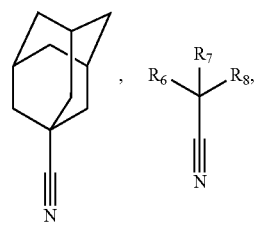

and

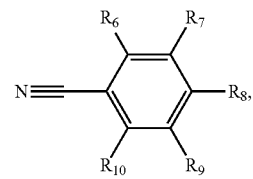

wherein R₆, R₇, R₈, R₉, R₁₀ are each independently selected from, for example, hydrogen, halogens, alkyl, substituted alkyl, hydorxyl, acyl, and —NH₂.

In some embodiments, X is selected from OAd, OPh, OSiPh₃, F, OBu$^t$F₆, NO₃, pyrroyl, SPh, OC₆F₅, CN, NCO, NCS, Cl, Br, OTf, and I. Preferably, X is halogen.

In a specific embodiment, the compound/complex is

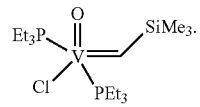

In one embodiment, the subject invention provides a method of synthesizing the compound/complex of the subject invention, the method comprising mixing a trialkylvanadium with an oxidizing agent to form a trialkyloxovanadium; adding one or more neutral ligands and an acid; and adding a compound to provide an anionic ligand.

In a preferred embodiment, the trialkylvanadium is V(CH₂SiMe₃)₃. The oxidizing agent is styrene oxide. The trialkyloxovanadium is VO(CH₂SiMe₃)₃. The one or more neutral ligands are selected from phosphines, NHC, pyridines, and nitriles. The acid is trifluoromethanesulfonic acid. The compound to provide the anionic ligand is BnNEt₃Cl.

In one embodiment, the subject invention also provides a method for synthesizing a compound with an unsaturated ring structure, the method comprising mixing a substrate compound with the composition of the subject invention, wherein the substrate compound is selected from, for example, alkenes, substituted alkenes, heteroalkenes, and substituted heteroalkenes that comprise two terminal double bonds. In a specific embodiment, the substrate compound comprises diallylamine, diallyl sulfide, or diallyl carbonate.

The subject invention provides synthesis of catalytically active V oxo alkylidenes. Preferably, the V oxo alkylidene is $VO(CHSiMe_3)(PEt_3)_2Cl$, which exhibits superior performance compared to the analogous V imido systems.

The subject invention provides a method to access a new class of V catalysts for olefin metathesis. The method includes the protonation of $VO(CH_2SiMe_3)_3$ by $PEt_3*TfOH$ in dichloromethane, followed by the alpha-hydrogen abstraction induced by the coordination of $PEt_3$. Finally, the triflate anion is exchanged for chloride in the presence of $BnNEt_3Cl$ to form $VO(CHSiMe_3)(PEt_3)_2Cl$. The resulting complex is catalytically active and could be modified further for specific applications.

DETAILED DESCRIPTION OF THE INVENTION

Figure 1:
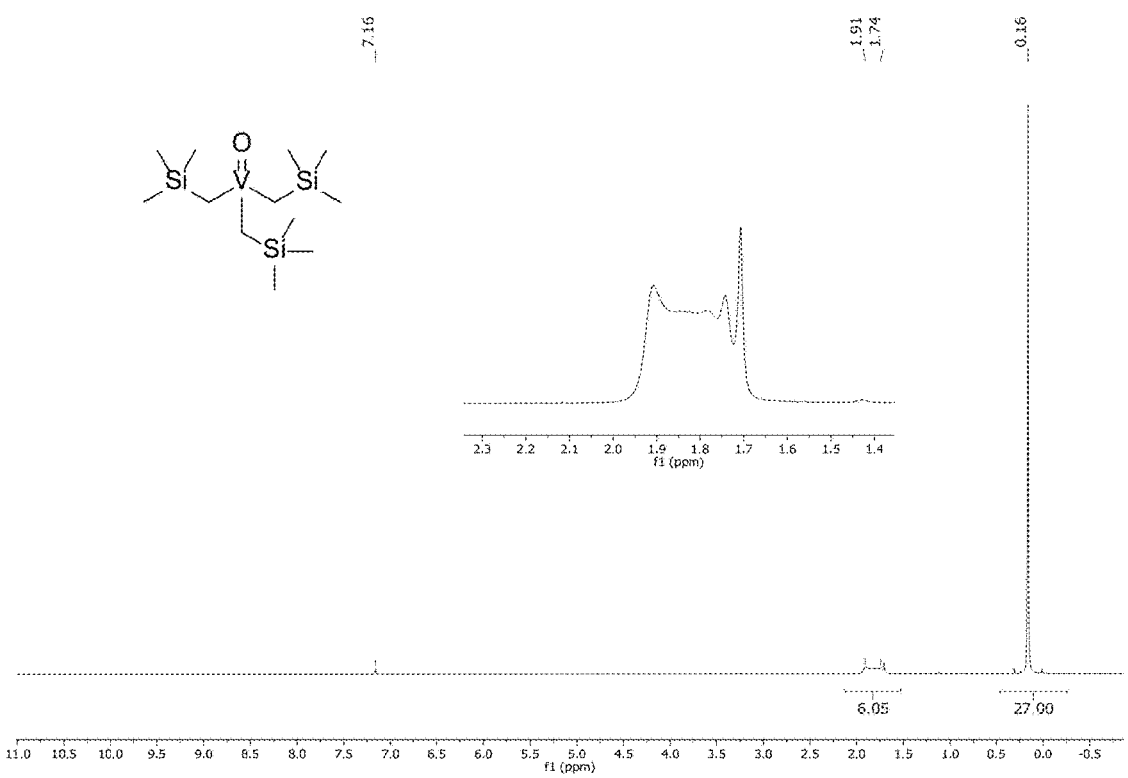
FIG. 1 shows $^1H$ NMR spectrum of 12 ($C_6D_6$, 400 MHz, 24° C.).
Figure 2:
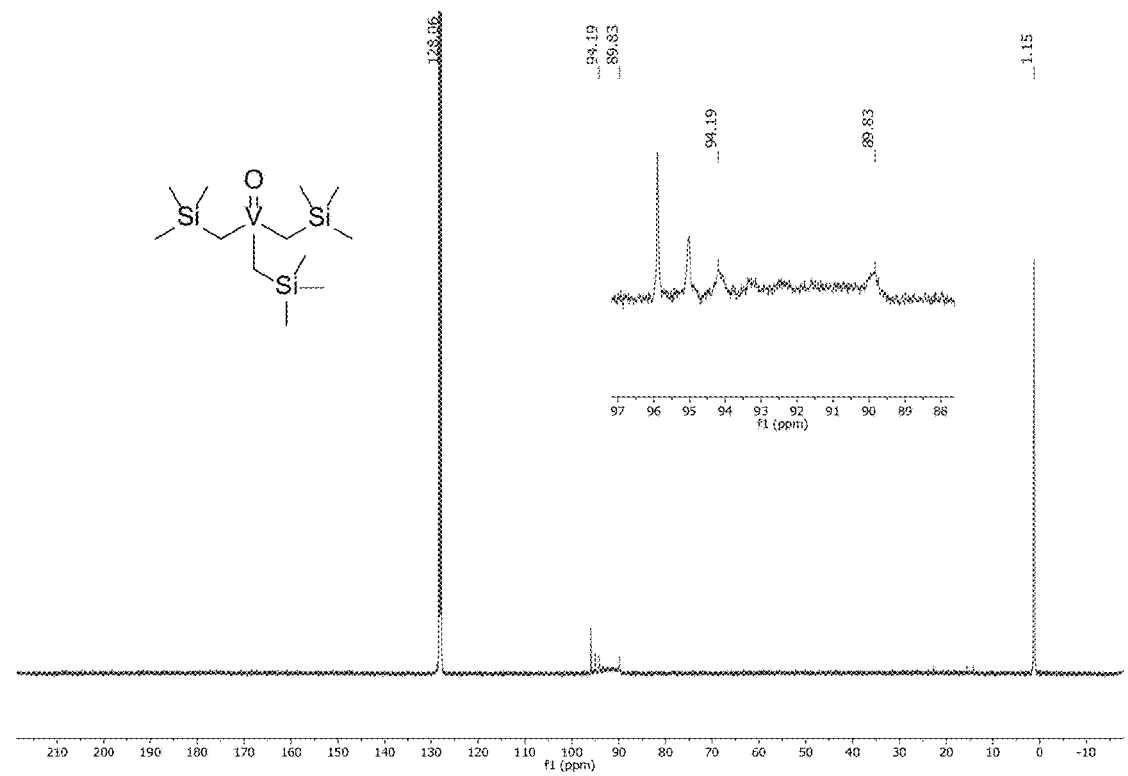
FIG. 2 shows $^{13}C$ NMR spectrum of 12 ($C_6D_6$, 101 MHz, 24° C.).
Figure 3:
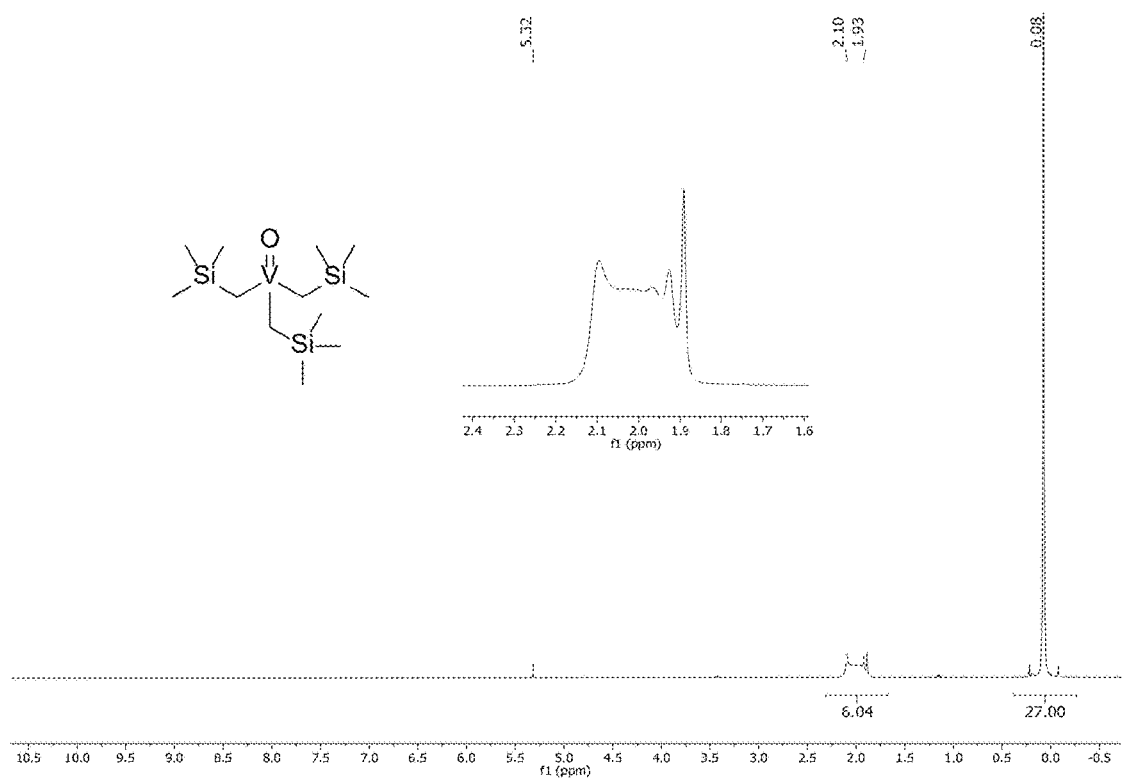
FIG. 3 shows $^1H$ NMR spectrum of 12 ($CD_2Cl_2$, 400 MHz, 24° C.).
Figure 4:
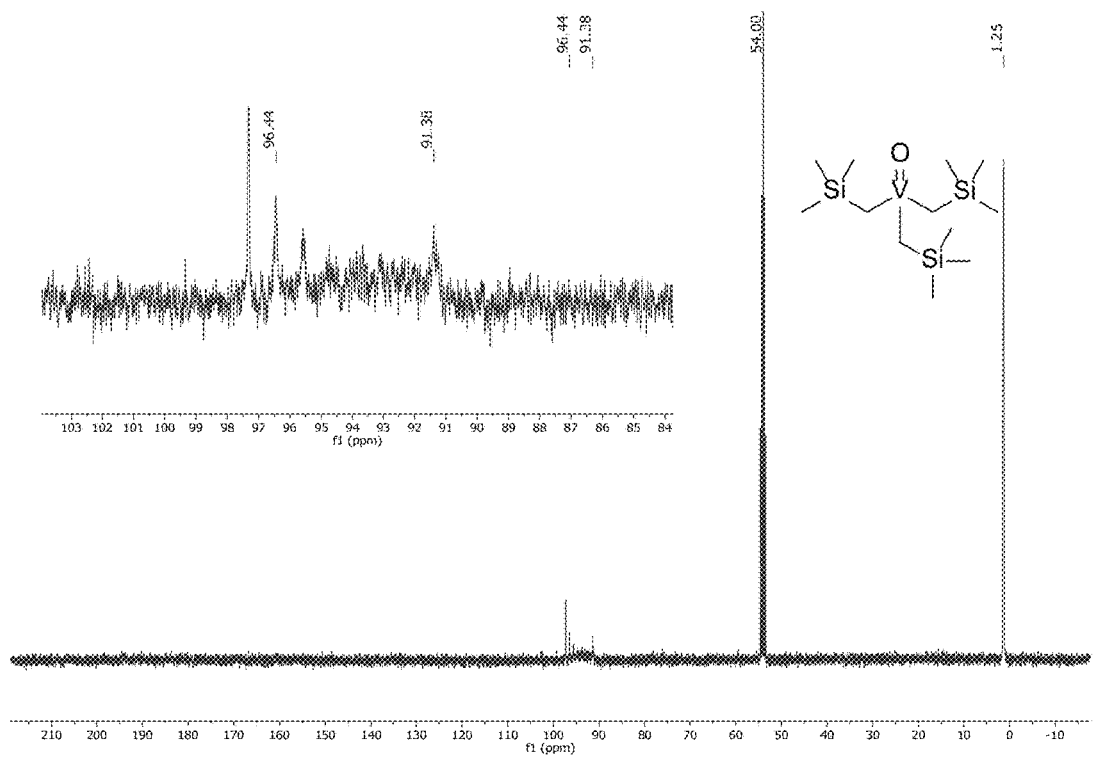
FIG. 4 shows $^{13}C$ NMR spectrum of 12 ($CD_2Cl_2$, 101 MHz, 24° C.).

The subject invention provides catalytical compounds/complexes, and/or salts thereof, compositions comprising such compound/complex and/or salts thereof, synthesis of the compounds/complexes, and methods of using such compounds/complexes and/or salts thereof as catalysts in industrial processes producing commodity and fine chemicals employed in daily life, including plastics, advanced functional materials, household chemicals, agricultural compounds, pharmaceuticals, and many others.

The subject invention provides stable and reactive compounds or complexes for use as reliable catalysts for, for example, olefin metathesis reactions. In one embodiment, the compound or complex is a Vanadium (V)-based compound or complex, preferably, a V alkylidene, which can offer a unique reactivity compared to second- and third-row counterparts.

Specifically, V alkylidenes promote C—H bond activation, which may be coupled with OM. Also, OM and C—H activation reactions are isolobal, e.g., both reactions involve similar frontier orbitals and related transition states. Advantageously, V-based catalysts of the subject invention can exhibit superior performance compared to currently used catalysts.

In one embodiment, the subject invention provides a compound or complex having a general structure of formula (I):

(I)

wherein E is NR", O or S; $L_1$ and $L_2$ are neutral ligands, preferably, each independently selected from, for example, phosphines, NHC, pyridines, nitriles, ethers, thioethers, and substituted thereof; X is absent or an anionic ligand selected from, for example, halogens, alkoxides, thioalkoxides, NCO, NCS, CN, $NO_3$, and pyrrolides; R and R' are each independently selected from, for example, hydrogen, alkyl, substituted alkyl, aryl, substituted aryl, heterocycles, substituted heterocycles, —OR$^a$, —Si(R$^b$)$_3$ and —NR$^c$R$^d$, wherein R$^a$, R$^b$, R$^c$ and R$^d$ are independently selected from hydrogen, alkyl, substituted alkyl, aryl, and substituted aryl, preferably, R is selected from trialkylSi, OAlkyl, OAryl, perfluorinated alkyl and perfluorinated aryl; and R" is selected from, for example, hydrogen, alkyl, substituted alkyl, aryl, substituted aryl, heterocycles, and substituted heterocycles.

In specific embodiments, $L_1$ and $L_2$ are each independently selected from phosphines, NHC, pyridines, ethers, thioethers and nitriles; X is halogen; and R is selected from alkyl, aryl, heterocycles, trialkylSi, OAlkyl, OAryl, and perfluorinated alkyl. In a preferred embodiment, X is Cl; R is SiMe$_3$ and R' is hydrogen.

In one embodiment, the subject invention provides a compound or complex having a general structure of formula (II):

(II)

wherein E is NR", O or S; $L_1$ and $L_2$ are neutral ligands, preferably, each independently selected from, for example, phosphines, NHC, pyridines, nitriles, ethers, thioethers and substituted thereof; X is absent or an anionic ligand selected from, for example, halogens, alkoxides, thioalkoxides, NCO, NCS, CN, $NO_3$, and pyrrolides; R is selected from, for example, alkyl, substituted alkyl, aryl, substituted aryl, heterocycles, substituted heterocycles, —OR$^a$, —Si(R$^b$)$_3$ and —NR$^c$R$^d$, wherein R$^a$, R$^b$, R$^c$ and R$^d$ are independently selected from hydrogen, alkyl, substituted alkyl, aryl, and substituted aryl, preferably, R is selected from trialkylSi, OAlkyl, OAryl, perfluorinated alkyl and perfluorinated aryl; and R" is selected from, for example, hydrogen, alkyl, substituted alkyl, aryl, substituted aryl, heterocycles, and substituted heterocycles.

In one embodiment, the subject invention provides V oxo alkylidene complexes having a general structure of formula (III):

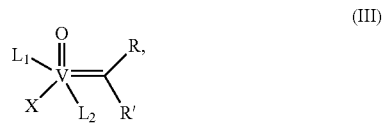
(III)

wherein $L_1$ and $L_2$ are neutral ligands, preferably, each independently selected from, for example, phosphines, NHC, pyridines, nitriles, ethers, thioethers and substituted thereof; X is absent or an ionic ligand selected from, for example, halogens, alkoxides, thioalkoxides, NCO, NCS, CN, $NO_3$, and pyrrolides; and R and R' are independently selected from, for example, alkyl, substituted alkyl, aryl, substituted aryl, heterocycles, substituted heterocycles, —OR$^a$, —Si(R$^b$)$_3$ and —NR$^c$R$^d$, wherein R$^a$, R$^b$, R$^c$ and R$^d$ are independently selected from hydrogen, alkyl, substituted alkyl, aryl, and substituted aryl, preferably, R is selected from trialkylSi, OAlkyl, OAryl, perfluorinated alkyl and perfluorinated aryl.

The E group, e.g., the oxo ligand or imido ligand, is necessary to stabilize transition metals in their high oxidation states by extensive π-donation. However, the relatively small oxo ligand can bridge between two metal centers and encourage bimolecular decomposition, which may discourage the development of oxo alkylidenes.

The subject invention provides strategies that can avoid such bimolecular decomposition. The first strategy is introducing disubstituted alkylidene to increase the steric protection around a metal center. Noteworthy, the resulting complexes are of interest from a fundamental standpoint. Thus, disubstituted alkylidenes are essential intermediates in the synthesis of tri- and tetrasubstituted olefins. The second and third approaches are modifications in the size and electronic properties of neutral and anionic ligands. Another essential feature of an oxo ligand is the ability to coordinate Lewis acids, which lowers the oxo ligand's donor ability to the metal, increases electrophilicity of the metal center, and results in higher OM activity.

In one embodiment, the subject invention provides V oxo alkylidene complexes having a general structure of formula (IV):

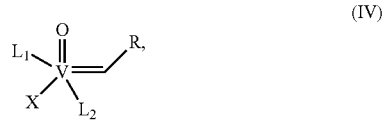

(IV)

wherein $L_1$ and $L_2$ are neutral ligands, preferrably, each independently selected from, for example, phosphines, NHC, pyridines, nitriles, ethers, thioethers and substituted thereof; X is absent or an ionic ligand selected from, for example, halogens, alkoxides, thioalkoxides, NCO, NCS, CN, $NO_3$, and pyrrolides; and R is selected from, for example, alkyl, substituted alkyl, aryl, substituted aryl, heterocycles, substituted heterocycles, —$OR^a$, —$Si(R^b)_3$ and —$NR^cR^d$, wherein $R^a$, $R^b$, $R^c$ and $R^d$ are independently selected from hydrogen, alkyl, substituted alkyl, aryl, and substituted aryl, preferrably, R is selected from trialkylSi, OAlkyl, OAryl, perfluorinated alkyl and perfluorinated aryl.

In preferred embodiments, $L_1$ and $L_2$ are each independently selected from phosphines, NHC, pyridines, ethers, thioethers and nitriles; X is halogen; and R is selected from alkyl, aryl, heterocycles, trialkylSi, OAlkyl, OAryl, and perfluorinated alkyl. In a preferred embodiment, X is Cl; R is $SiMe_3$ and R' is hydrogen.

In one embodiment, the subject invention provides V oxo alkylidene complexes having a general structure of formula (V):

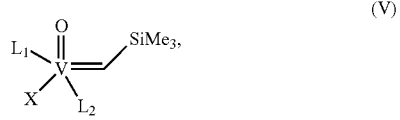

(V)

wherein $L_1$ and $L_2$ are neutral ligands, preferrably, each independently selected from, for example, phosphines, NHC, pyridines, nitriles, ethers, thioethers and substituted thereof; and X is an ionic ligand selected from, for example, halogens, alkoxides, thioalkoxides, NCO, NCS, CN, $NO_3$, and pyrrolides.

In specific embodiments, $L_1$ and $L_2$ are each independently phosphines having a general structure of $P(R_1)(R_2)(R_3)$, where $R_1$, $R_2$, and $R_3$ are each independently selected from hydrogen, alkyl, substituted alkyl, aryl and substituted aryl. In a preferred embodiment, $L_1$ and/or $L_2$ are $PMe_3$ or $PEt_3$.

In some embodiments, NHCs can be saturated or unsaturated NHCs. In a specific embodiment, the NHC is

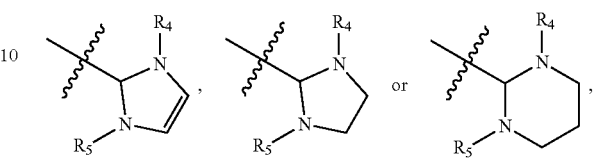

wherein $R_4$ and $R_5$ are independently selected from hydrogen, alkyl, substituted alkyl, cycloalkyl, substituted cycloalkyl, aryl, and substituted aryl.

The NHC is a neutral ligand having high α-donating abilities and controllable steric properties, which can prevent β-H elimination and bimolecular decomposition. Also, NHC complexes may be utilized to prepare air-stable, highly active, selective, and functional group tolerant metal alkylidenes. Saturated NHC ligands are better σ-donors than their unsaturated counterparts, that can affect catalytic activity. Thus, larger NHCs maybe preferred for small oxo V complexes.

In certain embodiments, pyridines have a structure of

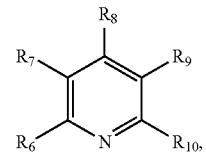

wherein $R_6$, $R_7$, $R_8$, $R_9$, $R_{10}$ are each independently selected from, for example, hydrogen, halogens, alkyl, substituted alkyl, hydorxyl, acyl, and —$NH_2$.

Using pyridine as a ligand that readily dissociates during the initiation step is an attractive method to prepare active catalysts. The variation of substituents can easily control the binding constant of pyridine derivatives (Py). Also, pyridine is a relatively small ligand. As a result, pyridine-containing alkylidenes can accommodate larger NHC or anionic ligands X than phosphine-containing counterparts.

In certain embodiments, nitriles are selected from, for example

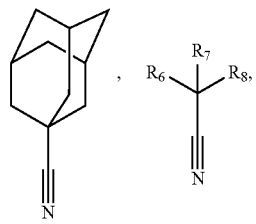

and

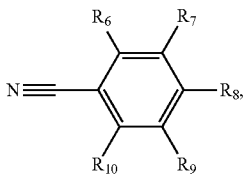

wherein $R_6$, $R_7$, $R_8$, $R_9$, $R_{10}$ are each independently selected from hydrogen, halogens, alkyl, substituted alkyl, alkoxides, aryl, substituted aryl, hydorxyl, acyl, and —$NH_2$.

The anionic ligand (X) is the essential part of the catalysts that affects its activity, selectivity, and stability. Bulky anionic groups can be introduced for V oxo complexes to limit bimolecular decomposition. The ligand donor parameter (LDP) can be used to compare electronic properties (smaller LDP corresponds to more electron-donating X) and the buried volume parameter (% Vbur, 3.5 Å) can be used to estimate steric properties of anionic ligands (Table 1).

TABLE 1

Electronic and steric properties of anionic ligands.

| ligand | LDP | % $V_{bur}$, 3.5 Å |
|---|---|---|
| OAd | 10.83 | 21.4 |
| OPh | 12.38 | 18.6 |
| OSiPh₃ | 13.28 | 22.2 |
| F | 13.39 | 11.9 |
| OBu$^t_{F6}$ | 13.89 | 23.6 |
| NO₃ | 14.15 | 19.7 |
| pyrrolyl | 14.16 | 20.4 |
| SPh | 14.22 | 21.2 |
| OC₆F₅ | 14.32 | 20.9 |
| CN | 14.40 | 16.7 |
| NCO | 14.51 | 13.4 |
| NCS | 14.86 | 13.5 |
| Cl | 15.05 | 16.8 |
| Br | 15.45 | 18.1 |
| OTf | 15.75 | 21.6 |
| I | 15.80 | 19.2 |

Electron-withdrawing abilities and atom size increase in the row F<Cl<Br<I. Therefore, the use of Br, I, and electron-withdrawing sulfonates (OTf, $OSO_2Ar$) paired with bulky NHC can be beneficial for V oxo complexes to increase activity and prevent bimolecular decomposition.

In a specific embodiment, the compound/complex of the subject invention is

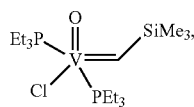

which includes syn/anti isomers. In a further embodiment, the compound/complex of the subject invention is a mixture of syn/anti isomers. The syn and anti isomers in the mixture are at a ratio of at least 1:1, 2:1, 3:1, 4:1, 5:1, 6:1, 7:1, 8:1, 9:1, 10:1, 11:1, 12:1, 13:1, 14:1, 15:1, 16:1, 17:1, 18:1, 19:1, 20:1, 21:1, 22:1, 23:1, 24:1, 25:1, 26:1, 27:1, 28:1, 29:1, 30:1, 31:1, 32:1, 33:1, 34:1, 35:1 or any ratio in between. In a specific embodiment, the syn and anti isomers in the mixture are at a ratio of 97:3.

In a preferred embodiment, the compound/complex of the subject invention is

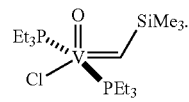

In one embodiment, the subject invention provides a composition comprising the V-based compound or complex of the subject invention.

In one embodiment, the composition further comprises a carrier, diluent, or excipient with which the V-based compound or complex can be formulated or dissolved. The carriers, diluents or excipients may include, for example, aqueous vehicles, non-aqueous vehicles, stabilizers, and solubility enhancers. In a specific embodiment, the carrier, diluent or excipient may be a solvent, e.g., an organic solvent such as toluene, pentane, or ether.

In one embodiment, the V-based compound or complex of the subject invention is in a solid form or a liquid form when dissolved in a solvent.

In a specific embodiment, the subject invention provides a composition comprising

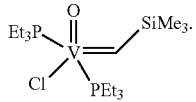

In a specific embodiment, the subject invention provides a composition comprising

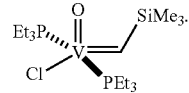

In specific embodiments, the solvent is selected from, for example, $CDCl_3$, $CD_2Cl_2$, $C_6D_6$, toluene, $C_6H_5F$, THF, ether, DME, and pentane.

In one embodiment, the subject invention provides V imido alkylidene complexes having a general structure of formula (VI):

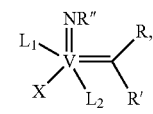

(VI)

wherein $L_1$ and $L_2$ are neutral ligands, preferably, each independently selected from, for example, phosphines, NHC, pyridines, nitriles, ethers, thioethers and substituted thereof; X is absent or an ionic ligand selected from, for example, halogens, alkoxides, thioalkoxides, NCO, NCS, CN, $NO_3$, and pyrrolides; and and R and R' are independently selected from, for example, alkyl, substituted alkyl, aryl, substituted aryl, heterocycles, substituted heterocycles, —$OR^a$, —$Si(R^b)_3$ and —$NR^cR^d$, wherein $R^a$, $R^b$, $R^c$ and $R^d$ are independently selected from hydrogen, alkyl, substituted alkyl, aryl, and substituted aryl, preferably, R is selected from trialkylSi, OAlkyl, OAryl, perfluorinated alkyl and perfluorinated aryl.

In one embodiment, R" is selected from, for example, hydrogen, alkyl, substituted alkyl, aryl, substituted aryl, heterocycles, and substituted heterocycles. In specific embodiments, NR" is selected from, for example,

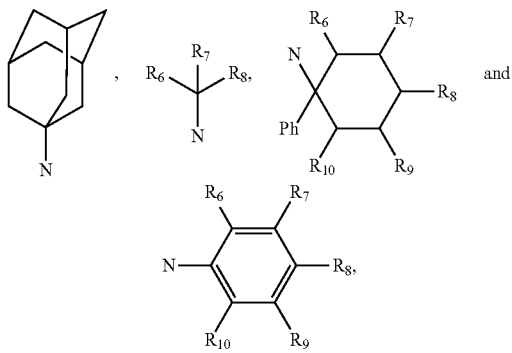

wherein $R_6$, $R_7$, $R_8$, $R_9$, $R_{10}$ are each independently selected from hydrogen, halogens, alkyl, substituted alkyl, alkoxides, aryl, substituted aryl, hydorxyl, acyl, and —$NH_2$, preferably, $R_6$, $R_7$, $R_8$, $R_9$, $R_{10}$ are each independently selected from hydrogen, halogens, OMe, Me, Et, i-Pr, Cy, Ph, and $CF_3$.

In a specific embodiment, X is absent, and the compound/compound is positively charged having the structure of formula (VII):

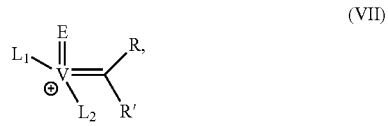

wherein E is NR", O or S; $L_1$ and $L_2$ are neutral ligands, preferably, each independently selected from, for example, phosphines, NHC, pyridines, nitriles, ethers, thioethers, and substituted thereof; R and R' are each independently selected from, for example, hydrogen, alkyl, substituted alkyl, aryl, substituted aryl, heterocycles, substituted heterocycles, —$OR^a$, —$Si(R^b)_3$ and —$NR^cR^d$, wherein $R^a$, $R^b$, $R^c$ and $R^d$ are independently selected from hydrogen, alkyl, substituted alkyl, aryl, and substituted aryl, preferably, R is selected from trialkylSi, OAlkyl, OAryl, perfluorinated alkyl and perfluorinated aryl; and R" is selected from, for example, hydrogen, alkyl, substituted alkyl, aryl, substituted aryl, heterocycles, and substituted heterocycles.

In one embodiment, the subject invention provides a method for synthesizing the compounds or complex of the subject invention. The method provides strategies to rationally address the stability and reactivity of V alkylidenes to develop reliable catalysts for olefin metathesis reactions.

One approach to increase asymmetry is to exchange one anionic ligand to a weakly-coordinating anion in the presence of a neutral ligand or remove the anionic ligand to form a cationic alkylidene complex. In contrast, alkylidene complexes based on d0 M(V) transition metals (group 5 elements: V, Nb, Ta) containing oxo ligand, anionic ligand, and neutral ligand have the required asymmetry naturally.

The subject invention provides synthesis of catalytically active V oxo alkylidenes. Preferably, the V oxo alkylidene is $VO(CHSiMe_3)(PEt_3)_2Cl$, which exhibits superior performance compared to the analogous V imido systems.

In one embodiment, the subject invention provides a method to access a new class of V catalysts for olefin metathesis. The method comprises the oxidization of a V(III) compound to a V(V) oxo compound by an oxidizing agent such as styrene oxide, propylene oxide and trimethylamine oxide, the protonation of the V(V) oxo compound with one or more neutral ligands in the presence of an acid, or with one or more neutral ligands in a salt form, the alpha-hydrogen abstraction induced by the coordination of the one or more neutral ligands, and the exchange for an anionic ligand to form the V oxo alkylidene.

In a specific embodiment, the V(III) compound is a trialkylvanadium and the V(V) oxo compound is trialkyloxovanadium.

In one embodiment, the method for synthesizing the V catalyst of the subject invention comprises: mixing a trialkylvanadium with an oxidizing agent to form a trialkyloxovanadium; adding one or more neutral ligands and an acid, or adding a salt of the one or more neutral ligands; and adding a compound to provide an anionic ligand.

In one embodiment, the method for synthesizing the V catalyst of the subject invention comprises: mixing a trialkylvanadium with an oxidizing agent to form a trialkyloxovanadium; adding a mixture of one or more neutral ligands and an acid; adding one or more neutral ligands in a solvent; and adding a compound to provide an anionic ligand.

In a specific embodiment, the trialkylvanadium is $V(CH_2SiMe_3)_3$. The trialkyloxovanadium is $VO(CH_2SiMe_3)_3$. The oxidizing agent is styrene oxide, propylene oxide or trimethylamine oxide. The one or more neutral ligands are selected from, for example, phosphines, NHC, pyridines, ethers, thioethers and nitriles. The acid is trifluoromethanesulfonic acid, triethylphosphonium triflate or HCL. The anionic ligand donor is $BnNEt_3Cl$.

In a preferred embodiment, the neutral ligand is triethylphosphine.

In one embodiment, the method for synthesizing the V catalyst of the subject invention comprises: providing a trialkyloxovanadium; adding one or more neutral ligands and triethylphosphonium triflate, or adding a salt of the one or more neutral ligands; and adding a compound to provide an anionic ligand.

In one embodiment, the method for synthesizing the V catalyst of the subject invention comprises: providing a trialkyloxovanadium; adding a mixture of one or more neutral ligands and triethylphosphonium triflate, or adding a salt of the one or more neutral ligands; adding one or more neutral ligands in a solvent; and adding a compound to provide an anionic ligand.

In one embodiment, the method for synthesizing the V catalyst of the subject invention comprises 1) mixing $VO(CH_2SiMe_3)_3$ with one or more neutral ligands, e.g., $L_1$ and $L_2$, in the presence of an acid to form a V oxo compound comprising an anion from the acid, wherein the step 1) further occurs in the presence of a solvent, and the acid is triflic acid, or triethylphosphonium triflate; 2) adding a donor of an anionic ligand, which leads to the exchange of the anion, e.g., triflate anion, with the anionic ligand (e.g., chloride ligand), preferably, the donor of the anionic ligand being any quaternary ammonium salt chlorides, more preferably, the donor of the anionic ligand being BnNEt₃Cl.

In one embodiment, the method for synthesizing the compound of the subject invention comprises the protonation of VO(CH₂SiMe₃)₃ by PEt₃*TfOH in dichloromethane, the alpha-hydrogen abstraction induced by the coordination of PEt₃, and the exchange of the triflate anion for chloride in the presence of BnNEt₃Cl to form VO(CHSiMe₃)(PEt₃)₂Cl. The resulting complex is catalytically active and could be modified further for specific applications.

In a specific embodiment, the method for synthesizing a V catalyst comprising mixing VO(CH₂SiMe₃)₃ with PEt₃*TfOH; and adding BnNEt₃Cl.

In a specific embodiment, the method for synthesizing a V catalyst comprising mixing VO(CH₂SiMe₃)₃ with PEt₃*TfOH; adding PEt₃ and CH₂Cl₂; and adding BnNEt₃Cl.

In one embodiment, the subject invention provides a method for synthesizing a cationic V-based compound/complex, the method comprising providing a V-based compound/complex of the subject invention; and adding BArF salts.

In one embodiment, the subject invention provides a method of using the V-based compound or complex of the subject invention in an RCM reaction, the method comprising contacting/mixing an RCM substrate with the V-based compound or complex of the subject invention or the composition comprising the V-based compound or complex of the subject invention. The RCM substrate refers to a diene that can form a cyclic structure. Preferably, the diene can form a 5-membered ring or higher, e.g., 6-, 7- or 8-membered ring.

In one embodiment, the subject invention provides a method for synthesizing a compound with an unsaturated ring structure (e.g., converting from an open-ring to a closed-ring structure), the method comprising mixing a substrate compound with the composition of the subject invention, wherein the substrate compound is, for example, alkenes, substituted alkenes, heteroalkenes, and substituted heteroalkenes that comprise two or more double bonds. In the presence of the catalyst of the subject invention, two terminal alkenes of the substrate compound form an unsaturated ring structure.

In a specific embodiment, the substrate compound comprises diallylamine, diallyl sulfide, or diallyl carbonate.

In one embodiment, the subject invention provides a method for synthesizing a compound with a ring structure (e.g., converting from an open-ring to a closed-ring structure), the method comprising mixing said compound with the compound/complex of the subject invention in a solvent, wherein said compound is, for example, alkenes, substituted alkenes, heteroalkenes, and substituted heteroalkenes that comprise two or more double bonds.

In specific embodiments, the solvent is selected from, for example, CDCl₃, CD₂Cl₂, C₆D₆, toluene, C₆H₅F, THF, ether, DME, and pentane.

In specific embodiment, the RCM substrate is selected from, for example, (17)

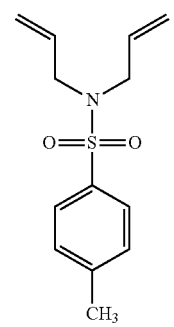

S3

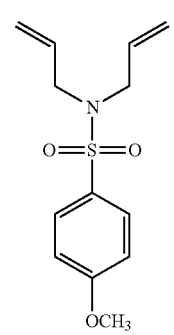

S4

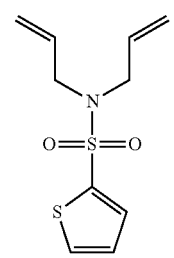

S5

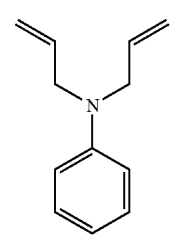

S6

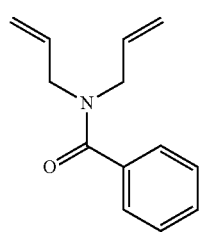

S7

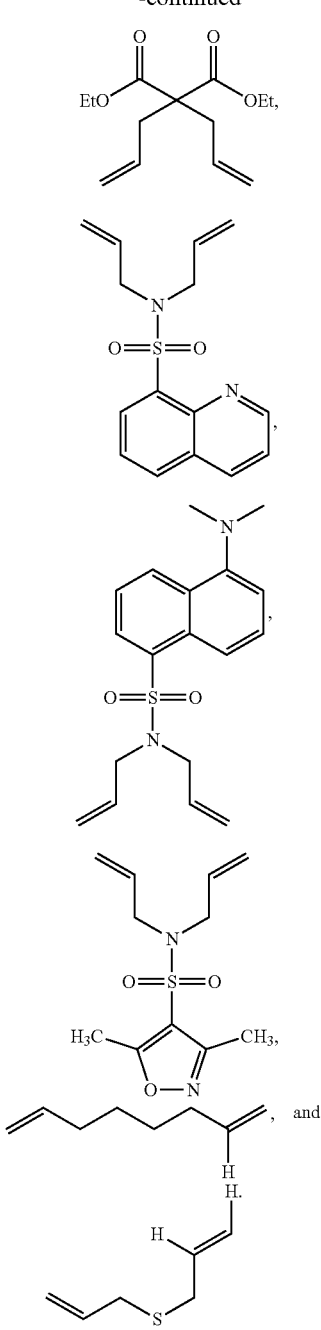

In one embodiment, the compound/complex of the subject invention is used at a concentration of, for example, about 0.1 mol % to about 25 mol %, about 0.2 mol % to about 25 mol %, about 0.5 mol % to about 25 mol %, about 0.5 mol % to about 20 mol %, about 0.5 mol % to about 15 mol %, about 1 mol % to about 20 mol %, about 1 mol % to about 15 mol %, about 1 mol % to about 10 mol %, about 2 mol % to about 15 mol %, about 2 mol % to about 10 mol %, about 2 mol % to about 8 mol %, or about 1 mol % to about 5 mol %.

In one embodiment, the V alkylidenes of the subject invention may be used to 1) the synthesis of advanced materials, e.g., functional conjugated polymers; 2) the conversion of renewable oil feedstock (e.g., fatty acid esters) to the valuable olefins; 3) the conversion of low-molecular-weight alkanes to diesel fuel; and 4) the development of heterogeneous catalysts for industrial applications.

In one embodiment, V alkylidenes of the subject invention may be used to the C—H activation of alkanes to develop unique tandem C—H activation/olefin metathesis transformations and to activate electron-deficient olefins containing perfluoroalkyl groups.

In one embodiment, the catalysts of the subject invention may be applied in the eco-friendly conversion of renewable seed oil feedstock into biofuel and linear αα-olefins, that are utilized to produce cosmetics, soaps, detergents, polymer additives, and coatings.

Acyclic diene metathesis (ADMET) allows the synthesis of advanced materials, such as electroactive, conjugated, liquid-crystalline, telechelic, hyperbranched, and biorenewable polymers that have found numerous applications. The reverse process, the depolymerization of unsaturated polymers in the presence of olefins, is an attractive method to convert polymers to valuable olefins or other polymers. The catalysts of the subject invention may be used to synthesize conjugated polymers that find use in the fabrication of optoelectronic and electrochemical devices.

In one embodiment, the subject invention provides methods of use of the V-based compounds/complexes of the subject invention for ring-opening metathesis polymerization (ROMP) and cross-metathesis.

In one embodiment, the subject invention provides a method for ring-opening metathesis polymerization of cycloalkenes, the method comprising mixing the cycloalkenes with the V-based catalyst of the subject invention.

In one embodiment, the subject invention provides a method for synthesizing conjugated polymers, the method comprising mixing the monomer of alkenes with the V-based catalyst of the subject invention.

In one embodiment, the subject invention provides a kit comprising the V-based compound or complex of the subject invention. The kit may further comprise a solvent, a container, and an instruction for use the V-based compound or complex.

As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." The transitional terms/phrases (and any grammatical variations thereof) "comprising," "comprises," and "comprise" can be used interchangeably; "consisting essentially of," and "consists essentially of" can be used interchangeably; and "consisting," and "consists" can be used interchangeably.

The transitional term "comprising," "comprises," or "comprise" is inclusive or open-ended and does not exclude additional, unrecited elements or method steps. By contrast, the transitional phrase "consisting of" excludes any element, step, or ingredient not specified in the claim. The phrases "consisting" or "consists essentially of" indicate that the claim encompasses embodiments containing the specified materials or steps and those that do not materially affect the basic and novel characteristic(s) of the claim. Use of the term "comprising" contemplates other embodiments that "consist" or "consisting essentially of" the recited component(s).

When ranges are used herein, such as for dose ranges, combinations and subcombinations of ranges (e.g., subranges within the disclosed range), specific embodiments therein are intended to be explicitly included.

The term "about" or "approximately" means within an acceptable error range for the particular value as determined by one of ordinary skill in the art, which will depend in part on how the value is measured or determined, i.e., the limitations of the measurement system. For example, "about" can mean within 1 or more than 1 standard deviation, per the practice in the art. Alternatively, "about" can mean a range of up to 0-20%, 0 to 10%, 0 to 5%, or up to 1% of a given value. Where particular values are described in the application and claims, unless otherwise stated the term "about" meaning within an acceptable error range for the particular value should be assumed.

Unless otherwise defined, all terms of art, notations and other scientific terms or terminology used herein are intended to have the meanings commonly understood by those of skill in the art to which this invention pertains. In some cases, terms with commonly understood meanings are defined herein for clarity and/or for ready reference, and the inclusion of such definitions herein should not necessarily be construed to represent a substantial difference over what is generally understood in the art. It will be further understood that terms, such as those defined in commonly used dictionaries, should be interpreted as having a meaning that is consistent with their meaning in the context of the relevant art and/or as otherwise defined herein.

EXAMPLES

General Experimental Details

All air- and moisture-sensitive materials were manipulated in a nitrogen-filled MBraun glovebox or on a dual-manifold Schlenk line. All glassware was dried in an oven prior to use (160° C.). Tetrahydrofuran (THF), diethyl ether, iPr$_2$O, pentane, and toluene were distilled from Na/benzophenone under nitrogen and stored under 3 Å molecular sieves in the glovebox. CH$_2$Cl$_2$ was distilled over CaH$_2$ under nitrogen and stored under 3 Å molecular sieves in the glovebox. CDCl$_3$, CD$_2$Cl$_2$, C$_6$D$_6$ and tol-d$_8$ were dried over 3 Å molecular sieves in the glovebox. $^1$H NMR spectra were obtained on Bruker 400 MHz spectrometers, and $^{13}$C NMR spectra were obtained on 101 MHz machines. Chemical shifts for $^1$H and $^{13}$C spectra are reported as parts per million and referenced to the residual $^1$H or $^{13}$C resonances of the deuterated solvent ($^1$H δ: C$_6$D$_6$ 7.16, CDCl$_3$ 7.26; CD$_2$Cl$_2$ 5.32, $^{13}$C δ: C$_6$D$_6$ 128.06, CDCl$_3$ 77.16, CD$_2$Cl$_2$ 54.00). All NMR data is reported as follows: chemical shift, multiplicity (s=singlet, d=doublet, t=triplet, q=quartet, br=broad, m=multiplet), and coupling constants (Hz), integration. Ultra-High Resolution MS analysis was conducted on a Bruker Solarix FT-ICR-MS instrument operated under positive (+) ion mode equipped with an ESI source. Spectra were internally calibrated utilizing Agilent ESI-L with 3 calibration points, allowing a mass error of <1 ppm with standard deviation of 0.057 ppm.

Starting Materials

Reagents were purchased at the highest commercial quality and used without further purification unless otherwise stated. Vanadium (III) chloride (97%), Styrene oxide (97+%), Hydrogen chloride (1N solution in diethyl ether) was purchased from Acros Organics (trimethylsilyl)methylmagnesium chloride (1M solution in diethyl ether), diallylamine (>98.0%), 4-methoxynenzenesulfonyl chloride (>98%), trifluoromethanesulfonic acid (>98%) were purchased from TCI America. p-toluenesulfonyl chloride, dansyl chloride (96%), sodium hydride were purchased from Alfa Aesar. 4-Dimethylaminopyridine was purchased from Oakwood chemicals. Triethylphosphine were purchased from Strem Chemical Inc. 3,5-dimethylisoxazole-4-sulfonyl chloride (98%), 8-quinolinsulfonyl chloride (98%) were purchased Combi-Blocks. Triethylamine was purchased from Fisher chemical. Thiophene-2-sulfonyl chloride (96%) was purchased from Matrix Scientific.

Experimental Details ((CH$_3$)$_3$SiCH$_2$)$_3$VO (12).

VCl$_3$ (1.00 g 6.36 mmol) was suspended in THF (64 mL) and reaction mixture was stirred at 60° C. for ~24 h to get a pink solution. The flask was transferred to a freezer (−35° C.) for several hours (during this time most of VCl$_3$(THF)$_3$ (8) precipitated from solution). The flask was transferred from a freezer and TMSCH$_2$MgCl (3; 1 M solution in ether, 19.7 mL, 19.7 mmol, 3.1 equiv) was added in the course of ~1-2 min to a vigorously stirred suspension (during the addition pink color changes to dark violet). The reaction mixture was stirred for 5 minutes at room temperature (to ensure dissolution of all material) and transferred to a freezer (−35° C.) for several hours (or overnight). The solvent was evaporated, and the residue was extracted with ether (3×50 mL) and filtered from inorganic material. Ether was evaporated to give (TMSCH$_2$)$_3$V*THF as a violet solid.

(TMSCH$_2$)$_3$V*THF was dissolved in toluene (200 mL, high dilution is important, attempts to increase concentration results in decreased yield) and styrene oxide (2.19 mL, 19.1 mmol, 3.0 equiv.) was added in a single portion (after addition quick change of color to green followed by slow change of color to yellow). The solution was heated to reflux for a short period of time (~1 min) cooled to room temperature and left overnight. Toluene was evaporated (warming to 40-50° C. is acceptable to increase the rate of evaporation). Pentane (100 mL) was added to the residue and the mixture was thoroughly stirred with spatula. White precipitate (polymer from styrene oxide) was filtered and washed with additional amount of pentane (2×50 mL). Pentane was evaporated and the residue was dissolved in a hot ether (12-15 mL), solution was filtered through syringe filter to a vial and transferred to a freezer (−35° C.). (TMSCH$_2$)$_3$VO (VO(CH$_2$SiMe$_3$)$_3$) (12) was precipitated as bright yellow needles. The precipitate was filtered off and washed with cold (~35° C.) ether (2×5 mL) and dried in vacuum. Additional product can be recovered by concentration of filtrate to ⅓ to ⅕ of a volume. M=1.057 g (51%).

The product is very light sensitive (80% decomposition was observed after 72 hours at RT in transparent vial). Compound was stored in a glovebox freezer (−35° C.) in a vial wrapped in aluminum foil. Surprisingly, the yield was not affected when the reaction mixture was protected from light.

TMSCH$_2$Li (2) can be used in the reaction instead of TMSCH$_2$MgCl (3), but the yield was reduced by ~15%. It is possible that LiCl cannot be completely separated from reaction mixture, and it interferes with the oxidation step.

The NMR spectra of 12 are shown in FIGS. 1-4.

$^1$H NMR: (C$_6$D$_6$, 400 MHz) δ=0.16 (s, 27H), 1.74-1.91 (br., 6H).

$^{13}$C NMR: (C$_6$D$_6$, 100 MHz) δ=1.2, 89.8-94.2 (br.).

$^1$H NMR: (CD$_2$Cl$_2$, 400 MHz) δ=0.08 (s, 27H), 1.93-2.10 (br., 6H).

$^{13}$C NMR: (CD$_2$Cl$_2$, 100 MHz) δ=1.3, 91.4-96.4 (br.).

ClVO(PEt$_3$)$_2$CHSi(CH$_3$)$_3$ (14)

Figure 5:
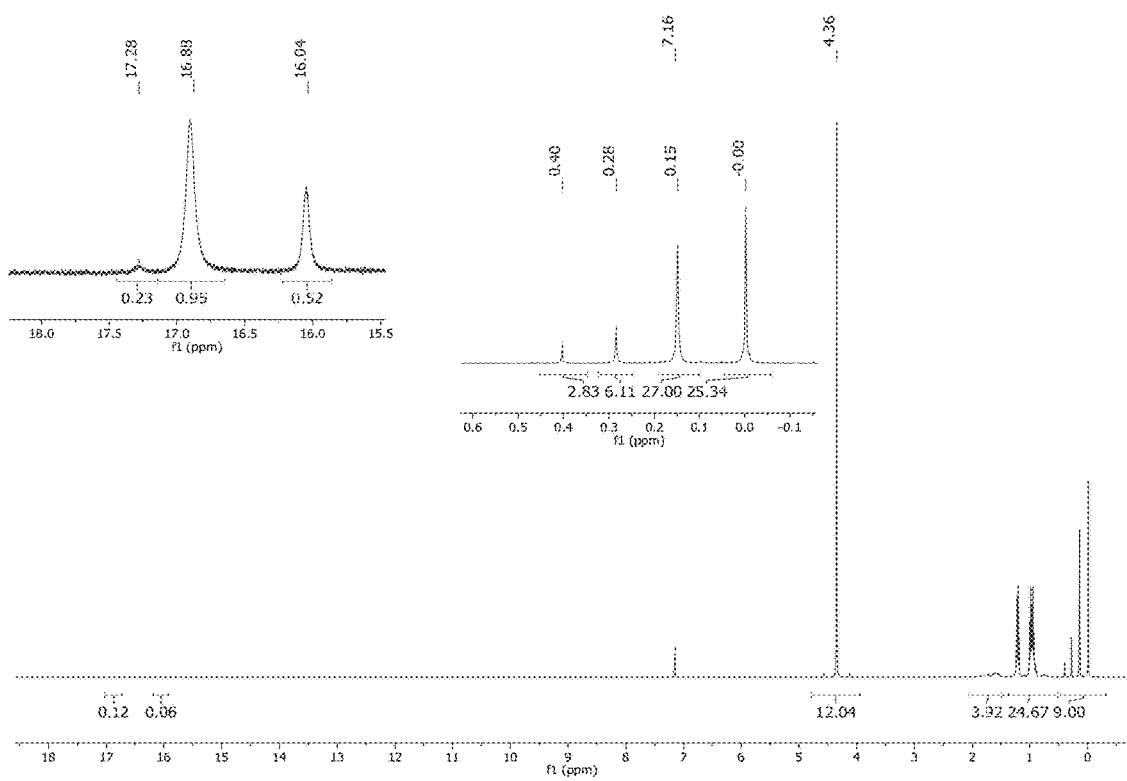
FIG. 5 shows the characteristic signals in $^1H$ NMR spectrum used to monitor the progress conversion of 12 to 13+14 ($C_6D_6$, 400 MHz, 24° C.).

(TMSCH$_2$)$_3$VO (12; 753 mg, 2.29 mmol) was placed in a 20 mL vial with a stirring bar. Cold solid Et$_3$P*TfOH (738 mg, 2.75 mmol, 1.2 equiv) was added followed by Et$_3$P (1.69 mL, 11.46 mmol, 5 equiv) and CH$_2$Cl$_2$ (3.0 mL). The vial was protected from light using aluminum foil and stirred for ~6 days at room temperature. The progress of the reaction was occasionally checked by $^1$H NMR (sample ~50 µL of reaction mixture was dissolved in 1 mL of $C_6D_6$) (FIG. 5). Characteristic chemical shifts of TMS groups: starting material 0.15 ppm, $(CH_3)_4Si$ 0.00 ppm, TfO-V=CHTMS 0.28 ppm, Cl—V=CHTMS 0.40 ppm (FIG. 5).

When the reaction is complete $BnNEt_3Cl$ (522 mg, 2.29 mmol) was added, and reaction mixture was stirred for 30 min. Solvent was evaporated and residue was extracted with pentane (3×20 mL) and filtered. Filtrate was evaporated and dissolved in $iPr_2O$ (~1 mL), insoluble material was filtered through syringe filter. Filtrate was transferred to a freezer (−35° C.). After overnight the product crystallized as big yellow crystals. The solvent was removed using syringe and crystals were quickly washed with very small (~0.5 mL) amount of cold (−35° C.) $iPr_2O$ and dried in vacuum. M=464 mg (48%).

Occasionally a small amount of dark green crystal of impurity $Cl_2VO(PEt_3)_2$ was observed (CCDC2093139). The crystals of impurity were separated manually.

Figure 6:
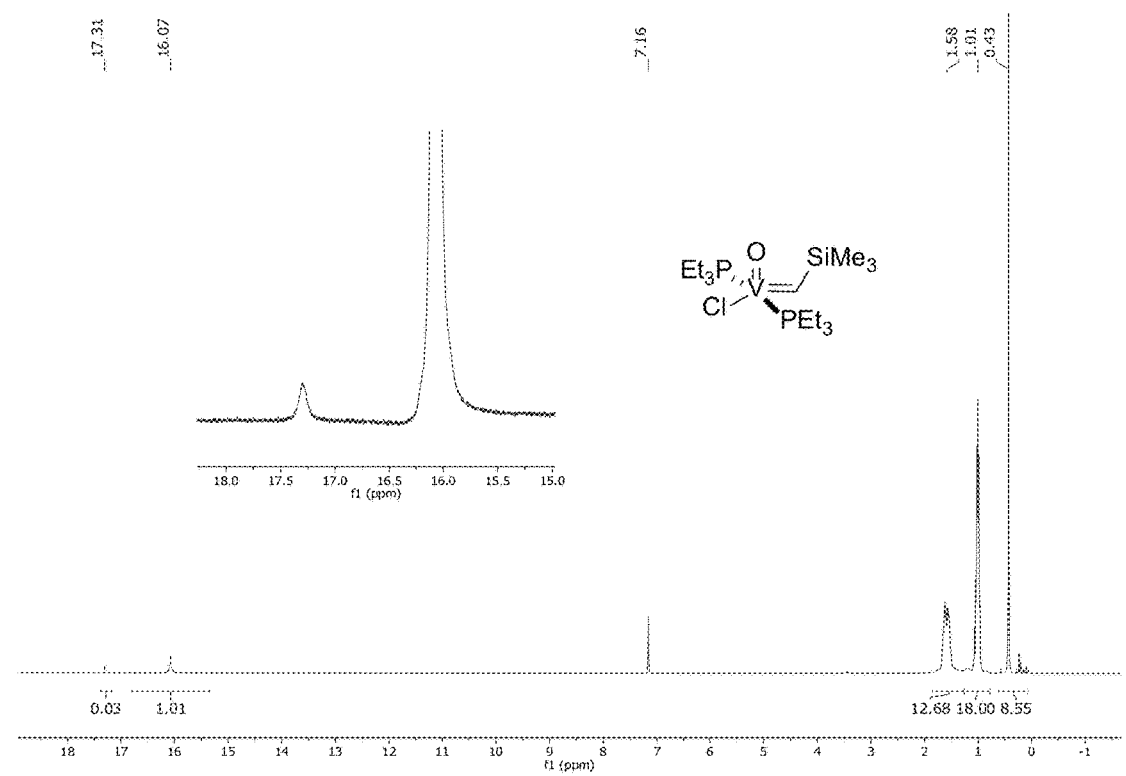
FIG. 6 shows $^1H$ NMR spectrum of 14 ($C_6D_6$, 400 MHz, 24° C.).
Figure 7:
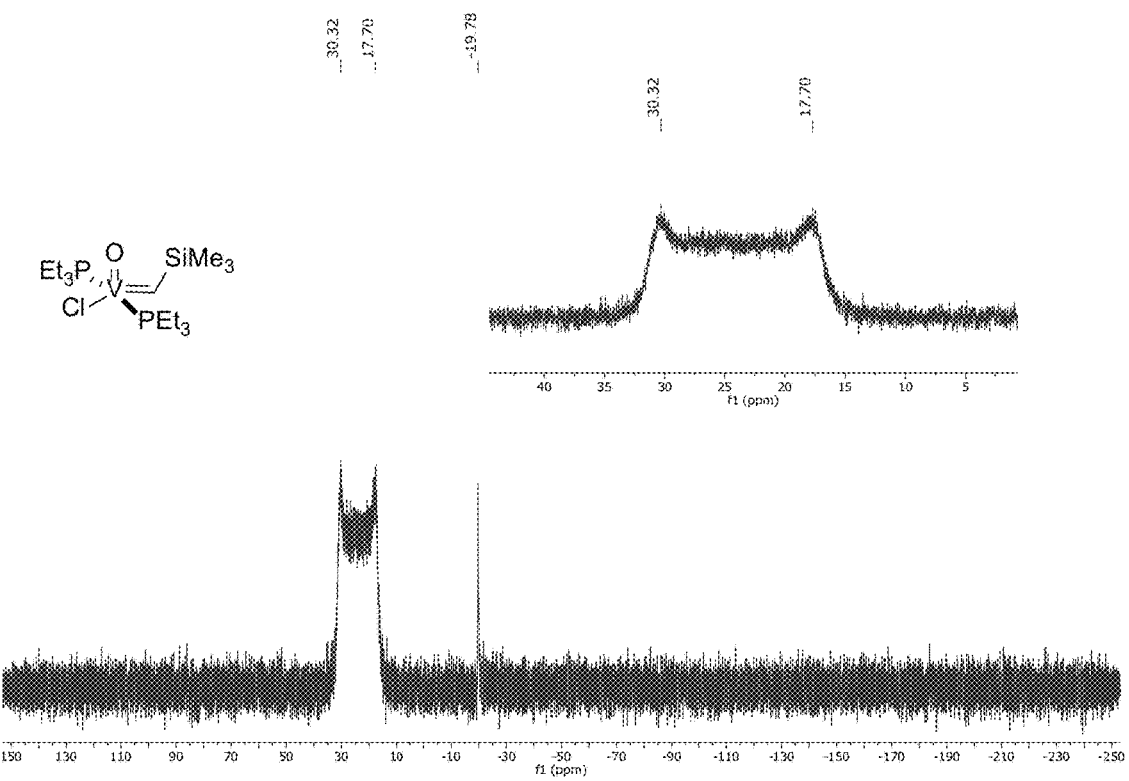
FIG. 7 shows $^{31}P$ NMR spectrum of 14 ($C_6D_6$, 162 MHz, 24° C.).
Figure 8:
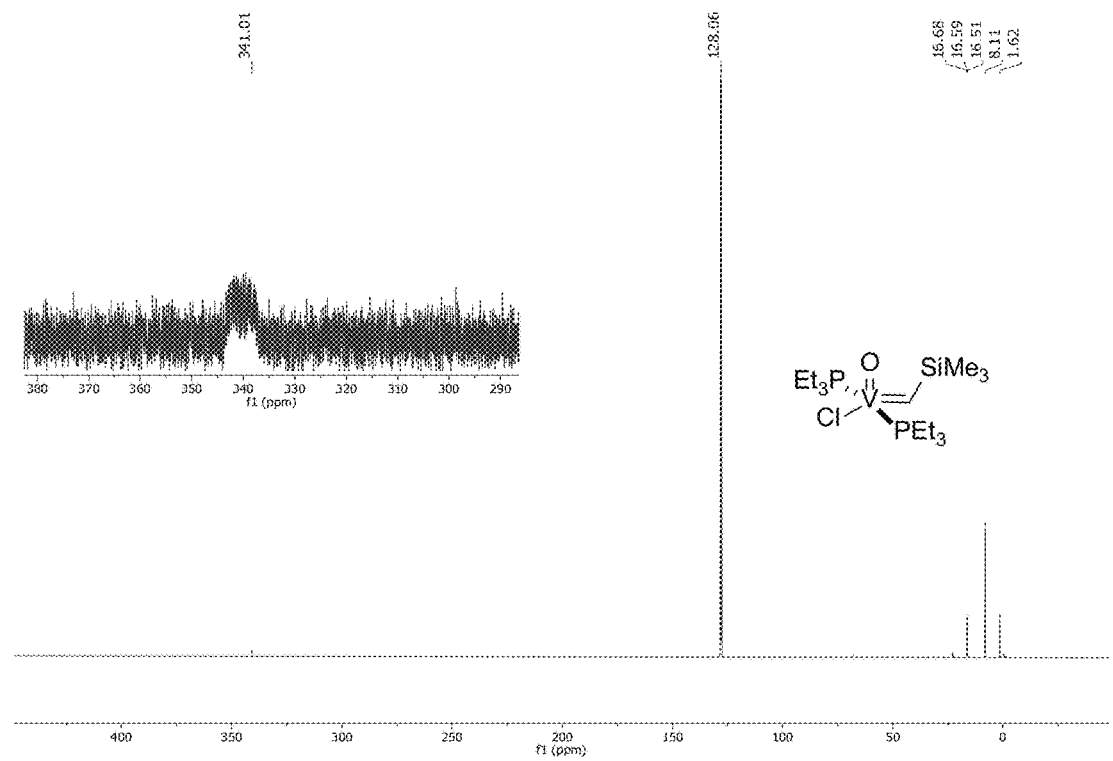
FIG. 8 shows $^{13}C$ NMR spectrum of 14 ($C_6D_6$, 101 MHz, 24° C.).

The NMR spectra of 14 are shown in FIGS. 6-8.

$^1$H-NMR: (400 MHz, $C_6D_6$) δ=0.43 (s, 9H), 0.94-1.10 (m, 18H), 1.48-1.70 (m, 12H), 16.07 (s, 1H, V=CH$_{syn}$), 17.31 (s, 0.03H, V=CH$_{anti}$).

$^{31}$P NMR (162 MHz, $C_6D_6$): δ=17.3-30.9 (br. m).

$^{13}$C NMR: (100 MHz, $C_6D_6$) δ=337.5-343.2 (br.), 16.6 (t, J=8.6 Hz), 8.1, 1.6.

Anal. Calcd for $C_{16}H_{40}ClOP_2SiV$: C, 45.23%; H, 9.49%, Found: C, 45.36%; H, 9.61%.

Phosphonium Salts
Triethylphosphine $Et_3P$ is commercially available. Spectra reported for convenience.

$^1$H NMR: ($CD_2Cl_2$, 400 MHz) δ=1.36 (q, J=7.7 Hz, 1H), 1.03 (dt, J=14.0, 7.7 Hz, 1H).

$^{31}$P NMR: ($CD_2Cl_2$, 162 MHz) δ=−19.0 (dhept, J=28.1, 13.7 Hz).

$^{31}$P[$^1$H] NMR: ($CD_2Cl_2$, 162 MHz) δ=−19.0.

$^{13}$C NMR: ($CD_2Cl_2$, 100 MHz) δ=19.1 (d, J=12.3 Hz), 10.0 (d, J=12.9 Hz).

$^1$H NMR: ($C_6D_6$, 400 MHz) δ=1.22 (qd, J=7.5, 0.9 Hz, 1H), 0.98 (dt, J=13.7, 7.5 Hz, 1H).

$^{31}$P NMR: ($C_6D_6$, 162 MHz) δ=−19.8 (dh, J=27.3, 13.9 Hz).

$^{31}$P NMR: ($C_6D_6$, 162 MHz) δ=−19.8.

$^{13}$C NMR: ($C_6D_6$, 100 MHz) δ=19.1 (d, J=13.7 Hz), 9.9 (d, J=13.4 Hz).

$^1$H NMR: ($CDCl_3$, 400 MHz) δ=1.36 (q. J=7.6 Hz, 1H), 1.02 (dt, J=14.1, 7.7 Hz, 2H).

$^{31}$P NMR: ($CDCl_3$, 162 MHz) δ=−18.7 (dhept, J=28.1, 14.1 Hz).

$^{31}$P NMR: ($CDCl_3$, 162 MHz) δ=−18.7.

$^{13}$C NMR: ($CDCl_3$, 100 MHz) δ=18.4 (d, J=11.3 Hz), 9.6 (d, J=12.3 Hz).

Triethylphosphonium triflate ($Et_3P*TfOH$)

Triethylphosphine (1.00 mL, 6.79 mmol) was dissolved in ether (10 mL) and cooled to ~−35° C. Trifluoromethanesulfonic acid (0.600 mL, 6.79 mmol) was added dropwise to form a liquid salt as a separate phase. Reaction mixture was stirred for 5 minutes at room temperature and was transferred to a freezer at −35° C. After 2 hours ether was decanted from solid, and precipitate was dried in vacuum. The salt melts at room temperature and was stored at −35° C. M=1.69 g (93%).

$^1$H NMR: ($CD_2Cl_2$, 400 MHz) δ=6.09 (ddq, J=482.7, 10.8, 5.4 Hz, 1H), 2.31 (dqd, J=13.1, 7.7, 5.4 Hz, 6H), 1.31 (dt, J=20.2, 7.7 Hz, 9H).

$^{19}$F NMR: ($CD_2Cl_2$, 376 MHz) δ=−79.0.

$^{31}$P NMR: ($CD_2Cl_2$, 162 MHz) δ=22.5.

$^{13}$C NMR: ($CD_2Cl_2$, 100 MHz) δ=121.3 (q, J=320.5 Hz), 10.3 (d, J=48.0 Hz), 7.0 (d, J=5.3 Hz).

$^1$H NMR: ($CDCl_3$, 400 MHz) δ=6.09 (ddq, J=483.4, 10.9, 5.4 Hz, 1H), 2.44-2.25 (m, 6H), 1.31 (dt, J=20.2, 7.7 Hz, 1H).

$^{19}$F NMR: ($CDCl_3$, 376 MHz) δ=−78.5.

$^{31}$P NMR: ($CDCl_3$, 162 MHz) δ=22.7.

$^{13}$C NMR: ($CDCl_3$, 100 MHz) δ=120.8 (q, J=320.1 Hz), 10.0 (d, J=48.1 Hz), 6.8 (d, J=5.5 Hz).

Triethylphosphonium Hydrochloride ($Et_3P*HCl$)

Triethylphosphine (1.00 mL, 6.79 mmol) was dissolved in ether (20 mL) and 1M HCl in ether (8.14 mL, 8.14 mmol, 1.2 equiv) was added dropwise to form a white solid. Reaction mixture was stirred for 5 minutes at room temperature and filtered. The precipitate was dried in vacuum. M=1.03 g (98%).

$^1$H NMR: ($CD_2Cl_2$, 400 MHz) δ=7.32 (d, J=497.3 Hz, 01H), 2.46 (dq, J=15.1, 7.7, 7.0 Hz, 6H), 1.30 (dt, J=19.7, 7.7 Hz, 9H).

$^{31}$P NMR: ($CD_2Cl_2$, 162 MHz) δ=19.7.

$^{13}$C NMR: ($CD_2Cl_2$, 100 MHz) δ=11.1 (d, J=48.0 Hz), 7.37 (d, J=5.6 Hz).

$^1$H NMR: ($CDCl_3$, 400 MHz) δ=8 7.14 (d, J=495.5 Hz, 1H), 2.43 (dt, J=15.5, 7.7 Hz, 6H), 1.26 (dt, J=19.8, 7.7 Hz, 9H).

$^{31}$P NMR: ($CDCl_3$, 162 MHz) δ=20.2.

$^{13}$C NMR: ($CDCl_3$, 100 MHz) δ=10.6 (d, J=47.9 Hz), 7.1 (d, J=5.5 Hz).

Ring Closing Metathesis of Model Substrate

Scheme 1. Ring Closing Metathesis of model substrate

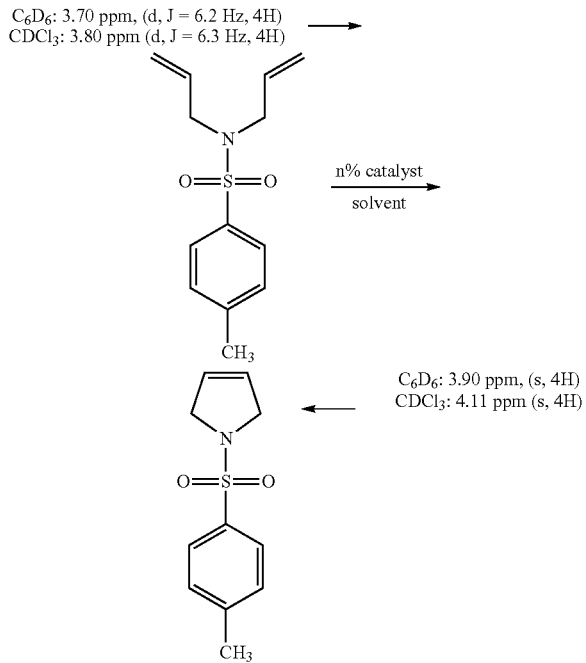

Figure 9:
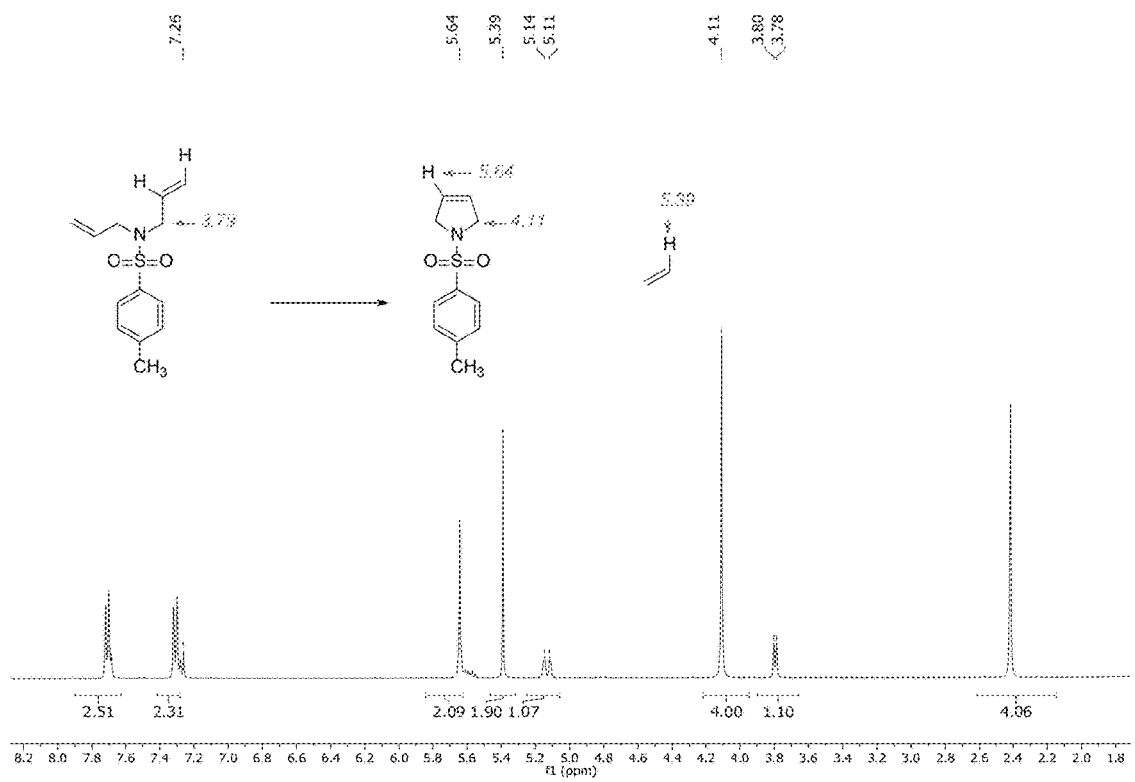
FIG. 9 shows $^1H$ NMR spectra of indicative chemical shifts used for calculation of conversion of compounds 17 to 18 ($CDCl_3$, 400 MHz, 24° C.).

All experiments were performed in a nitrogen filled glovebox. Catalyst stock solution was prepared immediately before the reaction in each experiment. Conversion was estimated by integration methylene proton resonance of N,N-diallyl-4-methylbenzenesulfonamide and 1-tosyl-2,5-dihydro-1H-pyrrole (FIG. 9).

General Procedure for Solvent Screen

Complex 14 (4.3 mg, 5 mol. %) was weighed into a HPLC vial, 1 mL of a solvent was added followed by 49 μL of N,N-diallyl-4-methylbenzenesulfonamide 17 (~51 mg). The vials were tightly closed and were left stirred overnight at room temperature. Reaction mixtures in deuterated solvents were transferred to NMR tubes. Other reaction mixtures were transferred outside of glovebox evaporated and the residue was dissolved in CDCl$_3$. Conversions were determined by $^1$H NMR analysis (Table 2).

TABLE 2

Solvent screening, conversion of 17 to 18 in closed vials.

| Solvent | Conversion, % |
|---|---|
| CDCl$_3$ | 75 |
| CD$_2$Cl$_2$ | 72 |
| C$_6$D$_6$ | 67 |
| Toluene-d$^8$ | 67 |
| C$_6$H$_5$F | 72 |
| THF | 58 |
| Ether | 60 |
| DME | 65 |
| Pentane | 65 |

Catalytic Loadings.

Open Vial Experiment:

21.3 mg of complex 14 was dissolved in 1 mL of CDCl$_3$. N,N-diallyl-4-methylbenzenesulfonamide 17 (50.3 mg) was added to six separate 8 mL vials equipped with stirring bars. V$_1$ mL of CDCl$_3$ was added to each vial followed by V$_2$ mL of catalyst stock solution (Table 3). Each reaction was stirred in an open vial for 24 h. By the end of experiment no solvent left in vials and a fresh CDCl$_3$ (1 mL) was added to each vial. The solutions were transferred to NMR tubes and conversions were measured by $^1$H NMR (Table 4).

Closed Vial Experiment:

21.3 mg of complex 1 was dissolved in 1 mL of CDCl$_3$. N,N-diallyl-4-methylbenzenesulfonamide 17 (50.3 mg) was added to six separate HPLC vials equipped with stirring bars. V$_1$ mL of CDCl$_3$ was added to each vial followed by V$_2$ mL of catalyst stock solution (Table 3). The vials were closed tightly and stirred for 24 h. The solutions were transferred to NMR tubes and conversions were measured by $^1$H NMR (Table 3).

TABLE 3

| Cat, % | 1 | 2 | 3 | 4 | 5 | 6 |
|---|---|---|---|---|---|---|
| V$_1$, μL | 960 | 920 | 880 | 840 | 800 | 760 |
| V$_2$, μL | 40 | 80 | 120 | 160 | 200 | 240 |

TABLE 4

Catalysts loading screening, conversion of 17 to 18.

| Open vial | | | Closed vial | | |
|---|---|---|---|---|---|
| %, cat | Conversion, % | TON | %, cat | Conversion, % | TON |
| 1 | 59 | 59 | 1 | 56 | 56 |
| 2 | 83 | 42 | 2 | 66 | 33 |
| 3 | 91 | 30 | 3 | 69 | 23 |
| 4 | 94 | 24 | 4 | 73 | 18 |
| 5 | 96 | 19 | 5 | 76 | 15 |
| 6 | 97 | 16 | 6 | 76 | 12 |

Scope

Figure 10:
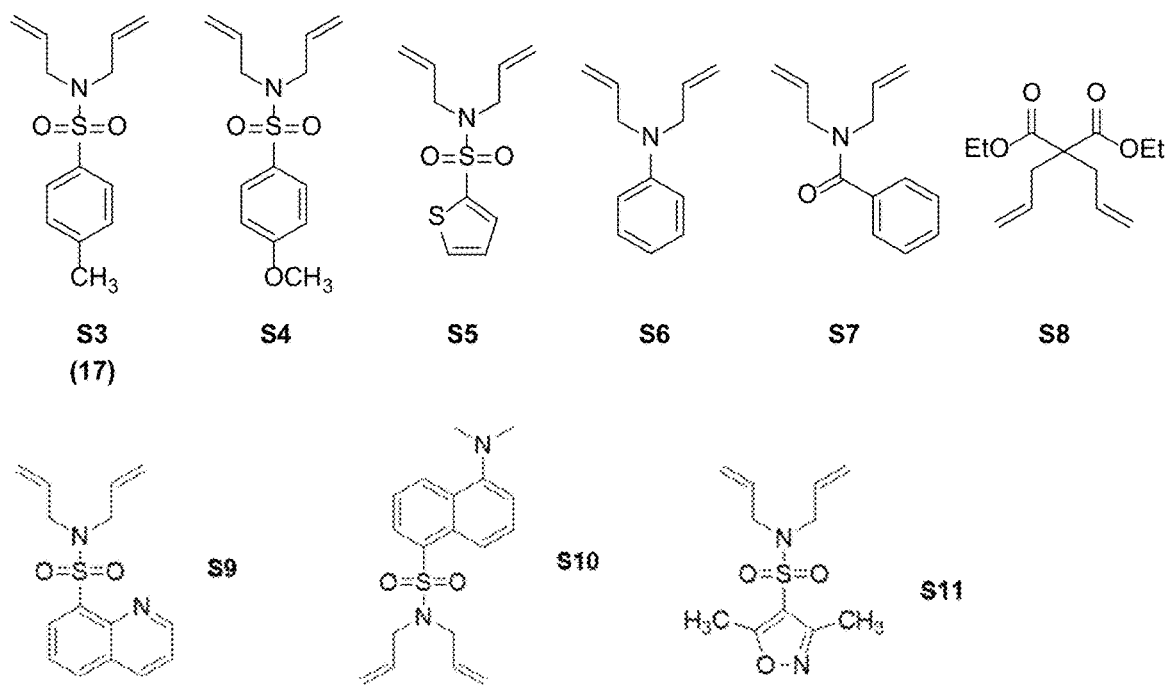
FIG. 10 shows substrates for RCM.
Figure 11:
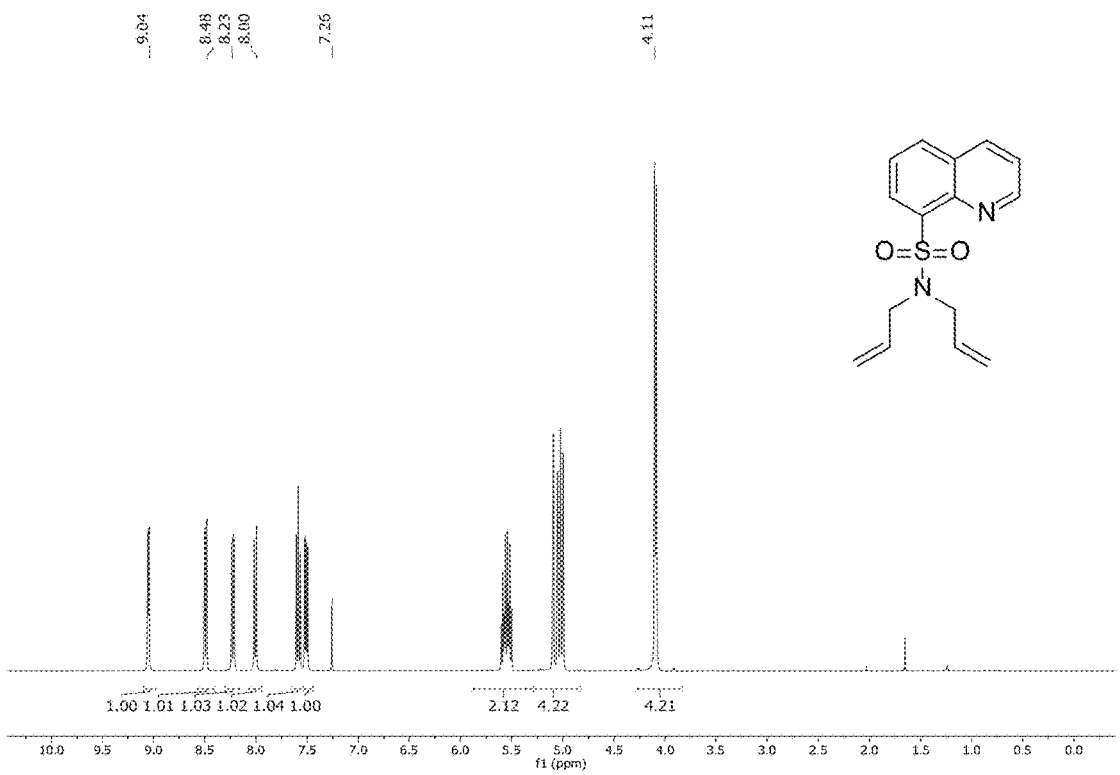
FIG. 11 shows $^1H$ NMR spectrum of S9 ($C_6D_6$, 400 MHz, 24° C.).
Figure 12:
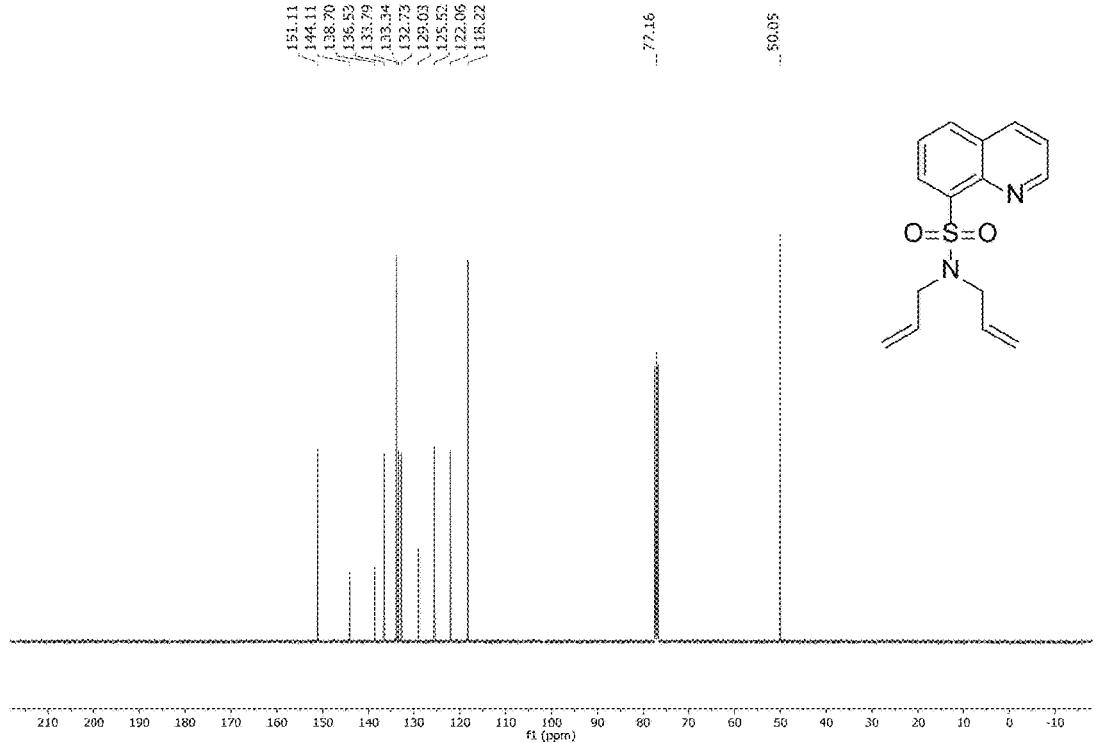
FIG. 12 shows $^{13}C$ NMR spectrum of S9 ($C_6D_6$, 101 MHz, 24° C.).
Figure 13:
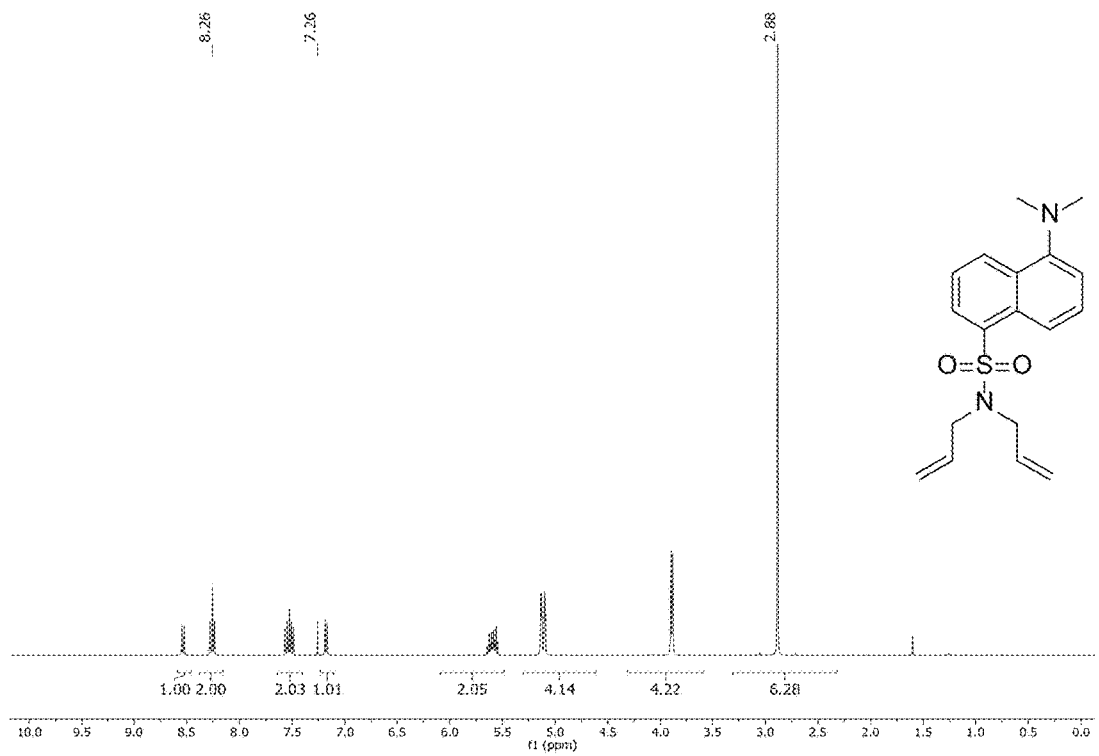
FIG. 13 shows $^1H$ NMR spectrum of S10 ($C_6D_6$, 400 MHz, 24° C.).
Figure 14:
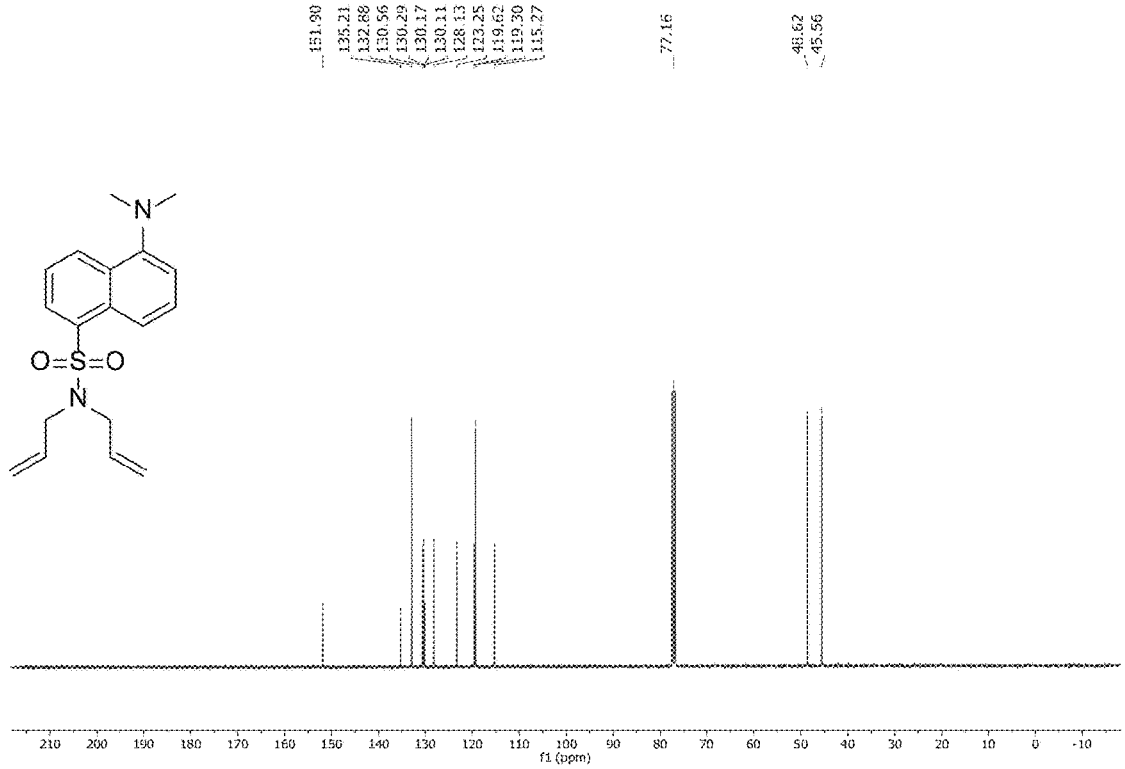
FIG. 14 shows $^3C$ NMR spectrum of S10 ($C_6D_6$, 101 MHz, 24° C.).
Figure 15:
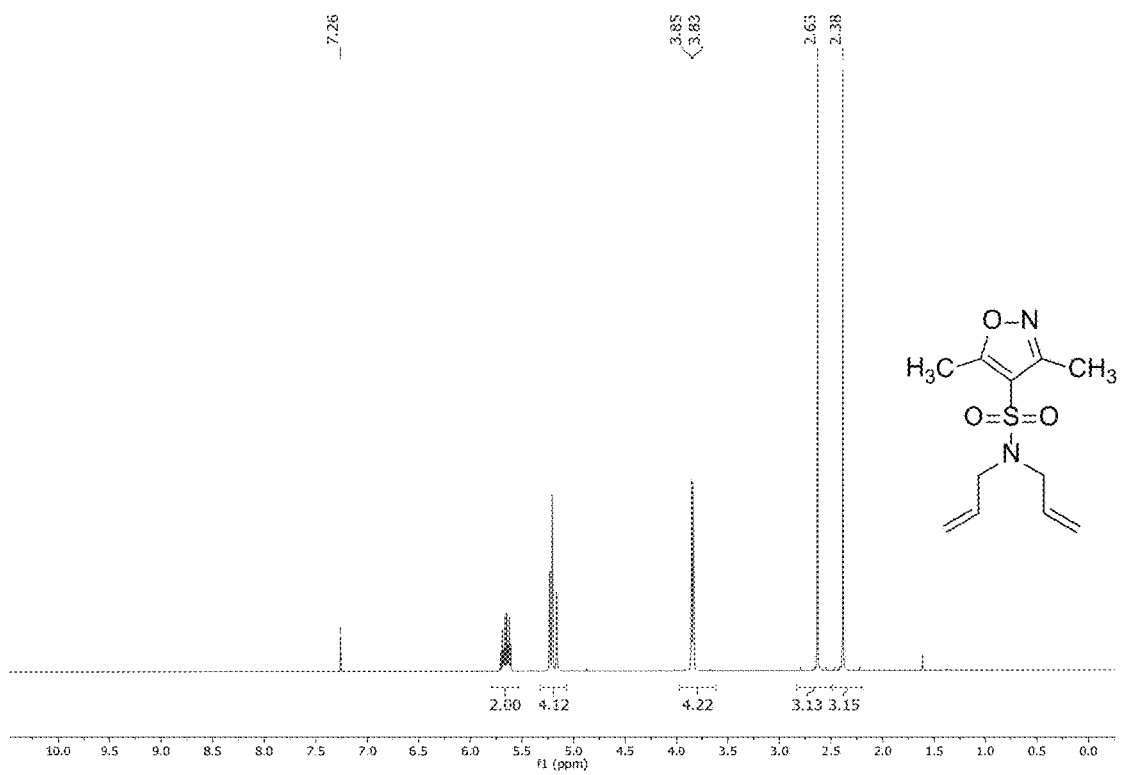
FIG. 15 shows $^1H$ NMR spectrum of S11 ($C_6D_6$, 400 MHz, 24° C.).
Figure 16:
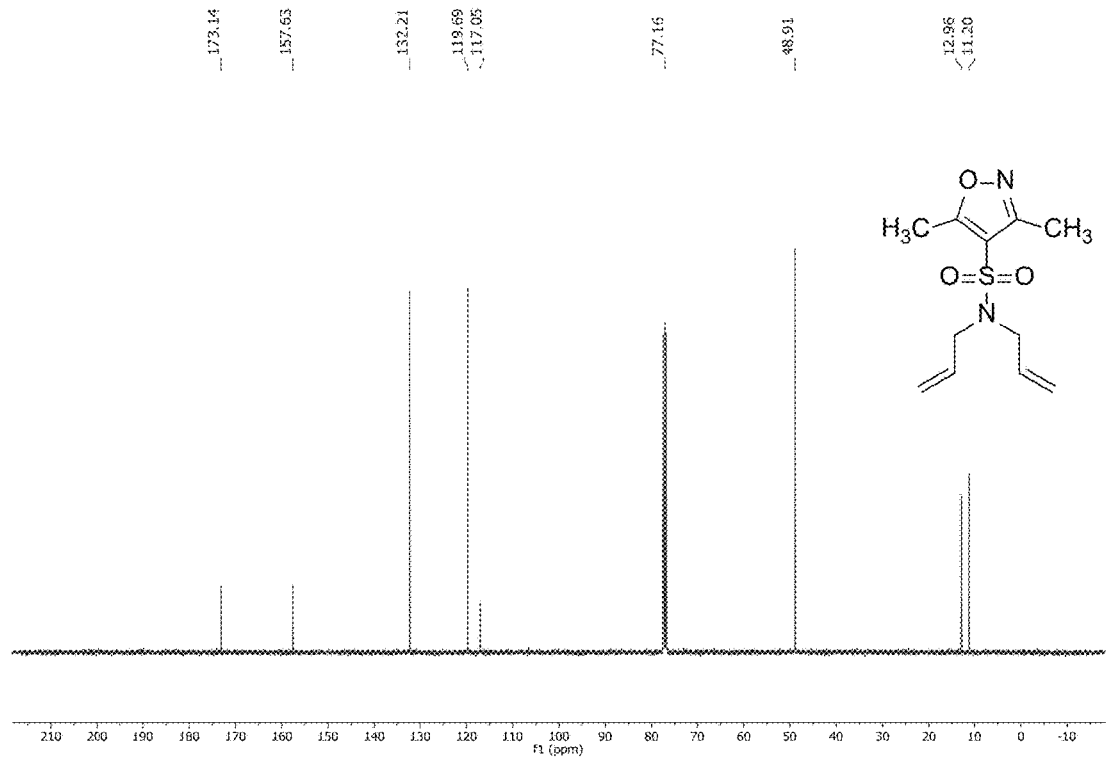
FIG. 16 shows $^{13}C$ NMR spectrum of S11 ($C_6D_6$, 101 MHz, 24° C.).
Figure 17:
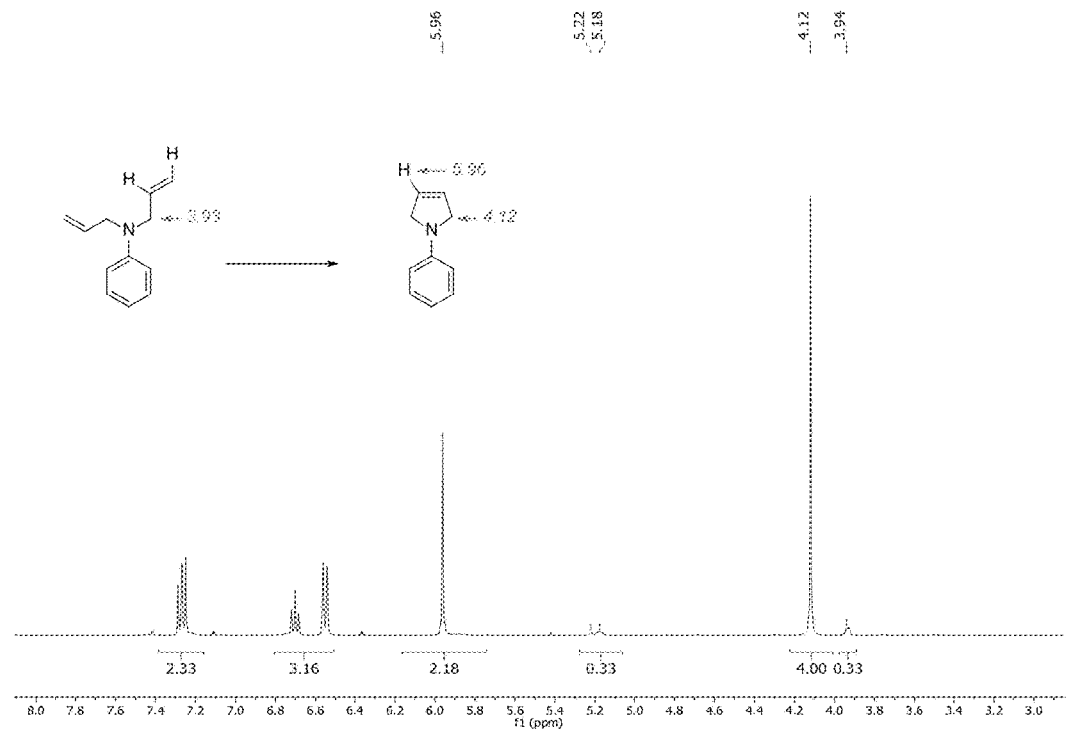
FIG. 17 shows $^1H$ NMR spectra of indicative chemical shifts used for calculation of conversion of compounds S6 to 19 ($CDCl_3$, 400 MHz, 24° C.).
Figure 18:
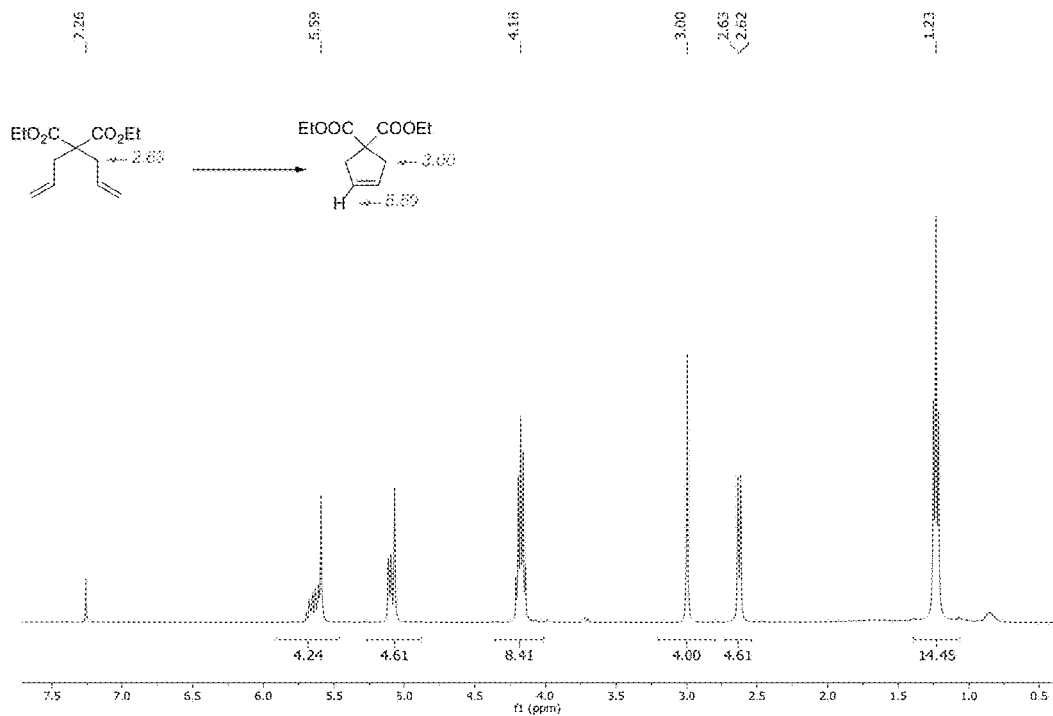
FIG. 18 shows $^1H$ NMR spectra of indicative chemical shifts used for calculation of conversion of compounds S8 to 20 ($CDCl_3$, 400 MHz, 24° C.).
Figure 19:
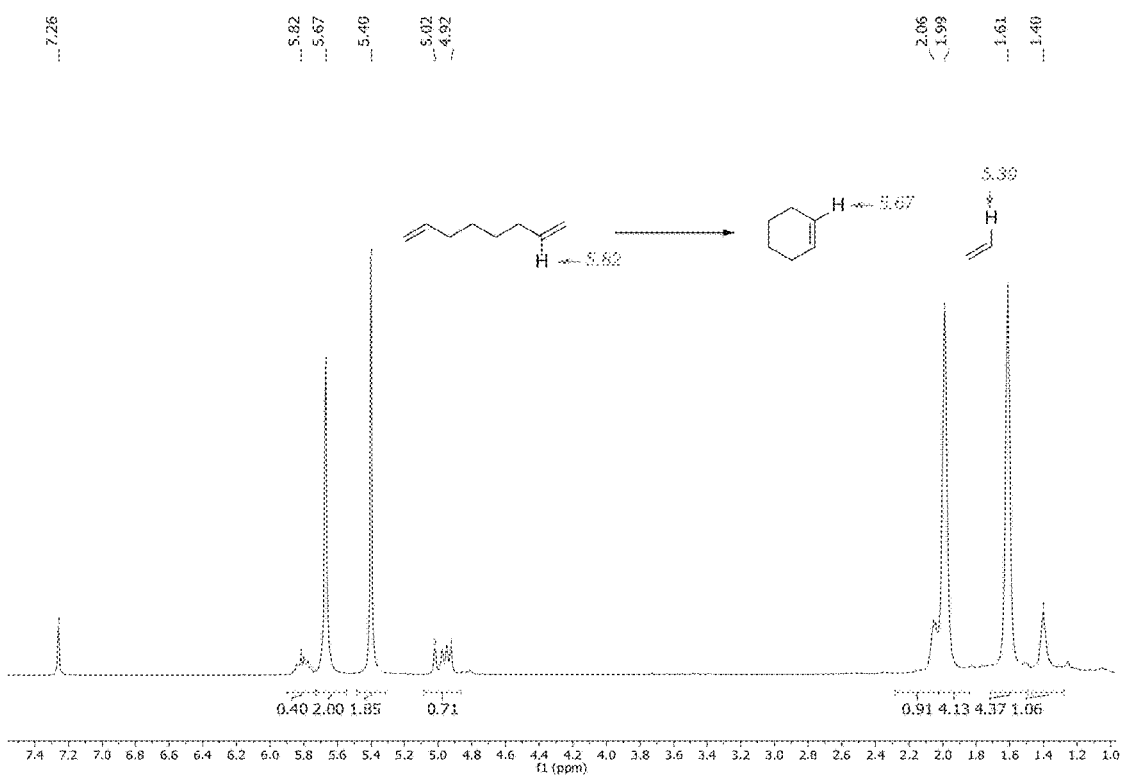
FIG. 19 shows $^1H$ NMR spectra of indicative chemical shifts used for calculation of conversion of compounds S1 to 21 ($CDCl_3$, 400 MHz, 24° C.).
Figure 20:
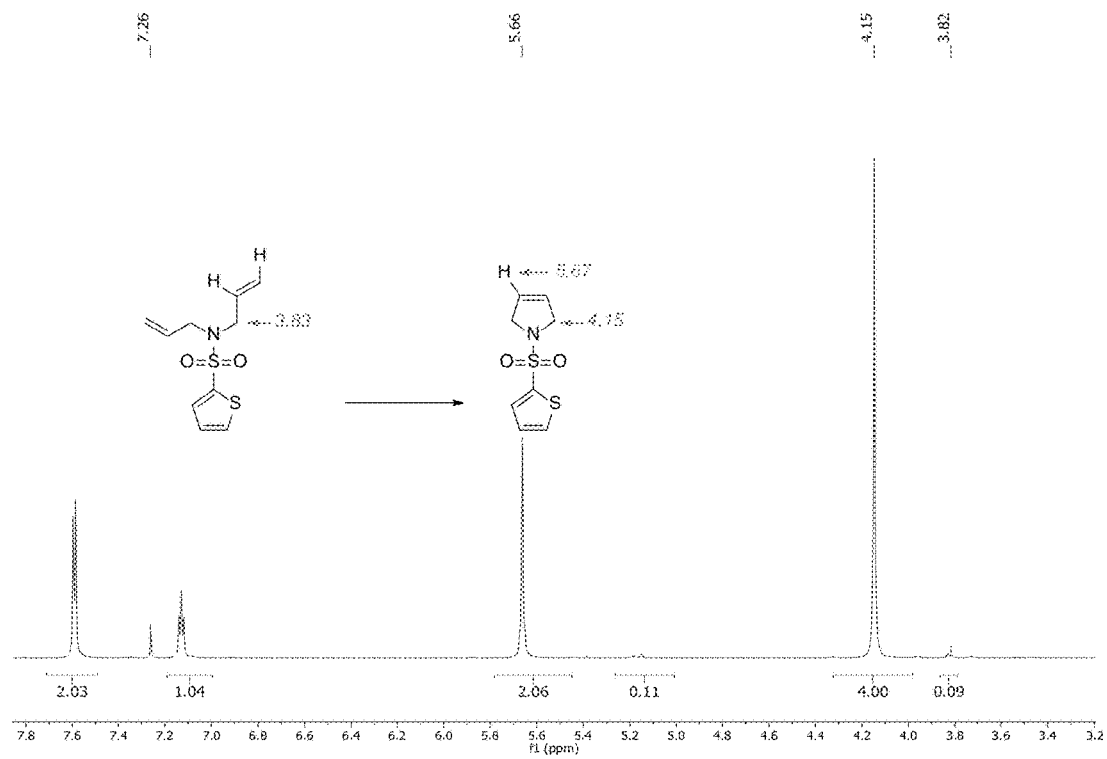
FIG. 20 shows $^1H$ NMR spectra of indicative chemical shifts used for calculation of conversion of compounds S5 to 22 ($CDCl_3$, 400 MHz, 24° C.).
Figure 21:
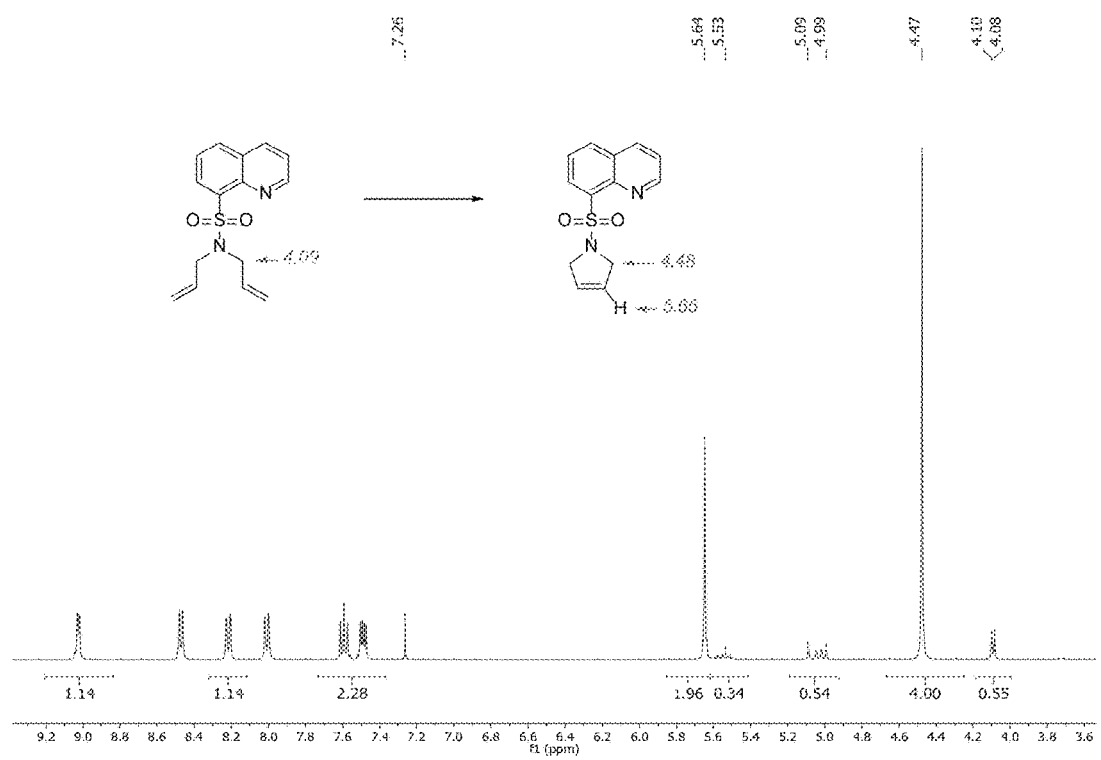
FIG. 21 shows $^1H$ NMR spectra of indicative chemical shifts used for calculation of conversion of compounds S9 to 23 ($CDCl_3$, 400 MHz, 24° C.).
Figure 22:
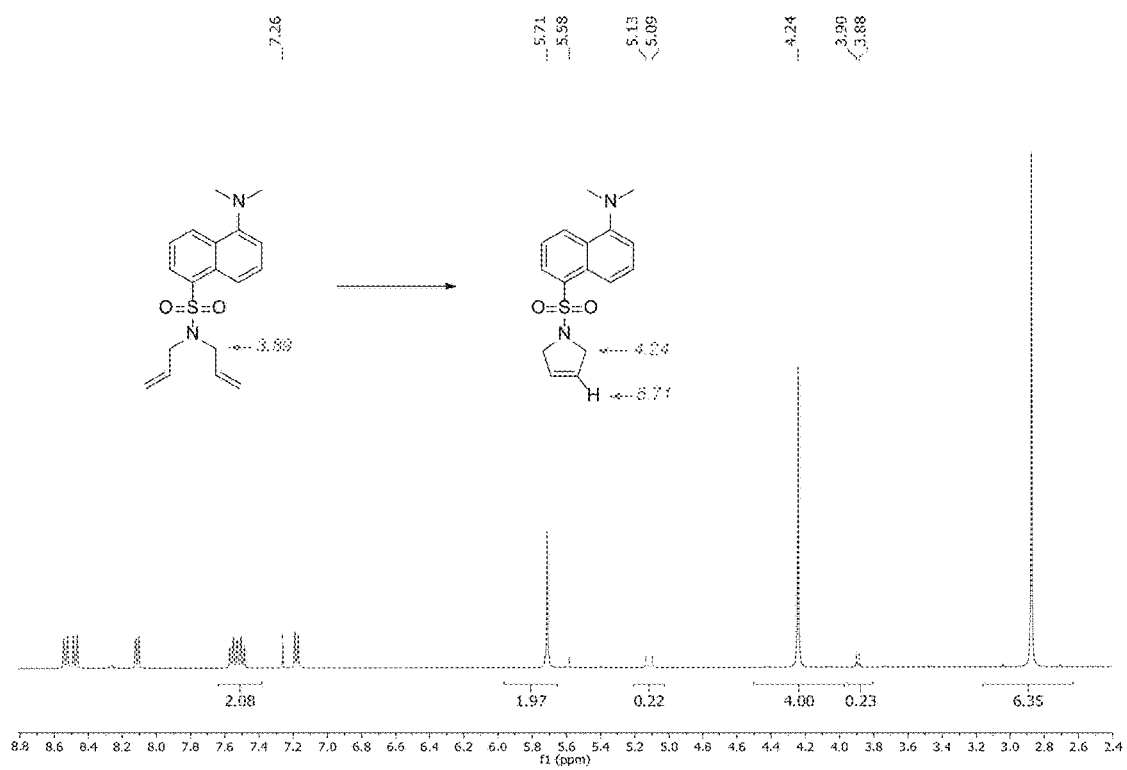
FIG. 22 shows $^1H$ NMR spectra of indicative chemical shifts used for calculation of conversion of compounds S10 to 24 ($CDCl_3$, 400 MHz, 24° C.).
Figure 23:
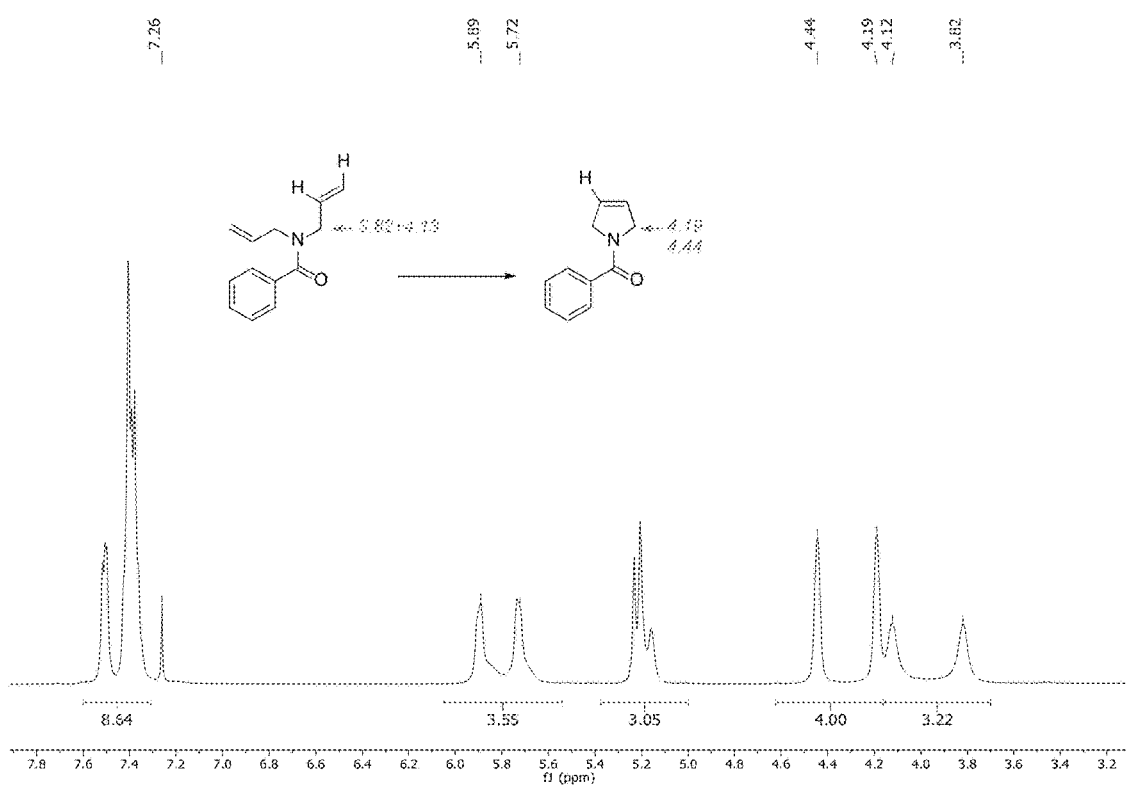
FIG. 23 shows $^1H$ NMR spectra of indicative chemical shifts used for calculation of conversion of compounds S7 to 25 ($CDCl_3$, 400 MHz, 24° C.).
Figure 24:
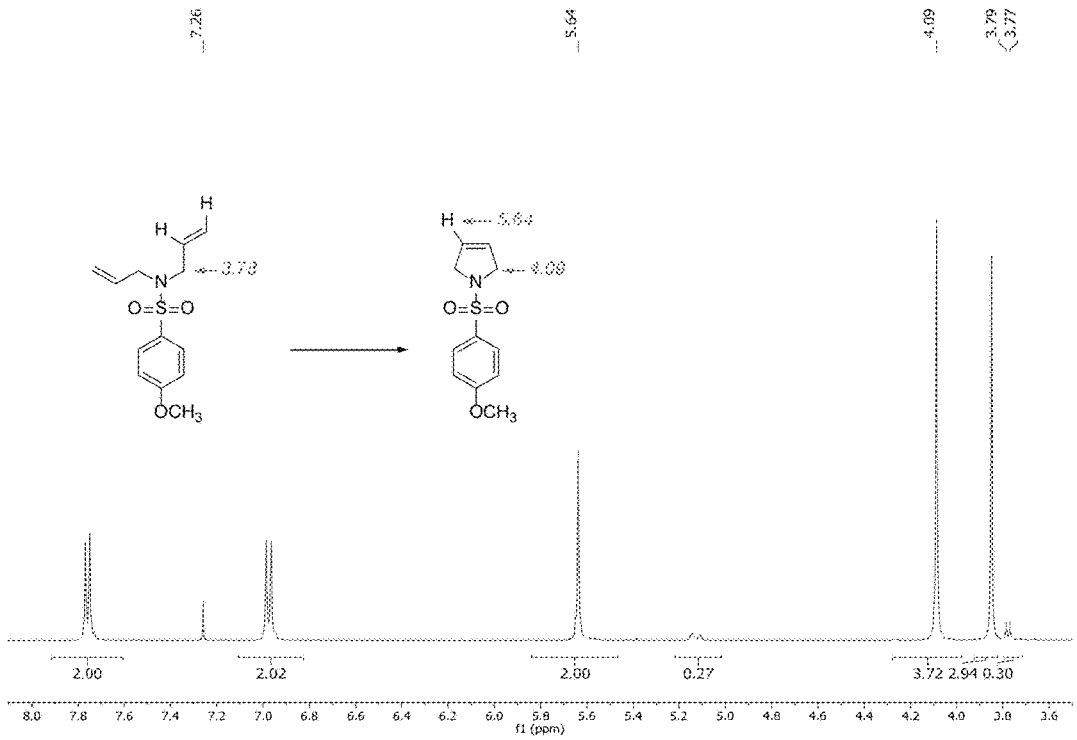
FIG. 24 shows $^1H$ NMR spectra of indicative chemical shifts used for calculation of conversion of compounds S4 to 26 ($CDCl_3$, 400 MHz, 24° C.).
Figure 25:
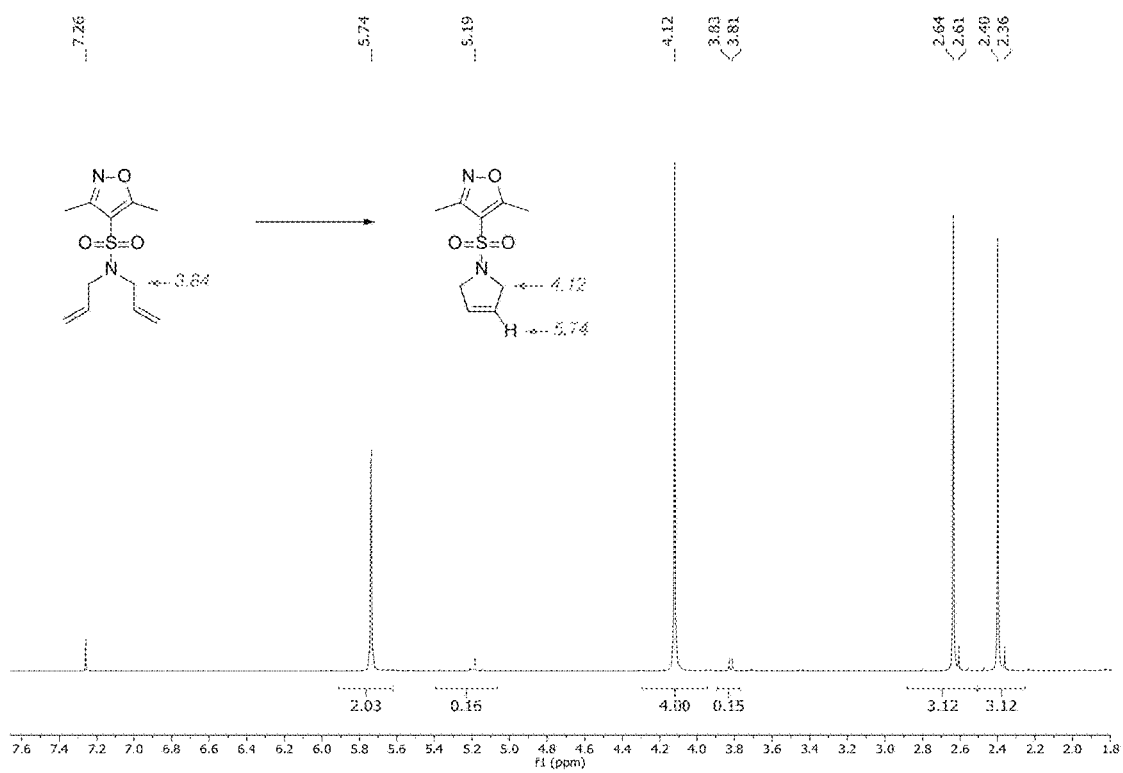
FIG. 25 shows $^1H$ NMR spectra of indicative chemical shifts used for calculation of conversion of compounds S11 to 27 ($CDCl_3$, 400 MHz, 24° C.).
Figure 26:
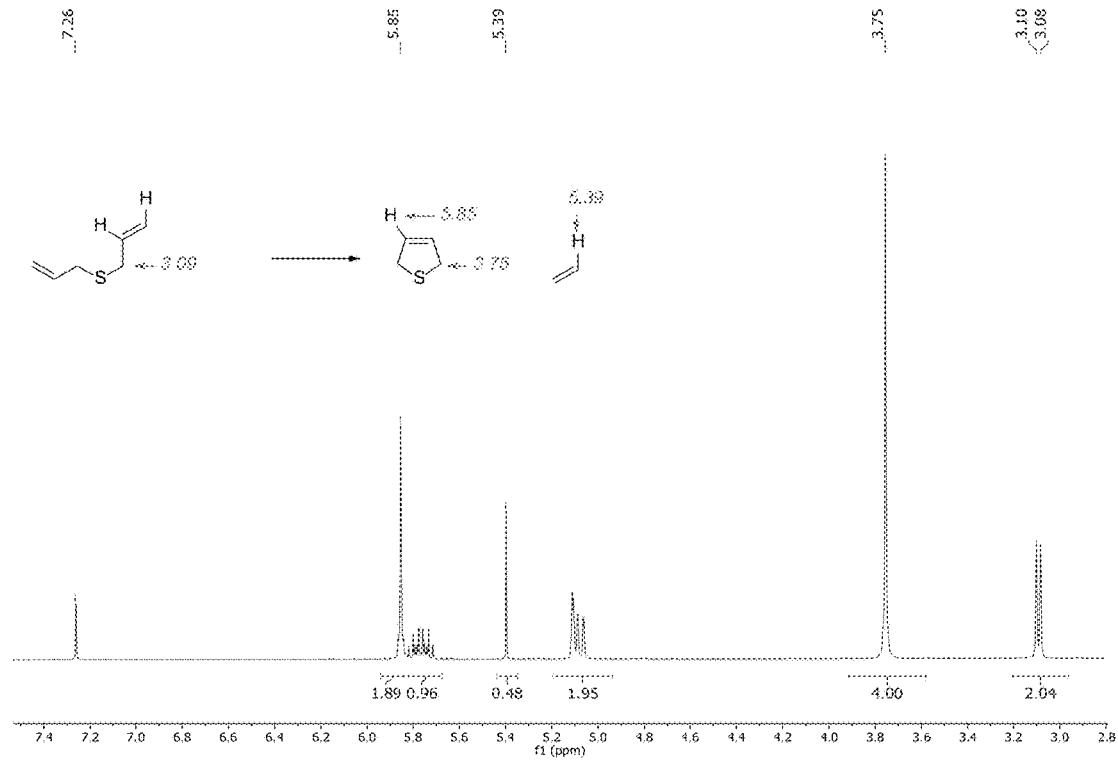
FIG. 26 shows $^1H$ NMR spectra of indicative chemical shifts used for calculation of conversion of compounds S2 to 28 ($CDCl_3$, 400 MHz, 24° C.).

Some substrates for RCM are shown in FIG. 10. 1,7-Octadiene S1 (>97%) and allyl sulfide S2 (>98%) were purchased from TCl and used as received. 17, S4, S5 were prepared by reaction between diallylamine and appropriate sulfonyl chloride. S6 was prepared by alkylation of aniline and purified by distillation under reduced pressure. S7 was prepared by benzoylation of diallylamine. S8 was prepared by alkylation of diethyl malonate.

Synthesis of Substrates for RCM Reaction.

General Procedure.

To the solution of ArSO$_2$Cl (5.4 mmol) in CHCl$_3$ (15 mL) was added DMAP (50-100 mg) followed by diallylamine (1 mL, 8.1 mmol, 1.5 equiv) and Et$_3$N (1.13 mL, 8.1 mmol, 1.5 equiv). The reaction is slightly exothermic. The reaction mixture was stirred overnight and diluted with DCM (20 mL). The solution was washed with water (20 mL) and organic phase was separated and dry loaded on silica. Column chromatography afforded desired compounds.

N,N-diallylquinoline-8-sulfonamide (S9)

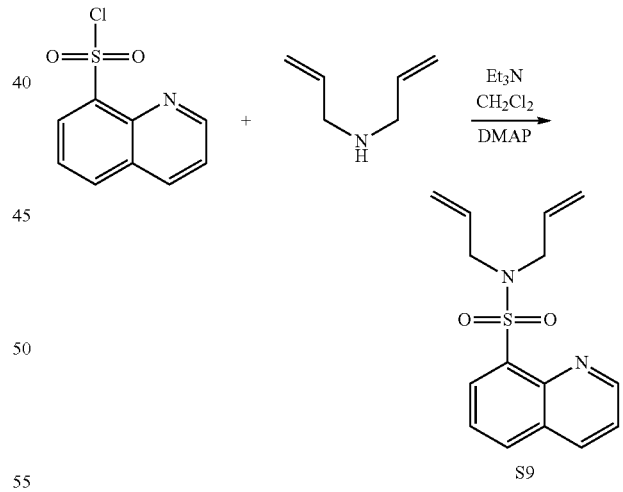

Scheme 2. Synthesis of S9.

Eluent: hexanes/ethyl acetate 2:1. Rf=0.3 (3:1, hexanes/EA).

White solid. M=1.36 g (87%).

$^1$H NMR: (CDCl$_3$3, 400 MHz) δ=9.05 (dd, J=4.2, 1.8 Hz, 1H), 8.49 (dd, J=7.4, 1.4 Hz, 1H), 8.23 (dd, J=8.3, 1.8 Hz, 1H), 8.01 (dd, J=8.2, 1.3 Hz, 1H), 7.59 (dd, J=8.2, 7.4 Hz, 1H), 7.51 (dd, J=8.4, 4.2 Hz, 1H), 5.55 (ddt, J=16.6, 10.1, 6.3 Hz, 2H), 5.07 (dq, J=17.2, 1.5 Hz, 2H), 5.01 (dt, J=10.1, 1.4 Hz, 2H), 4.10 (d, J=6.2 Hz, 4H).

$^{13}$C NMR: (CDCl$_3$, 100 MHz) δ=151.1, 144.1, 138.7, 136.5, 133.8, 133.3, 132.7, 129.0, 125.5, 122.1, 118.2, 50.1.

HRMS (m/z) calcd for C$_{15}$H$_{17}$N$_2$O$_2$S [M+H]$^+$: 289.1005, found: 289.1003.

N,N-diallyl-5-(dimethylamino)naphthalene-1-sulfonamide (S10)

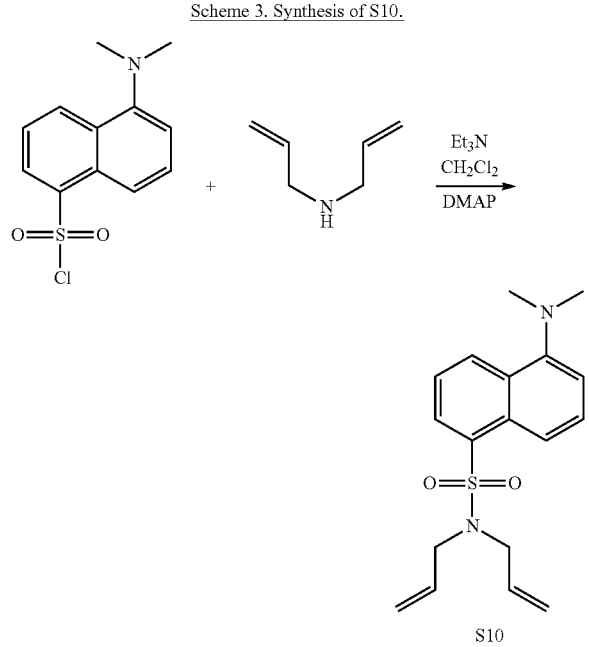

Scheme 3. Synthesis of S10.

Eluent: hexanes/ethyl acetate 5:1, 3:1. Rf=0.4 (3:1, hexanes/EA).

Yellow oil. M=496 mg (75%).

$^1$H NMR: (CDCl$_3$, 400 MHz) δ=8.54 (dt, J=8.5, 1.1 Hz, 1H), 8.38-8.15 (m, 2H), 7.53 (ddd, J=15.2, 8.6, 7.5 Hz, 2H), 7.18 (dd, J=7.5, 0.9 Hz, 1H), 5.59 (ddt, J=17.4, 9.8, 6.4 Hz, 2H), 5.12 (dtd, J=14.7, 2.9, 1.4 Hz, 4H), 3.89 (d, J=6.3 Hz, 4H), 2.88 (s, 6H).

$^{13}$C NMR: (CDCl$_3$3, 100 MHz) δ=151.9, 135.2, 132.9, 130.6, 130.3, 130.2, 130.1, 128.1, 123.3, 119.6, 119.3, 115.3, 48.6, 45.6.

HRMS (m/z) calcd for C$_{18}$H$_{23}$N$_2$O$_2$S [M+H]$^+$: 331.1475, found: 331.1475.

N,N-diallyl-3,5-dimethylisoxazole-4-sulfonamide (S11)

Scheme 4. Synthesis of S11

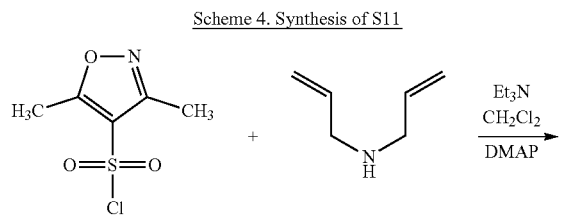

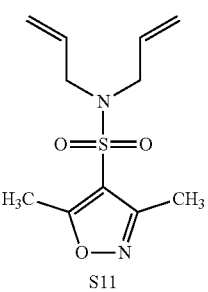

Eluent: hexanes/ethyl acetate 5:1, 3:1. Rf=0.5 (3:1, hexanes/EA).

Clear oil. M=1.11 g (80%).

$^1$H NMR: (CDCl$_3$, 400 MHz) δ=5.65 (ddt, J=16.6, 10.2, 6.3 Hz, 2H), 5.35-5.06 (m, 4H), 3.84 (d, J=6.2 Hz, 4H), 2.63 (s, 3H), 2.38 (s, 31H).

$^{13}$C NMR: (CDCl$_3$, 100 MHz) δ=173.1, 157.6, 132.2, 119.7, 117.1, 48.9, 13.0, 11.2.

HRMS (m/z) calcd for C$_{11}$H$_{17}$N$_2$O$_3$S [M+H]$^+$: 257.0954, found: 257.0953.

RCM Screen

Open Vial Experiment:

Inside a nitrogen filled glovebox complex 14 (38.2 mg, 90 µmol, 5 mol. %) was dissolved in 9.0 mL of CDCl$_3$. To a nine separate 8 mL vials were added substrates S3-S11 (0.200 mmol) and a stirring bar. 1.0 mL of stock solution was added to each vial. Open vials were stirred for 24 h. By the end of experiment no solvent left in a vials and a fresh CDCl$_3$ (1.0 mL) was added to each vial. The solutions were transferred to NMR tubes and conversions were measured by $^1$H NMR (FIGS. 9 and 17-26).

Closed Vial Experiment (Volatile Substrates):

Inside a nitrogen filled glovebox complex 14 (8.5 mg, 20 µmol, 5 mol. %) was dissolved in 2.0 mL of CDCl$_3$. To two separate HPLC vials were added substrates S1-S2 (0.200 mmol) and a stirring bar. 1.0 mL of stock solution was added to each vial. The vials were closed tightly and stirred for 24 h. The solutions were transferred to NMR tubes and conversions were measured by $^1$H NMR (FIGS. 9 and 17-26).

For known RCM products the conversions were calculated based on the literature $^1$H NMR data. (FIGS. 9 and 17-26). The relevant chemical shifts are listed on the FIGS. 9 and 17-26. $^1$H NMR data for 18, 19, 20, 25, 26, 28 can be found in the literature. The unknown RCM products 22, 23, 24, 27 were isolated by column chromatography and characterized:

Characterization of Products.

The solution in CDCl$_3$ from RCM screen experiment was dry loaded on a small amount of silica gel. The product was isolated by column chromatography.

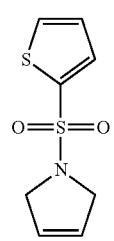

1-(thiophen-2-ylsulfonyl)-2,5-dihydro-1H-pyrrole (22)

Figure 27:
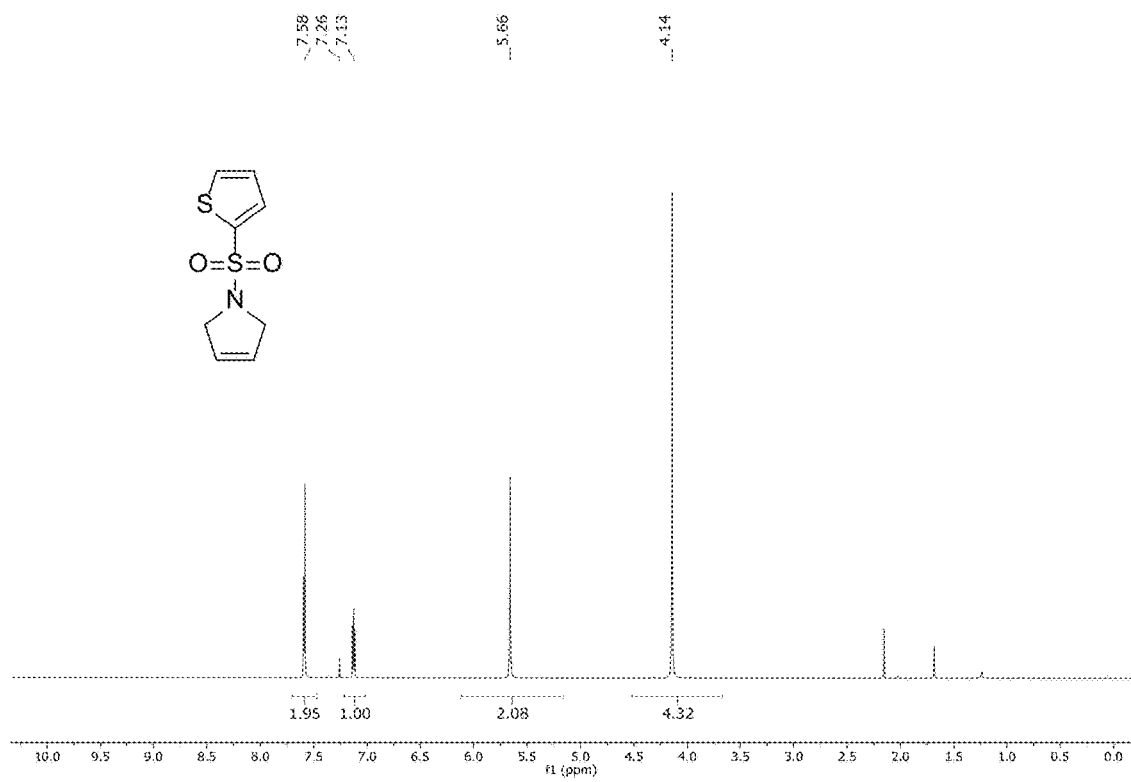
FIG. 27 shows $^1H$ NMR spectrum of 22 ($C_6D_6$, 400 MHz, 24° C.).
Figure 28:
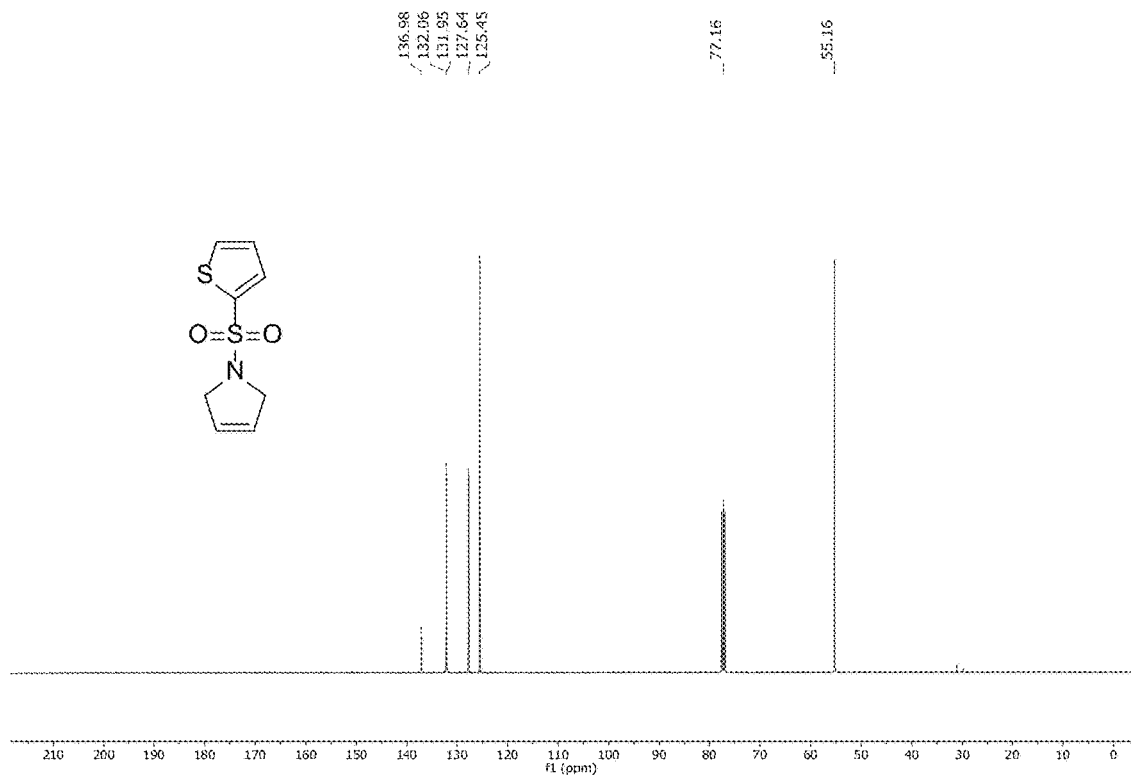
FIG. 28 shows $^{13}C$ NMR spectrum of 22 ($C_6D_6$, 101 MHz, 24° C.).

The compound is known, but no NMR data has been reported. The NMR spectra of 22 are shown in FIGS. 27 and 28.

Eluent: hexanes/ethyl acetate 3:1. Rf=0.2 (3:1, hexanes/EA).

White solid. Isolated yield: M=35 mg (81%).

$^1$H NMR: (CDCl$_3$, 400 MHz) δ=7.61-7.57 (m, 2H), 7.13 (dd, J=4.7, 4.0 Hz, 1H), 5.66 (s, 2H), 4.14 (s, 4H).

$^{13}$C NMR: (CDCl$_3$, 100 MHz) δ=137.0, 132.1, 132.0, 127.6, 125.5, 55.2.

HRMS (m/z) calcd for C$_8$H$_{10}$NO$_2$S$_2$ [M+H]$^+$: 216.0147, found: 216.0147.

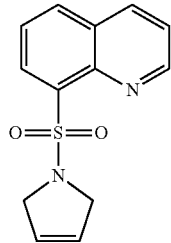 [SMILES: O=S(=O)(c1cccc2cccnc12)N1CC=CC1]

8-((2,5-dihydro-1H-pyrrol-1-yl)sulfonyl)quinoline (23)

Figure 29:
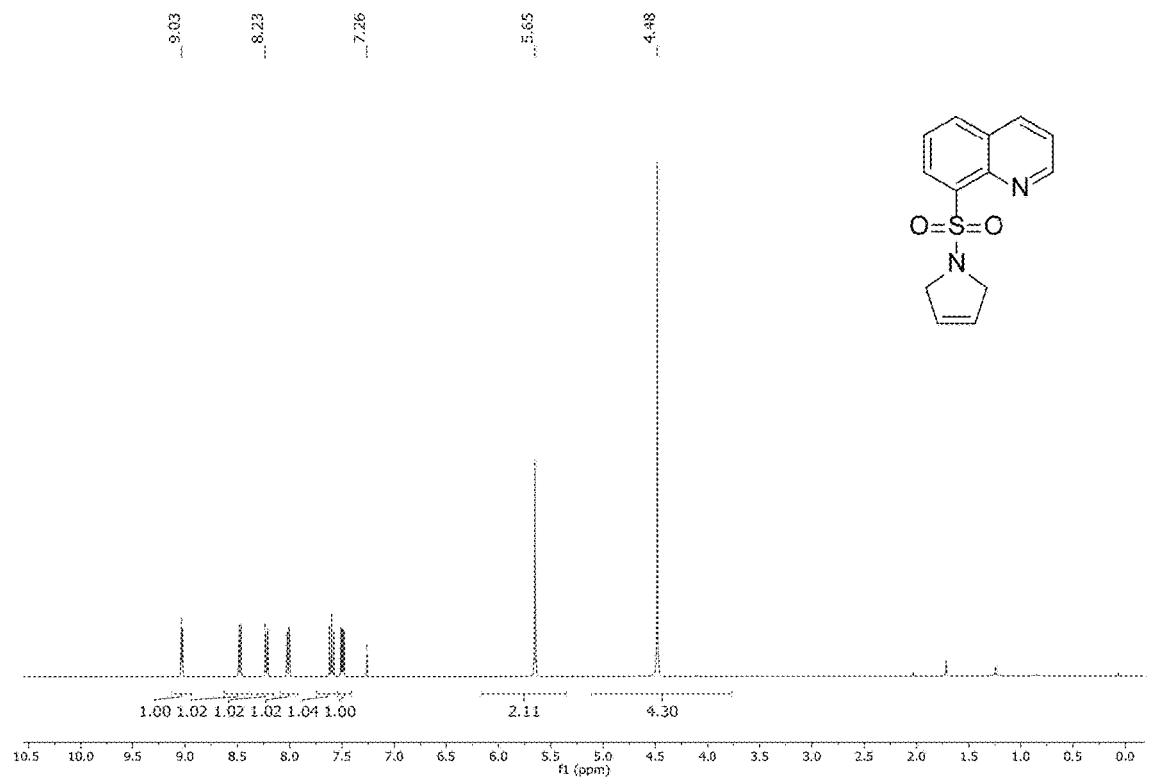
FIG. 29 shows $^1H$ NMR spectrum of 23 ($C_6D_6$, 400 MHz, 24° C.).
Figure 30:
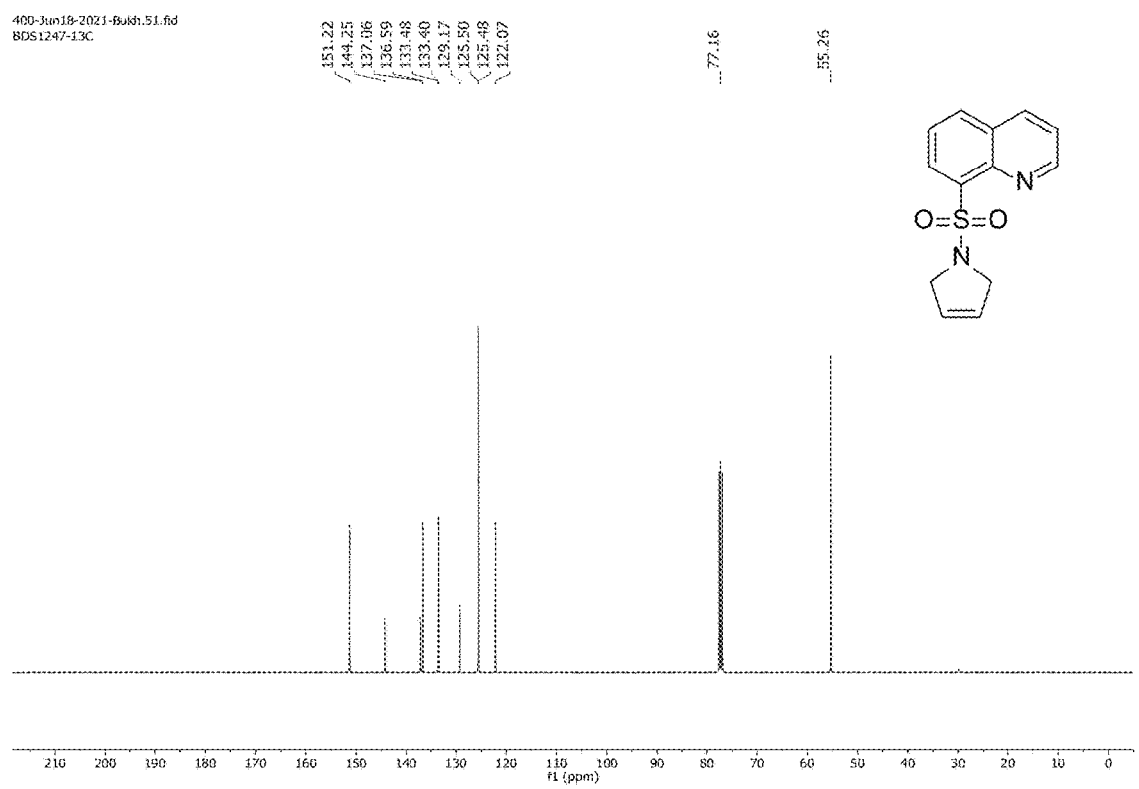
FIG. 30 shows $^{13}C$ NMR spectrum of 23 ($C_6D_6$, 101 MHz, 24° C.).

The NMR spectra of 23 are shown in FIGS. 29 and 30.

Eluent: hexanes/ethyl acetate 1:1. Rf=0.3 (1:1, hexanes/EA).

Yellow solid. Isolated yield: M=38 mg (73%).

$^1$H NMR: (CDCl$_3$, 400 MHz) δ=9.03 (dd, J=4.2, 1.8 Hz, 1H), 8.47 (dd, J=7.4, 1.5 Hz, 1H), 8.22 (dd, J=8.3, 1.8 Hz, 1H), 8.01 (dd, J=8.2, 1.5 Hz, 1H), 7.60 (dd, J=8.2, 7.3 Hz, 1H), 7.49 (dd, J=8.3, 4.2 Hz, 1H), 5.65 (s, 2H), 4.48 (s, 4H).

$^{13}$C NMR: (CDCl$_3$, 100 MHz) δ=151.2, 144.3, 137.1, 136.6, 133.5, 133.4, 129.2, 125.5, 125.5, 122.1, 55.3.

HRMS (m/z) calcd for C$_{13}$H$_{13}$N$_2$O$_2$S [M+H]$^+$: 261.0692, found: 261.0692.

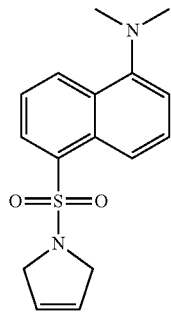 [SMILES: CN(C)c1cccc2c(S(=O)(=O)N3CC=CC3)cccc12]

5-((2,5-dihydro-1H-pyrrol-1-yl)sulfonyl)-N,N-dimethylnaphthalen-1-amine (24)

Figure 31:
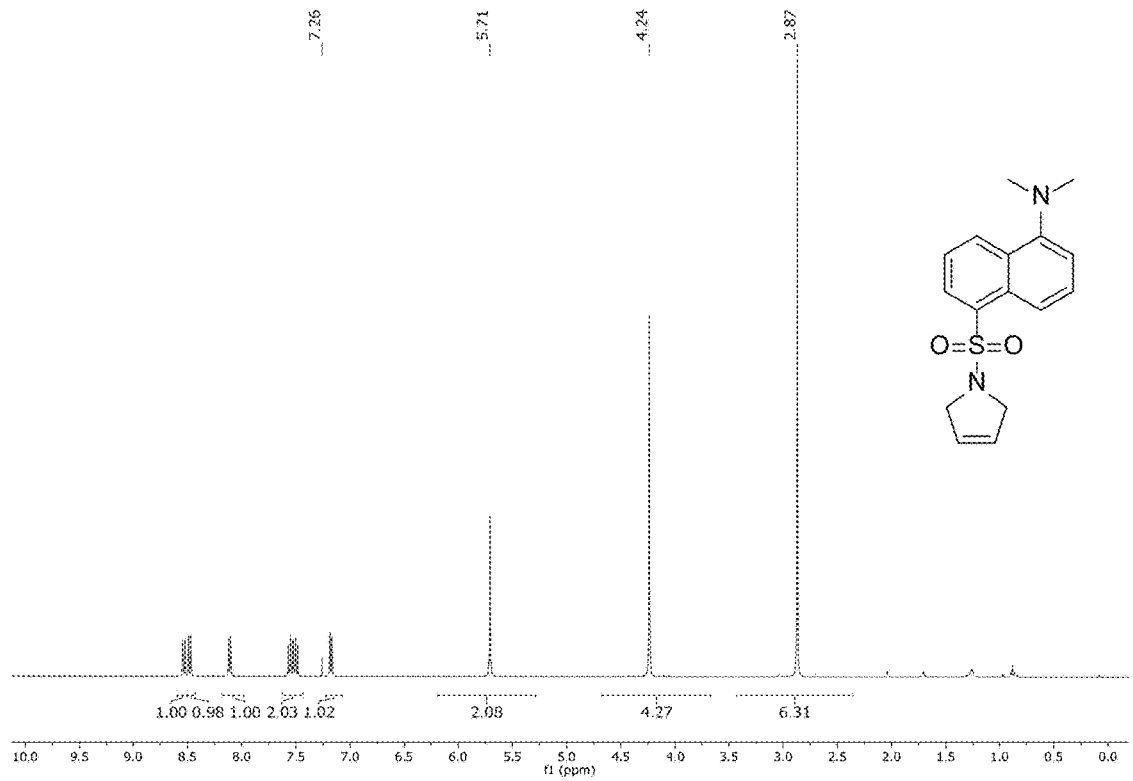
FIG. 31 shows $^1H$ NMR spectrum of 24 ($C_6D_6$, 400 MHz, 24° C.).
Figure 32:
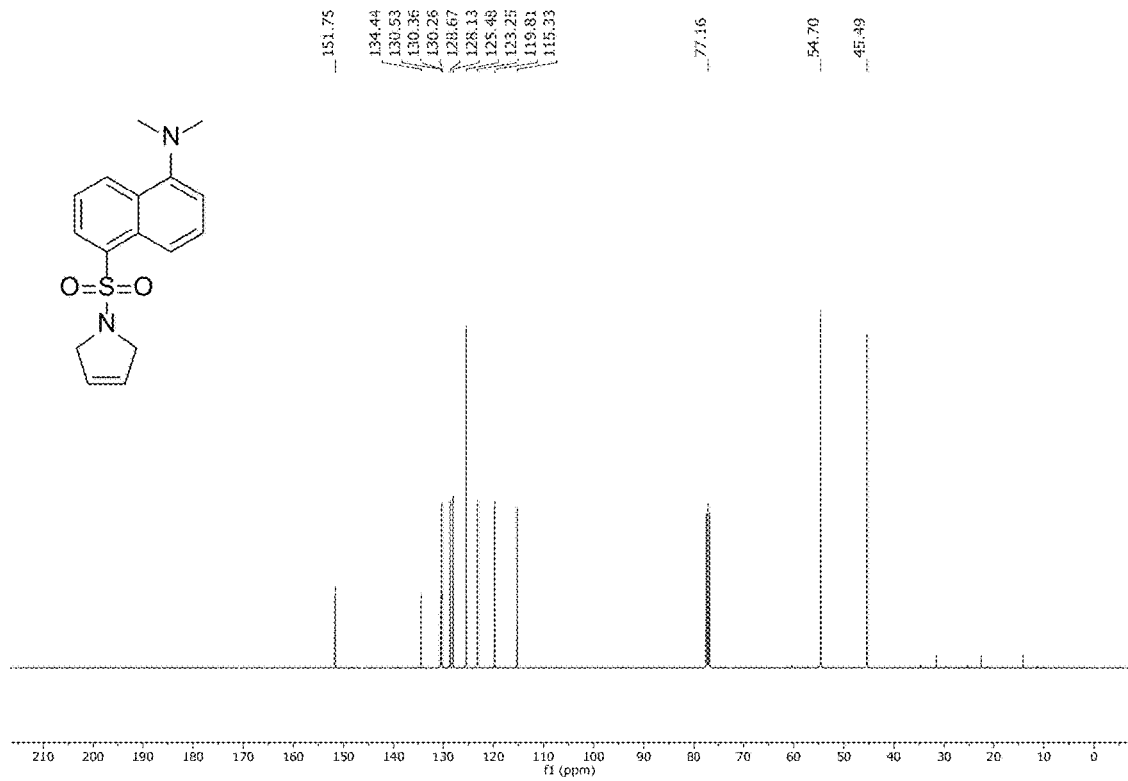
FIG. 32 shows $^{13}C$ NMR spectrum of 24 ($C_6D_6$, 101 MHz, 24° C.).

The NMR spectra of 24 are shown in FIGS. 31 and 32.

Eluent: hexanes/ethyl acetate 3:1. Rf=0.3 (3:1, hexanes/EA).

Beige solid. Isolated yield: M=51 mg (84%).

$^1$H NMR: (CDCl$_3$, 400 MHz) δ=8.53 (dt, J=8.5, 1.1 Hz, 1H), 8.48 (dt, J=8.7, 1.0 Hz, 1H), 8.11 (dd, J=7.3, 1.3 Hz, 1H), 7.53 (ddd, J=17.8, 8.6, 7.4 Hz, 2H), 7.18 (dd, J=7.6, 1.0 Hz, 1H), 5.71 (s, 2H), 4.24 (s, 4H), 2.87 (s, 6H).

$^{13}$C NMR: (CDCl$_3$, 100 MHz) δ=151.8, 134.4, 130.5, 130.4, 130.3, 128.67, 128.1, 125.5, 123.3, 119.8, 115.3, 54.7, 45.5.

HRMS (m/z) calcd for C$_{16}$H$_{19}$N$_2$O$_2$S [M+H]$^+$: 303.1162, found: 303.1160.

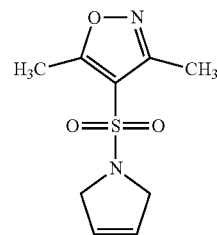

4-((2,5-dihydro-1H-pyrrol-1-yl)sulfonyl)-3,5-dimethylisoxazole (27)

Figure 33:
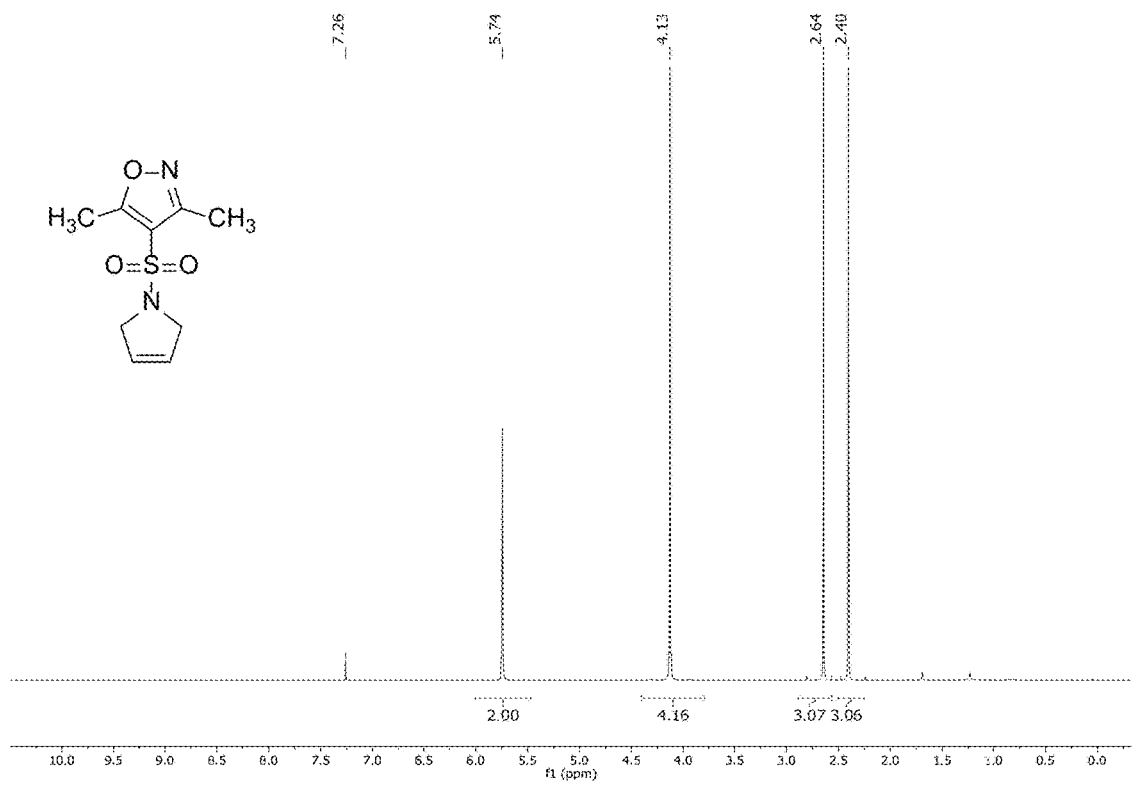
FIG. 33 shows $^1H$ NMR spectrum of 27 ($C_6D_6$, 400 MHz, 24° C.).
Figure 34:
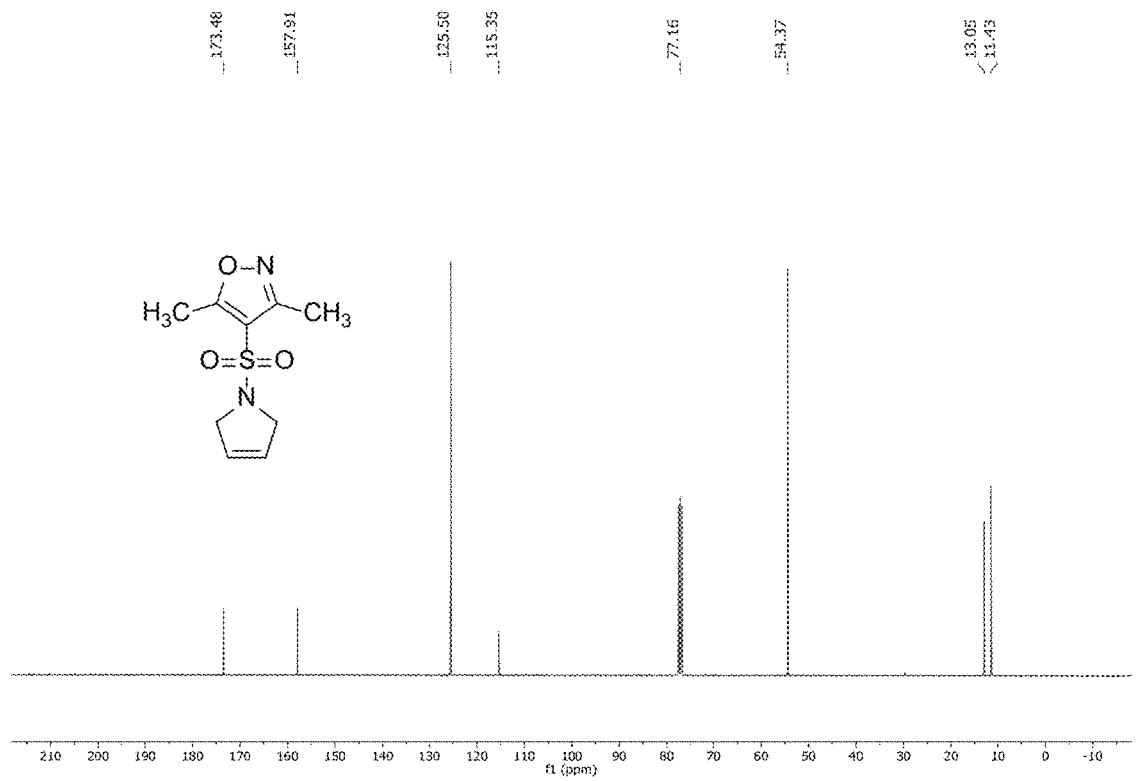
FIG. 34 shows $^3C$ NMR spectrum of 27 ($C_6D_6$, 101 MHz, 24° C.).

The NMR spectra of 27 are shown in FIGS. 33 and 34.

Eluent: hexanes/ethyl acetate 3:1, 1:1. Rf=0.3 (3:1, hexanes/EA).

White solid. Isolated yield: M=40 mg (88%).

$^1$H NMR: (CDCl$_3$, 400 MHz) δ=5.74 (s, 2H), 4.13 (s, 4H), 2.64 (s, 3H), 2.40 (s, 3H).

$^{13}$C NMR: (CDCl$_3$, 100 MHz) δ=173.5, 157.9, 125.5, 115.4, 54.4, 13.1, 11.4.

HRMS (m/z) calcd for C$_9$H$_{13}$N$_2$O$_3$S [M+H]$^+$: 229.0641, found: 229.0640.

Reaction of 14 with Ethylene

Figure 35:
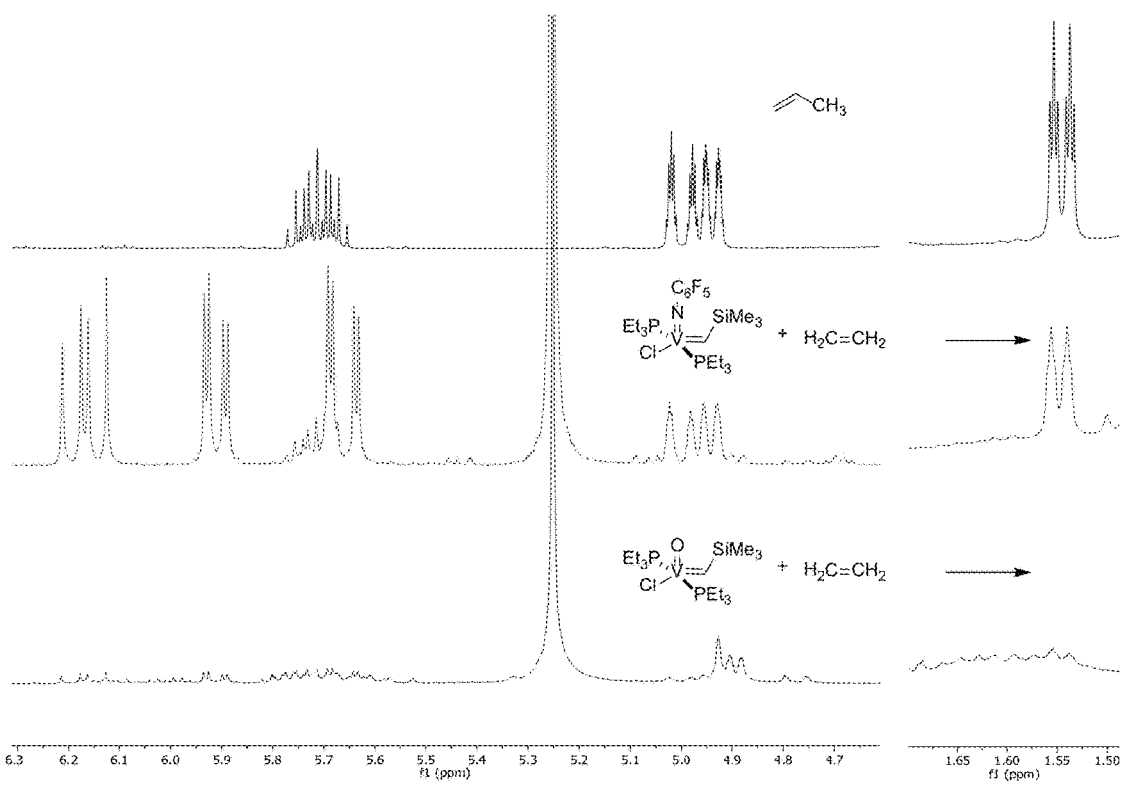
FIG. 35 shows fragment of $^1H$ NMR spectrum: Bottom: reaction of 14 with excess of ethylene. Middle: reaction of 5b with excess of ethylene. Top: propylene ($C_6D_6$, 400 MHz, 24° C.).

Ethylene was bubbled through C$_6$D$_6$ (~3 mL) for 30 minutes. The resulted solution was dried over 3 Å molecular sieves (0.5 g) overnight. The ethylene solution was filtered into J. Young tube (~90% of tube volume was filled with solution). Complex 14 (35 mg) was added, the J. Young tube was closed and the mixture was shaken for 1 minute to ensure dissolution of 14. The color slowly changed from yellow to brown along with formation of jellylike precipitate. Fragment of $^1$H NMR is shown on FIG. 35.

Propylene $^1$H NMR: (C$_6$D$_6$, 400 MHz) δ=5.79-5.63 (m, 1H), 5.00 (dp, J=17.0, 1.8 Hz, 1H), 4.94 (ddt, J=10.0, 2.3, 1.3 Hz, 1H), 1.55 (dt, J=6.5, 1.6 Hz, 3H).

Computational Details

All calculations are carried out with the B3LYP density functional as implemented in Gaussian package. Grimme's D3 empirical correction is added to account for dispersion forces. The catalyst deactivation pathways of both 5b and 14 have also been computed with the M06 density functional to ensure that results are not functional dependent. Despite small differences on the energy profiles, the same conclusions are drawn with the two functionals (Table 5). Relative Gibbs energies (in kcal mol$^{-1}$) with respect to the initial precursor and two 17 molecules of the 17 RCM process catalyzed by syn-14 were shown in FIG. 36.

In both cases, the main group elements are represented with the Pople's 6-31+G(d,p) basis sets and Vanadium is described with the all-electron Wachters-Hay 6-311+G(d,p) basis sets. The nature of all stationary points is verified by vibrational analysis and the nature of minima connected by each transition states is determined either by IRC calculations or geometry optimizations using as starting point the structure of the transition state displaced f 0.1 times the vector of the imaginary frequency. Solvent effects are included through single point calculations at the gas phase optimized geometry using the SMD continuum model and benzene as solvent. Thermal corrections are obtained at 298.15 K and 1 atm in gas phase, the Gibbs energy values being computed as $\Delta G_{298}^0 = G_{gp}^0 + \Delta G_{solv}^0$. No transition states are found for the ligand coordination and decoordination steps. Thus, coordination and decoordination energy barriers are supposed to be diffusion controlled and estimated from $\Delta G^{\ddagger} = RT \ln(8N_A h/3\eta)$, where $N_A$ is the Avogadro number, h is the Plank constant and $\eta$ the solvent viscosity.

TABLE 5

B3LYP-D3 and M06 Relative Gibbs energies (in kcal mol$^{-1}$) with respect to $I_H$ + ethene for all intermediates and transition states of the 5b and 14 precursor deactivation through b-hydride elimination.

| | 5b | | 14 | |
|---|---|---|---|---|
| Species | B3LYP | M06 | B3LYP | M06 |
| $I_H$ | 0.0 | 0.0 | 0.0 | 0.0 |
| TS($I_H$-$III_H$) | 8.3 | 5.5 | 9.7 | 6.4 |
| $III_{H-H}$ | −0.3 | −4.6 | −0.4 | −6.4 |
| TS($III_{H-H}$-$III'_{H-H}$) | N.A. | N.A. | 6.2 | 1.6 |
| $A_{H-H}$ | −1.0 | −3.0 | −0.5 | −4.2 |
| TS($A_{H-H}$-$B_{H-H}$) | 21.3 | 15.7 | 29.2 | 23.9 |
| $B_{H-H}$ | −1.1 | −5.4 | −1.8 | −6.2 |
| TS($B_{H-H}$-$C_{H-H}$) | −0.4 | N.A. | −0.9 | −5.0 |
| $^1C_{H-H}$ | −4.0 | −5.0 | −25.7 | −27.5 |
| $^3C_{H-H}$ | −24.2 | −27.1 | −24.4 | −28.2 |

TABLE 6

Calculated $^{13}$C NMR chemical shifts (ppm) for 14-III and 14-A species involved in the RCM of 17 catalyzed by syn-14.

| Species | Ca | Cb | Ca' |
|---|---|---|---|
| syn-14-III'$_{TMS\text{-}DTSA}$ | 121.7 | 6.3 | 135.6 |
| anti-III$_{TMS\text{-}DTSA}$ | 117.9 | 9.0 | 137.8 |
| syn-III$_{DTSA\text{-}H}$ | 148.1 | 22.5 | 94.7 |
| anti-III$_{DTSA\text{-}H}$ | 122.9 | 13.8 | 105.4 |
| syn-III$_{H\text{-}DTSA}$ | 128.4 | 5.4 | 99.7 |
| anti-III$_{H\text{-}DTSA}$ | 115.5 | 2.2 | 95.8 |
| III$_{H\text{-}H}$ | 102.2 | 1.1 | 99.9 |
| syn-A$_{TMS\text{-}DTSA}$ | 36.5 | 26.4 | 66.4 |
| anti-A$_{TMS\text{-}DTSA}$ | 38.8 | 27.6 | 69.9 |
| syn-A$_{DTSA\text{-}H}$ | 46.8 | 40.3 | 39.6 |
| anti-A$_{DTSA\text{-}H}$ | 34.5 | 39.1 | 43.4 |
| syn-A$_{H\text{-}DTSA}$ | 40.1 | 32.4 | 50.2 |
| anti-A$_{H\text{-}DTSA}$ | 37.8 | 26.9 | 46.6 |
| A$_{H\text{-}H}$ | 32.8 | 26.1 | 46.9 |

The $^{13}$C NMR chemical shifts of the metallacyclobutane carbon atoms are computed at the same level of theory using the GIAO method to analyze the electronic structure of the distorted TBP metallacycle found for the vanadium oxo. Relative Gibbs energies (in kcal mol$^{-1}$) with respect to the initial precursor and two 17 molecules of the 17 RCM process catalyzed by syn-14.

Example 1—Synthesis of V Oxo Trialkyl Complex

The synthesis of V oxo alkylidene from the corresponding trialkyloxovanadium complex seems straightforward in analogy to V imido complexes. However, complex 12 (Scheme 5) is not readily available. Unlike the reaction of 1 with 2 or 3 (Scheme 6), direct alkylation of 10 leads to the reduction and formation of V(IV) complex 11.

Scheme 5. Synthesis of V oxo trialkyl complex 12.

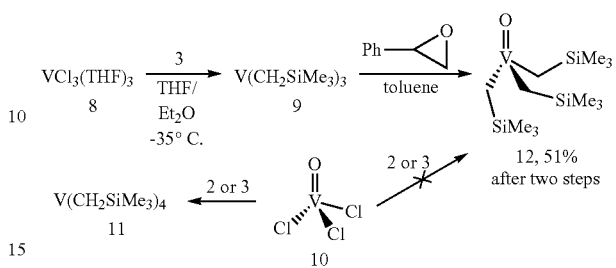

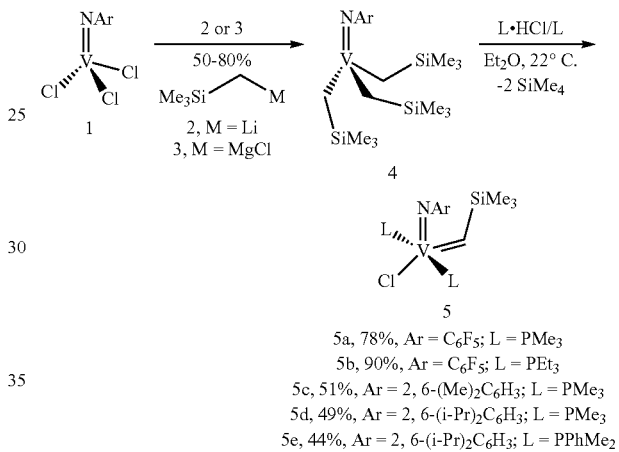

Scheme 6. Synthesis of V imido chloride alkylidenes.

5a, 78%, Ar = C$_6$F$_5$; L = PMe$_3$
5b, 90%, Ar = C$_6$F$_5$; L = PEt$_3$
5c, 51%, Ar = 2, 6-(Me)$_2$C$_6$H$_3$; L = PMe$_3$
5d, 49%, Ar = 2, 6-(i-Pr)$_2$C$_6$H$_3$; L = PMe$_3$
5e, 44%, Ar = 2, 6-(i-Pr)$_2$C$_6$H$_3$; L = PPhMe$_2$

Eventually, a procedure for the preparation of (t-BuCH$_2$)$_3$VO was adapted. Alkylation of 8 with 3 produced 9, which was used for the next step immediately due to the limited stability. The latter can be oxidized by several reagents, and styrene oxide was found to give the highest yield of 12.

Example 2—Synthesis of Oxo Alkylidene Complexes

With the complex 12 in hand, optimized conditions were tried to prepare V alkylidenes. Unfortunately, this mostly led to the decomposition of staring material into unidentified paramagnetic compounds. However, a small amount of desired alkylidene complex was observed by $^1$H NMR (the presence of V=CH signal, 16.07 ppm, C$_6$D$_6$). After considerable optimization, which included searching for appropriate phosphine and anionic ligands, solvent, and a proton source, optimal reaction conditions were found.

Figure 37:
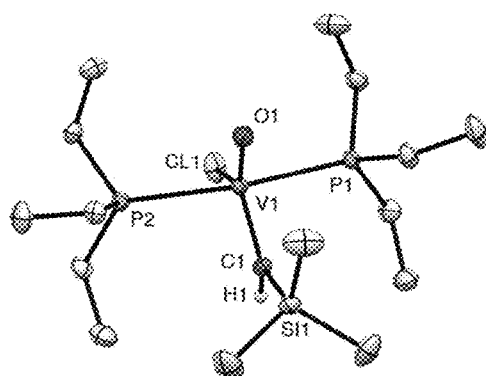
FIG. 37 shows molecular structure of syn-14. The thermal ellipsoids are shown at 50% probability level.

Treatment of 12 with PEt$_3$·TfOH in the presence of five equivalents of PEt$_3$ in CH$_2$Cl$_2$ resulted in two V alkylidenes 13 and 14 observed by $^1$H NMR (Scheme 7). Initially, it was proposed that a mixture of syn and anti-alkylidenes were formed. However, the ratio of two products varied from one experiment to another. Compound 14 was crystallized and undergone X-ray studies. Surprisingly, the isolated complex contained chloride ligand instead of triflate (FIG. 37). Complex 13 can be quickly converted to 14 by adding a Cl$^-$ source, such as BnNEt₃CL. Formation of complex 14 can be explained by slow release of Cl⁻ by the reaction of $CH_2Cl_2$ and $PEt_3$ Scheme 7. Synthesis of oxo alkylidene complexes.

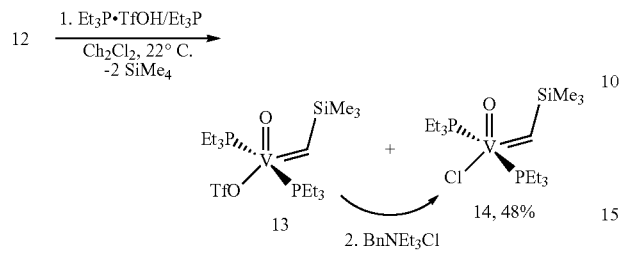

Example 3—Mechanism of the Formation of V Oxo Alkylidenes

The mechanism of the formation of V oxo alkylidenes includes protonation of one of three alkyl groups with acid (HX) to form 15 (Scheme 8). The second critical step of the alkylidene formation is the α-hydrogen abstraction induced by the coordination of the L-type ligand. The nature of the X group plays a crucial role in alkylidene formation. Some imido V complexes (Ar'O—V(NAr)(CH₂TMS)₂) are isolable and can be converted to alkylidenes upon the addition of PMe₃. In contrast, isolable Ph₃SiO—VO(CH₂TMS)₂ (15a) complex does not react with neutral ligands to form V oxo alkylidene. 15b has limited stability in solution. Still, it can react with neutral ligands to form alkylidenes 16. In the case of 15c, the rate of decomposition is higher than alkylidene formation.

Scheme 8. mechanism of alkylidene formation.

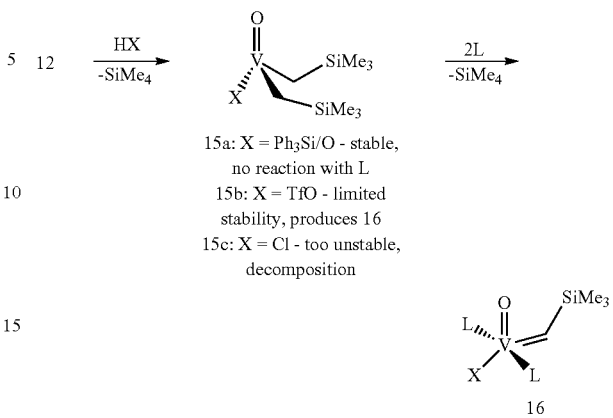

Complex 14 is a mixture of syn and anti-alkylidenes in the ratio 97:3 in the solution by ¹H NMR (C₆D₆). An X-ray structural study showed that syn-14 (FIG. 37) has a distorted trigonal bipyramidal geometry with phosphines in axial positions [V-P1 2.4884(8) Å, V-P2 2.4701(8) Å, P1-V-P2 164.89(2)°]. The V1-C1 distance is 1.8403(19) Å and V1-O1 bond is 1.6079(15) Å, that are similar to reported V oxo alkylidene. The large V=C—Si angle (140.01(12)°) is indicative of α-hydrogen agostic interactions with V center.

Example 4—Metathesis Activity of 14

The metathesis activity of 14 was explored with diallyl N-tosylamide 17 and its reactivity was compared with V imido complex 5b (entry 1 and 2, Table 7). Catalyst 14 outperforms 5b in reaction with 17. Notably, conversion to 18 is higher in an open vial in both cases, suggesting that the active species are sensitive to ethylene.

TABLE 7

RCM catalyzed by 14 and 5b.

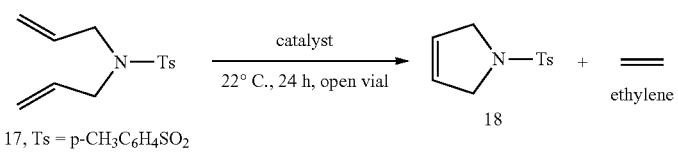

17, Ts = p-CH₃C₆H₄SO₂

| # | cat. | solvent | cat, mol % | conv., %[a] | TON |
|---|------|---------|------------|-------------|------|
| 1 | 5b | benzene | 5 | 63 (42)[b] | 12.6 |
| 2 | 14 | benzene | 5 | 87 (67)[b] | 17.4 |
| 3 | 14 | chloroform | 1 | 59 (56)[b] | 59.0 |
| 4 | 14 | chloroform | 2 | 83 (66)[b] | 41.5 |
| 5 | 14 | chloroform | 3 | 91 (69)[b] | 30.3 |
| 6 | 14 | chloroform | 4 | 94 (73)[b] | 23.5 |
| 7 | 14 | chloroform | 5 | 96 (76)[b] | 19.2 |
| 8 | 14 | chloroform | 6 | 97 (76)[b] | 16.2 |

[a] by ¹H NMR.
[b] closed vial.

To investigate the mechanism of catalyst deactivation, a reaction of 14 with ethylene was conducted. Initially, the formation of a small amount of new alkylidene signal (m, 13.8 ppm, $C_6D_6$, presumably V methylidene) and vinyl-TMS was observed. After several hours at room temperature, the complete decomposition of alkylidenes was observed. The reaction of 14 with ethylene produces only traces of propylene by $^1H$ NMR, which is in contrast to the analogous reaction of 5b, where propylene is the primary decomposition product.

To examine the contribution of bimolecular decomposition in the deactivation of the catalysts, the reaction of 14 with 17 was tested at different catalysts loadings (entries 3-8, Table 7). Important to mention, reactions were performed in chloroform since it gives the highest conversion among tested solvents (see Table 2). The decrease of the catalyst loading led to an increase of TON, suggesting that bimolecular decomposition plays a role in the catalyst deactivation. Noteworthy, the TON of 59 is the highest TON for V-based OM involving terminal olefins.

Figure 38:
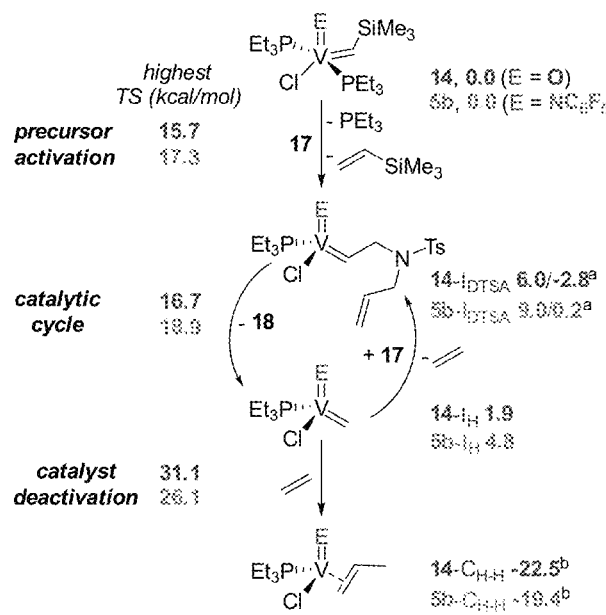
FIG. 38 shows Gibbs energies (kcal mol$^{-1}$) of the key intermediates and the highest transition states relative to syn-14 (upper) and syn-5b (lower).[a] the difference between the two values is the RCM Gibbs reaction energy.[b] triplet ground state.

To explain the difference in stability of 14 and 5b toward ethylene, DFT calculations were performed on the full catalytic cycle, which includes precursor activation, productive RCM cycle, and mononuclear catalyst deactivation. FIG. 38 shows the Gibbs energies of key intermediates relative to syn-14 (upper) and syn-5b (lower) and the highest transition states of each part of the global process. Computed Gibbs energy barriers for the precursor activation and RCM catalytic cycle with syn-5b and syn-14 are consistently low (below 19 kcal mol$^{-1}$). The difference between the energy span of syn-14 and that of syn-5b is only 2.2 kcal mol$^{-1}$ (16.7 vs. 18.9 kcal mol-1). Therefore, calculations suggest that RCM occurs readily at reaction conditions, and the two precursors behave similarly in the absence of catalyst deactivation.

Figure 39:
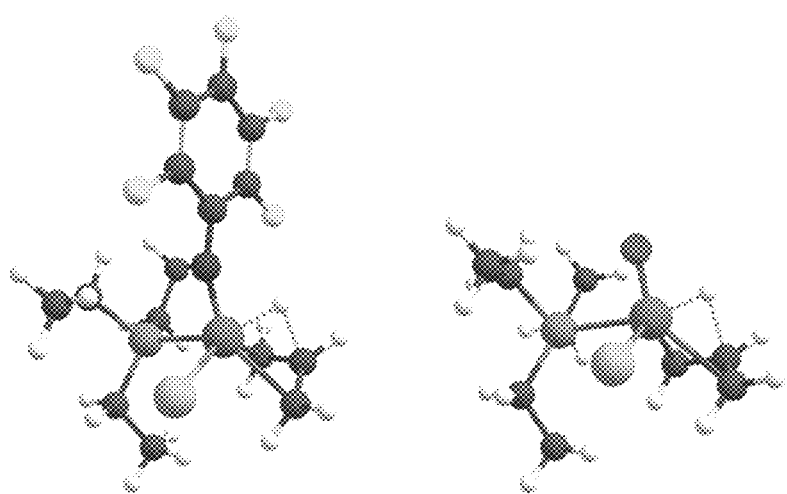
FIG. 39 shows Optimized structures (left: V imido; right: V oxo) for the β-H elimination transition states.

Mononuclear catalyst deactivation occurs through β-H elimination from MCB. This step has the highest energy barrier similar to other d$^0$ complexes. The β-H elimination transition state is 31.1 and 26.1 kcal mol$^{-1}$ above initial reactants for 14 and 5b, which agrees with the experimentally observed larger stability toward ethylene of the V oxo complex. The Q-H transfer imposes the allyl fragment almost trans to the oxo or imido ligand (FIG. 39), and this causes a strong trans influence between the two groups. Since the oxo acts as a stronger σ-donating ligand than the imido, the destabilization of the β-H1 transition state is more significant for 14, hindering its deactivation. The computed energy barriers are consistent with the deactivation taking place in a few hours for 5b and a few days for 14, suggesting that other deactivation processes, such as bimolecular decomposition, are important for 14.

Figure 36A:
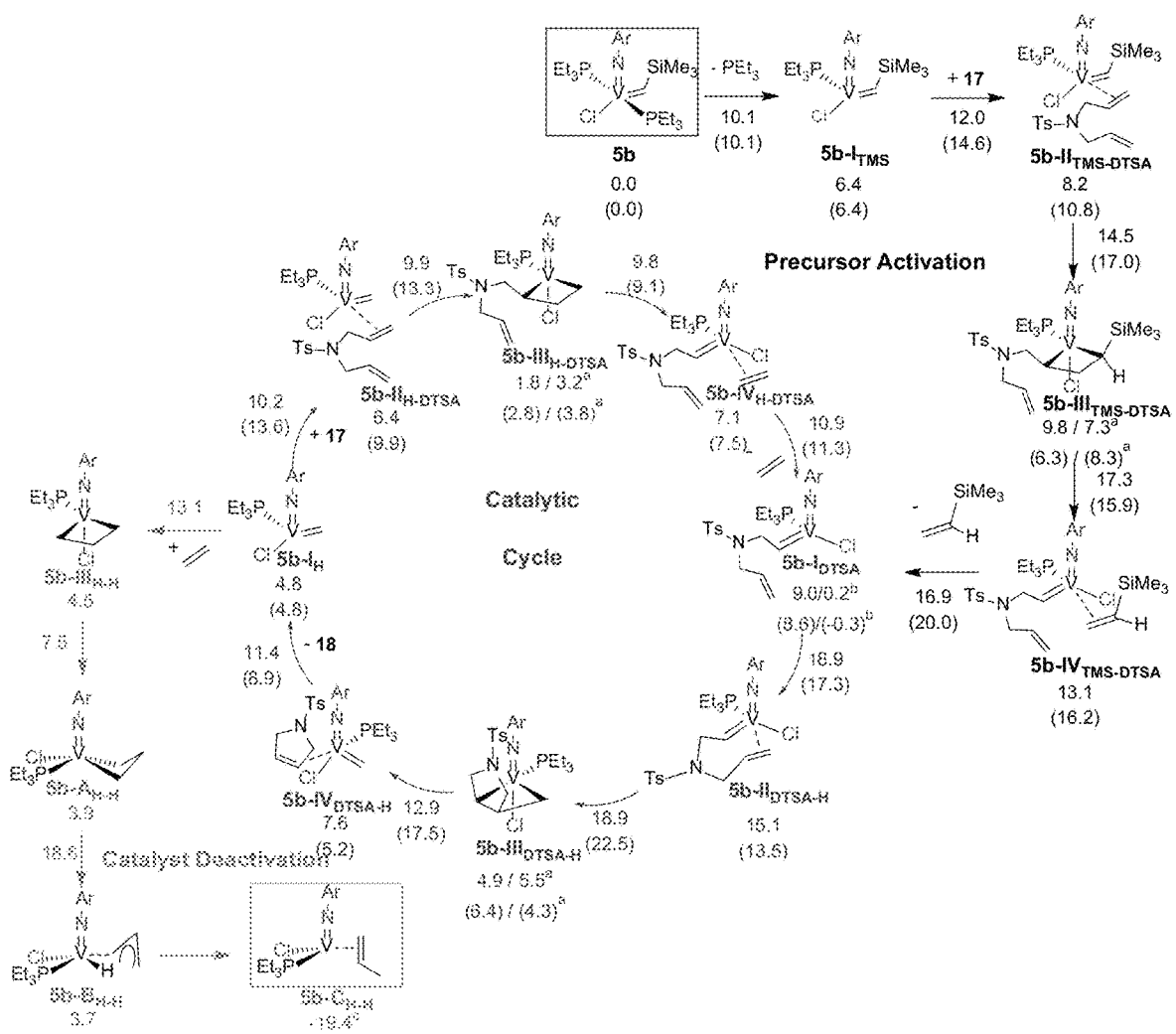
FIG. 36A shows relative Gibbs energies (in kcal $mol^{-1}$) with respect to the initial precursor and two 17 molecules of the 17 RCM process catalyzed by syn-5b. Two relative carbene —incoming olefin orientations have been considered: all substituents pointing toward the oxo ligand and (substituents pointing towards opposite directions). Values over the arrows correspond to the Gibbs energies of the transition states.[a] The second values corresponds to the SP metallacyclobutane isomer.[b] The first the value involves 14-$I_{DTSA}$ and 17 and the second value implies 5b-$I_{DTSA}$, 18 and ethylene. C The ground state of this structure is a triplet.
Figure 36B:
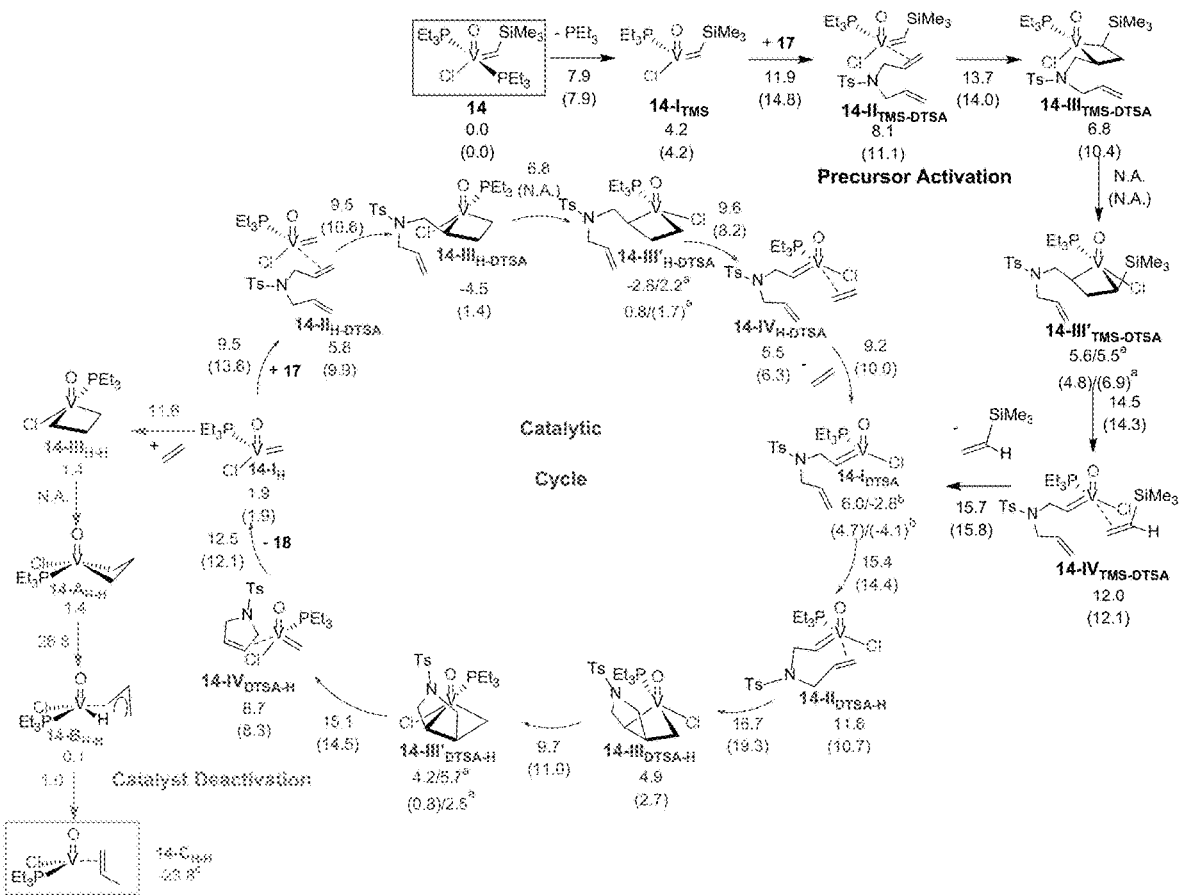
FIG. 36B shows relative Gibbs energies (in kcal $mol^{-1}$) with respect to the initial precursor and two 17 molecules of the 17 RCM process catalyzed by syn-14. Two relative carbene —incoming olefin orientations have been considered: all substituents pointing toward the oxo ligand and (substituents pointing towards opposite directions). Values over the arrows correspond to the Gibbs energies of the transition states.[a] The second values corresponds to the SP metallacyclobutane isomer.[b] The first the value involves 14-$I_{DTSA}$ and 17 and the second value implies 14-$I_{DTSA}$, 18 and ethylene.[c] 14-$C_{H-H}$ has a singlet ground state, the triplet being very similar in energy.

Noteworthy, a difference in reactivity between 14 and 5b was found. Thus, cycloaddition reaction between V imido alkylidenes and olefin occurs trans to the strongest σ-donating ancillary ligand (PEt$_3$) to form a trigonal bipyramidal (TBP) MCB intermediate similar to other d$^0$ OM catalysts. TBP isomer can undergo cycloreversion step (productive OM) or rearrange to square pyramidal (SP) MCB, which is off-cycle intermediate. Mononuclear d$^0$ catalyst deactivation implies a β-H elimination trans to the weakest σ-donating ligand (Cl, FIG. 39) from the SP isomer. The geometry optimizations for V oxo MCB evolved to a distorted TBP, where oxo is not strictly in axial position. Consequently, one single MCB cannot be involved in the cycloaddition/cycloreversion steps, and MCB rearrangement is necessary (FIG. 36). However, the MCB interconversion implies low energy barriers that have a small impact on the process.

Figure 40:
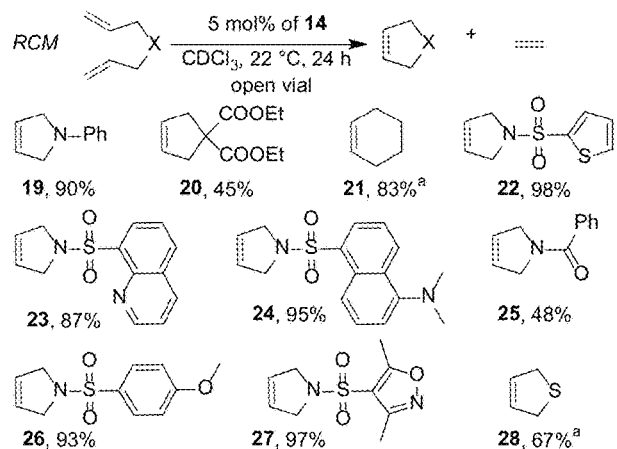
FIG. 40 shows scope of RCM catalyzed by 14.[a] closed vial.

The scope of RCM was explored, and the results are summarized in FIG. 40. Products containing tertiary aniline (19, 24), thiophene (22), quinoline (23), ether (26), and isoxazole (27) can be synthesized by using 14 with high conversions. Substrates bearing an ester (20), a tertiary amide (25), and a thioether (28) exhibit lower conversions, probably due to competing binding to the catalyst.

The results show that V oxo alkylidene 14, the active catalysts for olefin metathesis, can be prepared directly from VO(CH$_2$SiMe$_3$)$_3$ complex. Furthermore, experimental and computational studies strongly suggest that the β-H elimination from metallacyclobutane is significantly disfavored for V oxo species compared to V imido counterparts. As a result, catalyst 14 exhibits the highest reported productivity among known V alkylidenes in ring-closing metathesis of various terminal dienes due to the greater tolerance to ethylene. 14 is a reliable V-based olefin metathesis catalyst.

Example 5—Synthesis of Cationic Complexes

Cationic V alkylidene complexes 15 (Scheme 9) contain two neutral ligands and present an unknown class of compounds. Complexes 15 can be synthesized in one step in the presence of BArF salts. Their catalytic activity is tested. Two neutral ligands (NHC and L) reduce asymmetry compared to V complexes containing anion and neutral ligands, thus increasing the energy barrier for olefin coordination/decoordination steps. Less electron-donating neutral ligands L, such as PAr3, POR3, and POAr3, are utilized to minimize this effect. Increased electrophilicity of a cationic metal center can improve reactivity toward sterically hindered (tri- and tetrasubstituted) and electron-deficient olefins. Air-stability and functional group tolerance are also evaluated.

Scheme 9. synthesis of cationic complexes

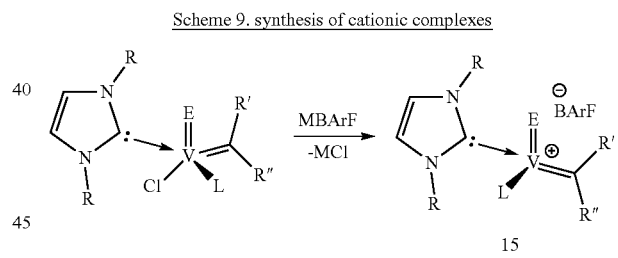

Figure 41A:
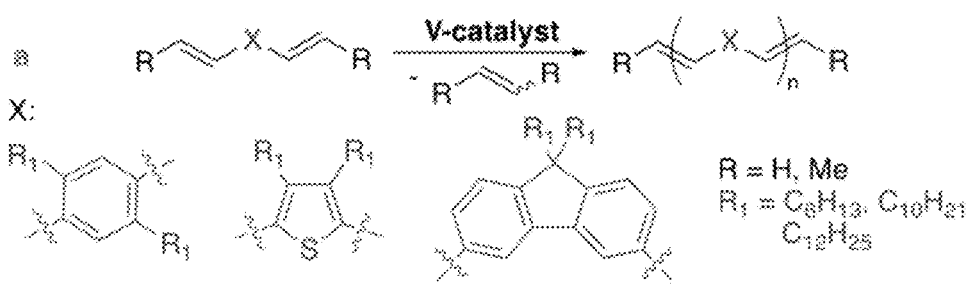
FIG. 41A shows the use of V-based catalysts for the synthesis of conjugated polymers.

M = Na or Ag; BArF = [{3,5-(CF$_3$)$_2$C$_6$H$_3$}$_4$B]$^-$
L = PR$_3$, PAr$_3$, POR$_3$, pyridine, nitrile Example 6—Other Applications Acyclic diene metathesis (ADMET) allows the synthesis of advanced materials, such as electroactive, conjugated, liquid-crystalline, telechelic, hyperbranched, and biorenewable polymers that have found numerous applications. The reverse process, the depolymerization of unsaturated polymers in the presence of olefins, is an attractive method to convert polymers to valuable olefins or other polymers. The catalysts of the subject invention can be utilized to synthesize conjugated polymers (FIG. 41A) that find use in the fabrication of optoelectronic and electrochemical devices. All polymers are be characterized by NMR and size-exclusion chromatography (SEC) to determine their stereochemistry, molecular weight (MW), polydispersity index (PDI), and topology.

Figure 41B:
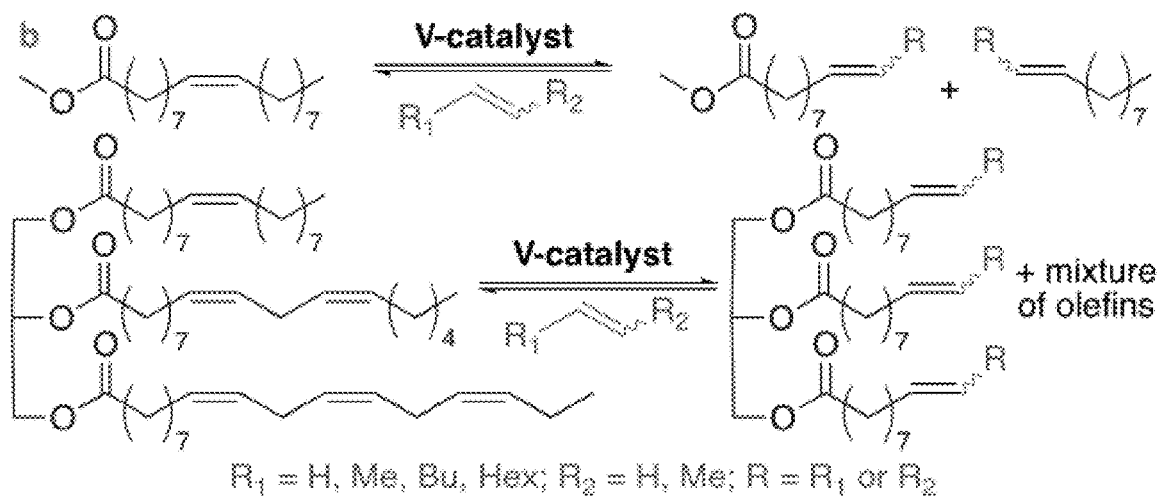
FIG. 41B shows the use of V-based catalysts for cross-metathesis of methyl oleate and natural oil with olefins.

Chemicals derived from renewable, sustainable sources have attracted much attention as an alternative to the traditional fossil fuel feedstock. One of them is oleochemicals that are available on a large scale at commodity prices. The reaction of fatty acid esters with ethylene, propylene, 1- or 2-butene, 1-hexene, or 1-octene in the presents of metathesis catalysts leads to valuable olefins that can be applied to produce biofuel, cosmetics, soaps, detergents, polymer additives, and coatings. The catalysts of the subject invention can be applied to the reactions of methyl oleate (model substrate) and available vegetable oils, such as sunflower, canola, and soya, with terminal and internal olefins (FIG. 41B). Reaction products are analyzed by GC-MS. Important to mention the V NHC complexes of the subject invention can tolerate an ester group.

Figure 41C:
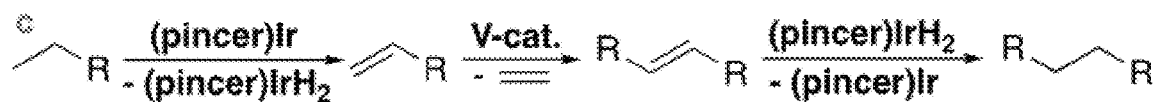
FIG. 41C shows the use of V-based catalyst in alkane metathesis.

Tandem alkane dehydro-genation/olefin metathesis has been applied to convert low-MW to high-MW alkanes in the $C_9$-$C_{19}$ range. Such transformation, "alkane metathesis," allows the production of high-grade diesel fuel from biomass, gas, or coal, which is highly desirable as petroleum supplies dwindle. The process consists of two steps: (pincer) Ir-based dehydrogenation/hydrogenation and OM. The reactions are run in neat alkane, in some cases, for several days at 125° C., but the process is limited primarily by decomposition OM catalysts. The results indicate that V imido chloride alkylidenes exhibit high thermostability. The most thermally stable V catalysts for alkane metathesis are shown in FIG. 41C.

All patents, patent applications, provisional applications, and other publications referred to or cited herein are incorporated by reference in their entirety, including all figures and tables, to the extent they are not inconsistent with the explicit teachings of this specification. Additionally, the entire contents of the references cited within the references cited herein are also entirely incorporated by reference.

The examples and embodiments described herein are for illustrative purposes only and that various modifications or changes in light thereof will be suggested to persons skilled in the art and are to be included within the spirit and purview of this application.

We claim:

1. A complex having a general structure of formula (I):

(I)

wherein

E is NR", or S;

X is selected from halogens, alkoxides, thioalkoxides, and sulfonates;

R and R' are each independently selected from hydrogen, alkyl, substituted alkyl, aryl, substituted aryl, heterocycles, substituted heterocycles, —$OR^a$, —$Si(R^b)_3$ and $R^cR^d$, wherein $R^a$, $R^b$, $R^c$ and $R^d$ are independently selected from hydrogen, alkyl, substituted alkyl, aryl, and substituted aryl;

R" is selected from hydrogen, alkyl, substituted alkyl, aryl, substituted aryl, heterocycles, and substituted heterocycles; and $L_1$ and/or $L_2$ are:

(1) NHCs selected from

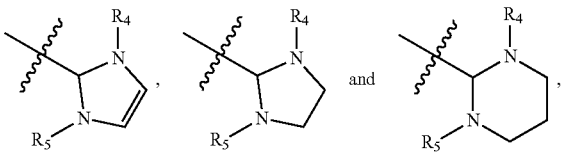

wherein $R_4$ and $R_5$ are independently selected from hydrogen, alkyl, substituted alkyl, cycloalkyl, substituted cycloalkyl, aryl and substituted aryl;

(2) pyridines having a structure of

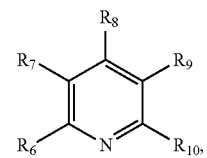

wherein $R_6$, $R_7$, $R_8$, $R_9$, $R_{10}$ are each independently selected from hydrogen, halogens, alkyl, substituted alkyl, hydorxyl, acyl, and —$NH_2$; or (3) nitriles selected from

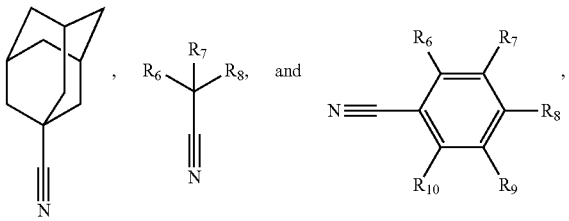

wherein $R_6$, $R_7$, $R_8$, $R_9$, $R_{10}$ are each independently selected from hydrogen, halogens, alkyl, substituted alkyl, hydorxyl, acyl, and —$NH_2$.

2. The complex of claim 1, having a structure of (VI):

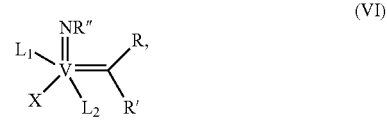

(VI)

wherein X is halogen or sulfonate; and R and R' are each independently selected from hydrogen, alkyl, substituted alkyl, aryl, substituted aryl, heterocycles, substituted heterocycles, —$OR^a$, —$Si(R^b)_3$ and —$NR^cR^d$, wherein $R^a$, $R^b$, $R^c$ and $R^d$ are independently selected from hydrogen, alkyl, substituted alkyl, aryl, and substituted aryl.

3. The complex of claim 1, having a structure of (IV):

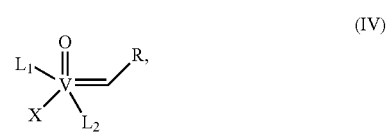

(IV)

wherein X is sulfonate; and R is selected from alkyl, substituted alkyl, aryl, substituted aryl, heterocycles, substituted heterocycles, —OR$^a$, —Si(R$^b$)$_3$ and —NR$^c$R$^d$, wherein R$^a$, R$^b$, R$^c$ and R$^d$ are independently selected from hydrogen, alkyl, substituted alkyl, aryl, and substituted aryl.

4. The complex of claim 1, wherein NR" is selected from

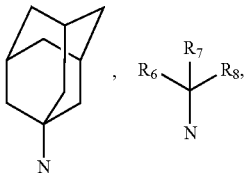

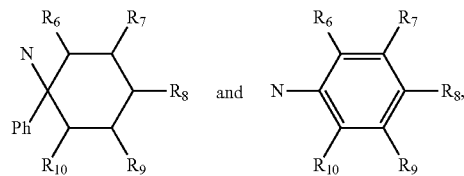

wherein R$_6$, R$_7$, R$_8$, R$_9$, R$_{10}$ are each independently selected from hydrogen, halogens, alkyl, substituted alkyl, alkoxides, aryl, substituted aryl, hydorxyl, acyl, and —NH$_2$.

5. The complex of claim 4, wherein R$_6$, R$_7$, R$_8$, R$_9$, R$_{10}$ are each independently selected from hydrogen, halogens, OMe, Me, Et, i-Pr, Cy, Ph, and CF$_3$.

6. The complex of claim 1, wherein X is selected from OAd, OPh, OSiPh$_3$, F, OBu$^F_6$, SPh, OC$_6$F$_5$, Cl, Br, OTf, OSO$_2$Ar and I.

7. The complex of claim 1, wherein X is halogen; R is SiMe$_3$, and R' is hydrogen.

8. A composition comprising the complex of claim 1.

9. A complex having a general structure of formula (I):

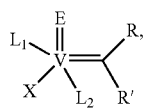

(I)

wherein E is NR"; and NR" is

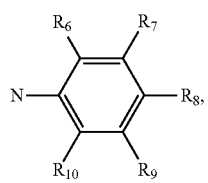

wherein R$_6$, R$_7$, R$_8$, R$_9$, R$_{10}$ are each independently selected from hydrogen, alkyl, and substituted alkyl;

L$_1$ is

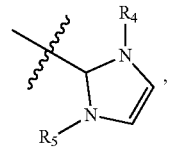

wherein R$_4$ and R$_5$ are independently selected from hydrogen, alkyl, substituted alkyl, aryl, and substituted aryl;

L$_2$ is a phosphine;
X is halogen;
R is hydrogen, and
R' is substituted aryl.

10. The complex of claim 9, wherein NR" is

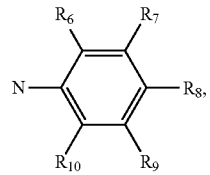

wherein R$_6$ is methyl; R$_7$, R$_8$, and R$_9$ are hydrogen; and R$_{10}$ is methyl;

L$_1$ is

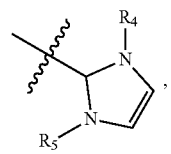

wherein R$_4$ and R$_5$ are substituted aryl;
L$_2$ is PMe$_3$;
X is Cl;
R is hydrogen, and
R' is substituted aryl.

11. The complex of claim 9, wherein R$_6$, R$_7$, R$_8$, R$_9$, R$_{10}$ are each independently selected from hydrogen, Me, Et, i-Pr, and CF$_3$.

12. The complex of claim 9, wherein the phosphine has a general structure of P(R$_1$)(R$_2$)(R$_3$), wherein R$_1$, R$_2$, and R$_3$ are each independently selected from hydrogen, alkyl, substituted alkyl, aryl and substituted aryl.

13. The complex of claim 9, wherein L$_2$ is PMe$_3$ or PEt$_3$.

14. A composition comprising the complex of claim 9.

15. The complex of claim 1, wherein X is selected from halogens, alkoxides, thioalkoxides, and sulfonates; and R is selected from alkyl, aryl, heterocycles, trialkylSi, OAlkyl, OAryl, and perfluorinated alkyl.

16. The complex of claim 1, wherein X is selected from halogens and sulfonates; and R is selected from hydrogen, alkyl, substituted alkyl, aryl, substituted aryl, heterocycles, substituted heterocycles, —OR$^a$, and —Si(R$^b$)$_3$, wherein R$^a$, and R$^b$ are independently selected from hydrogen, alkyl, substituted alkyl, aryl, and substituted aryl; and R' is hydrogen.

* * * * *